US006697847B2

(12) United States Patent  (10) Patent No.: US 6,697,847 B2
Iwata  (45) Date of Patent: Feb. 24, 2004

(54) INFORMATION PROCESSING SYSTEM

(75) Inventor: Nobuo Iwata, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/114,113

(22) Filed: Apr. 3, 2002

(65) Prior Publication Data

US 2002/0133577 A1 Sep. 19, 2002

Related U.S. Application Data

(62) Division of application No. 09/085,046, filed on May 27, 1998, now Pat. No. 6,438,589.

(30) Foreign Application Priority Data

Jun. 2, 1997 (JP) .............................. 9-143606
Jan. 14, 1998 (JP) .......................... 10-005410

(51) Int. Cl.[7] .............................................. G06F 15/16
(52) U.S. Cl. ....................... 709/218; 709/219; 709/224; 709/229; 358/1.15
(58) Field of Search ................................ 709/218, 219, 709/229, 224; 370/392; 358/1.15

(56) References Cited

U.S. PATENT DOCUMENTS

| 4,653,112 | A |   | 3/1987  | Ouimette .................... 382/128 |
| 4,720,782 | A |   | 1/1988  | Kovalcin ..................... 700/83 |
| 5,422,881 | A |   | 6/1995  | May et al. .................. 370/392 |
| 5,519,874 | A |   | 5/1996  | Yamagishi et al. ......... 709/201 |
| 5,530,857 | A |   | 6/1996  | Gimza ........................ 707/10 |
| 5,559,933 | A |   | 9/1996  | Boswell ...................... 358/1.15 |
| 5,668,986 | A |   | 9/1997  | Nilsen et al. ................ 707/10 |
| 5,935,207 | A |   | 8/1999  | Logue et al. ............... 709/219 |
| 5,937,163 | A |   | 8/1999  | Lee et al. ................... 709/218 |
| 5,948,066 | A |   | 9/1999  | Whalen et al. ............. 709/229 |
| 5,956,487 | A | * | 9/1999  | Venkatraman et al. ...... 709/218 |
| 5,999,708 | A | * | 12/1999 | Kajita ........................ 358/1.15 |
| 6,067,407 | A | * | 5/2000  | Wadsworth et al. ........ 709/224 |

FOREIGN PATENT DOCUMENTS

| JP | A-5-89069   | 4/1993 |
| JP | A-6-149490  | 5/1994 |
| JP | A-6-243223  | 9/1994 |
| JP | A-7-56668   | 3/1995 |
| JP | A-7-219811  | 8/1995 |

\* cited by examiner

Primary Examiner—Wen-Tai Lin
(74) Attorney, Agent, or Firm—Oliff & Berridge, PLC

(57) ABSTRACT

An information processing system is disclosed which includes a plurality of information processing modules each for performing information processing; a storage device installed in each of the information processing modules for storing display data; a transmission request acceptance device installed in each of the information processing modules for accepting a display data transmission request; a recognition device for determining whether display data corresponding to the transmission request is stored on the storage device installed in the information processing module including the transmission request acceptance device accepting the transmission request; a transfer device for transferring the transmission request to a different module, if the recognition device determines that the display data corresponding to the transmission request is not stored; a display data getting device for getting the display data from the storage device, if the recognition device determines that the display data is stored; and a display data transmission device for returning the display data gotten by the display data getting device to a party making the transmission request.

20 Claims, 48 Drawing Sheets

FIG. 18

```
┌─────────────────────────────────────────────────────┐
│ □                    BROWSER WINDOW               □ │
├─────────────────────────────────────────────────────┤
│ FORWARD   BACK   RELOAD   OPEN                      │
├─────────────────────────────────────────────────────┤
│ (COPY HOME PAGE)                                    │
│                                       ┌───────────┐ │
│ (STATE)         POWER SAVING          │A-COLOR 1234││
│                                       │           │ │
│ (PAPER)         AUTO                  │           │ │
│                                       │           │ │
│ (DOUBLE-SIDED)  SINGLE SIDED → SINGLE SIDED        │
│                                       │           │ │
│ (N IN 1)        1/1                   └───────────┘ │
│                                                     │
│ (STAPLER)       NOT USED                            │
│                                                     │
│         (ENGLISH TEXT)                              │
└─────────────────────────────────────────────────────┘
```

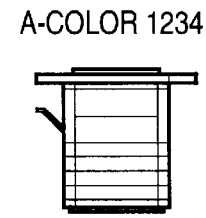

FIG. 19

| | | | |
|---|---|---|---|
| PAPER SELECTION | ● AUTO | | |
| TRAY 1 | ○ A4 (PORTRAIT) | ▨▨░░ | |
| TRAY 2 | ○ B4 | ▨░░░ | |
| TRAY 3 | ○ A3 | ░░░░ | |
| TRAY 4 | ○ A4 (LARGE CAPACITY) | ▨▨▨░ | |

ENGLISH TEXT    TO COPY HOME PAGE

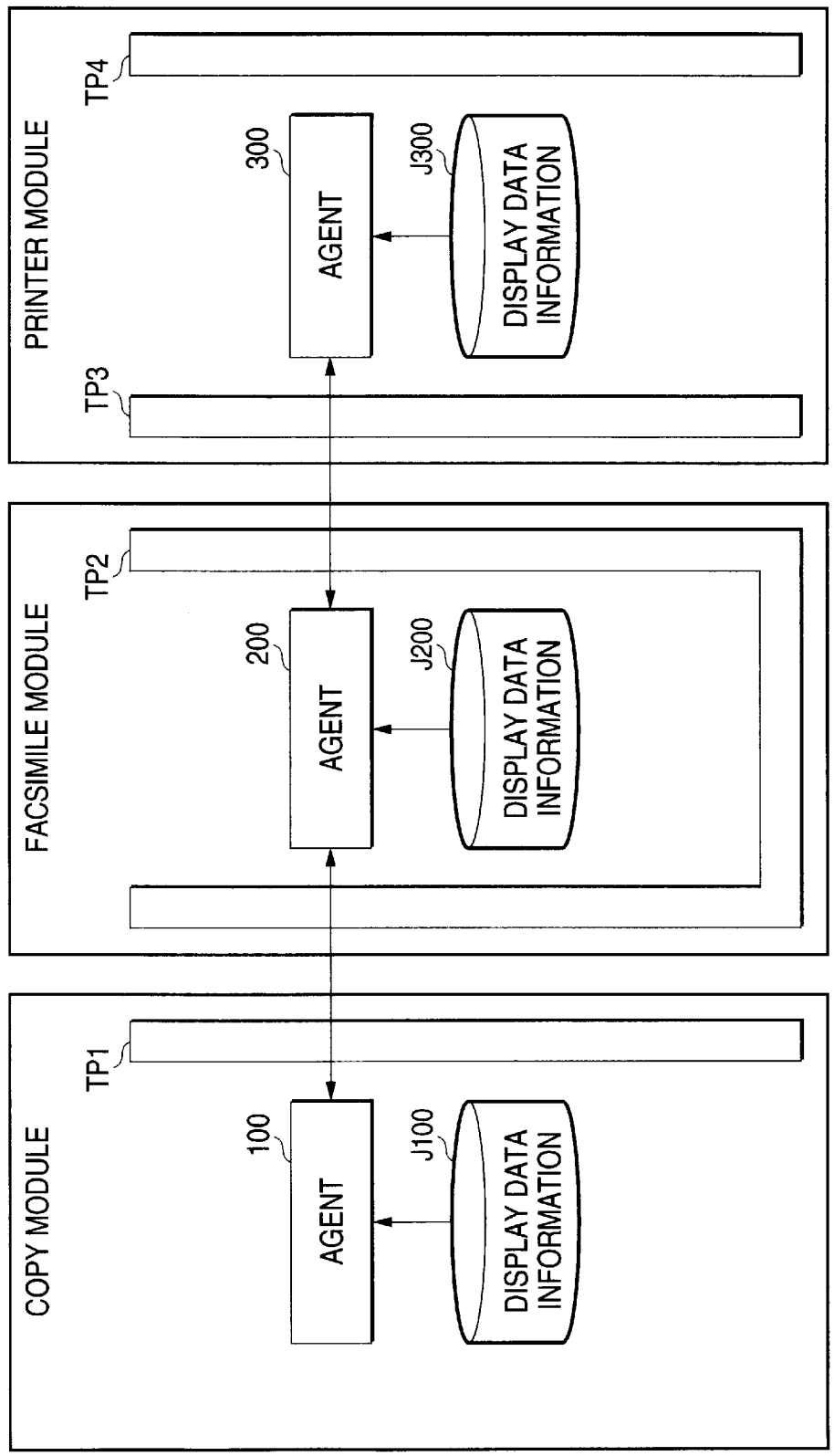

FIG. 42

| | BROWSER WINDOW | | | |
|---|---|---|---|---|
| FORWARD  BACK  RELOAD  OPEN | | | | |
| #012 | TANAKA | REPORT RECORD | 100 BYTES | CANCEL |
| #013 | TANAKA | MEMO | 200 BYTES | CANCEL |
| #014 | SUZUKI | SPECIFICATION | 300 BYTES | CANCEL |
| #015 | TANAKA | MEMO | 400 BYTES | CANCEL |

FIG. 43

| | BROWSER WINDOW | | | | |
|---|---|---|---|---|---|
| FORWARD  BACK  RELOAD  OPEN | | | | | |
| #012 | TANAKA | REPORT RECORD | 100 BYTES | CANCEL | REFERENCE |
| #013 | TANAKA | MEMO | 200 BYTES | CANCEL | REFERENCE |
| #014 | SUZUKI | SPECIFICATION | 300 BYTES | CANCEL | REFERENCE |
| #015 | TANAKA | MEMO | 400 BYTES | CANCEL | REFERENCE |

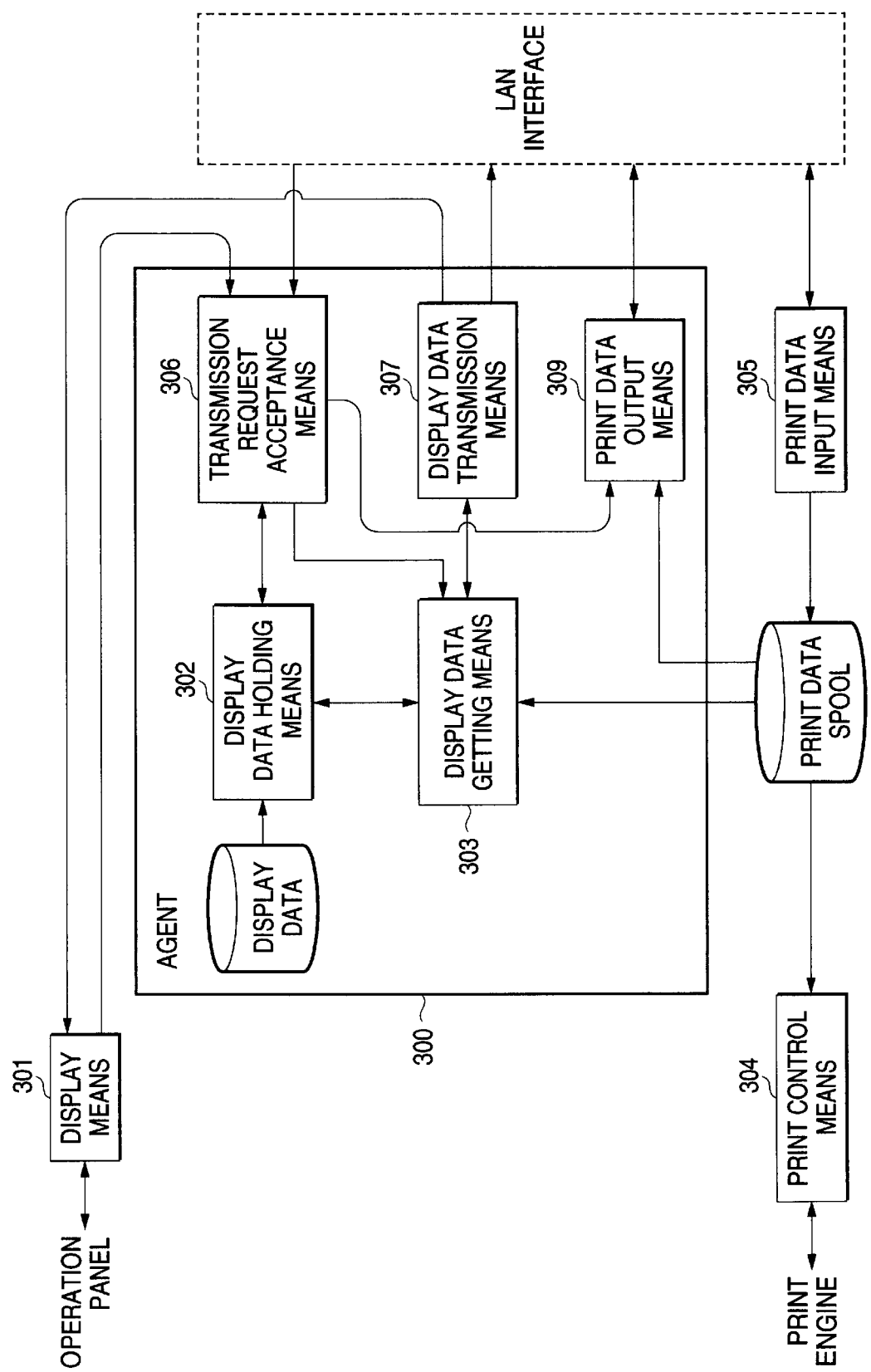

```
<HTML>
<HEAD>
<TITLE>Digital Copy Home</TITLE>
<BODY>
<FONT SIZE=5>Copy Home</FONT><P>
<img src="dc-icon.gif">
Copy functions : click
<a href="dc-func.htm">here</a><p>
<!X-INTERLINE TYPE="ref-icon">
</BODY>
</HTML>
```

FIG. 58

| NAME: | fax-ref |
|---|---|
| TYPE: | ref-icon |
| Html: | <a href="/fax/index.htm"> <img src="/fax/icon.gif"> </a> |
| NAME: | fax-ref |
| TYPE: | ref-icon |
| Html: | <a href="/prn/index.htm"> <img src="/prn/icon.gif"> </a> |

```
<HTML>
<HEAD>
<TITLE>Digital Copy Home</TITLE>
<BODY>
<FONT SIZE=5>Copy Home</FONT><P>
<img src="dc-icon.gif">
Copy functions : click
<a href="dc-func.htm">here</a><p>
<!X-INTERLINE TYPE="ref-icon">
<a href="/fax/index.htm"><img src="/fax/icon.gif"></a>
<a href="/prn/index.htm"><img src="/prn/icon.gif"></a>
</BODY>
</HTML>
```

RELATED ART

INFORMATION PROCESSING SYSTEM

This is a Division of application Ser. No. 09/085,046 filed May 27, 1998 now U.S. Pat. No. 6,438,589. The entire disclosure of the prior applications is hereby incorporated by reference herein in its entirety.

BACKGROUND OF THE INVENTION

This invention relates to an information processing system comprising a display section such as an operation panel for displaying setup information, etc., required for job execution.

Hitherto, considerable labor required for maintenance of software of an operation panel provided for an information processing system has resulted in a hindrance to function expansion of the information processing system.

Thus, an art is designed wherein software of using parameter data for operating an operation panel to control the operation panel is provided for making it possible to expand the functions of the operation panel of an information processing system simply by replacing the parameter data (the Unexamined Japanese Patent Application Publication No. Hei 7-56668, 6-243223, etc.,).

In recent years, a function for displaying and setting the state of an information processing system has been provided by a computer connected to a LAN (Local Area Network) as disclosed in the Unexamined Japanese Patent Application Publication No. Hei 5-89069, 7-219811, etc.

To provide the function, external code information defined by MIB (Managed Information Block), ISO 10175 DPA (Document Printing Application), etc., is transferred between the information processing system and the computer. To do this, code information conversion software is used to convert the external code information into internal information in the information processing system.

In this case, there is a problem that software that can interpret the external information needs to be installed in the computer. Then, an art is designed wherein a WWW (World Wide Web) server is installed in an information processing system and a protocol such as HTTP (Hyper Text Transport Protocol) is used to transmit display data that can be displayed by software generally installed in a computer, such as HTML (Hyper Text Markup Language).

By the way, a conventional information processing system is made up of a number of hardware modules. For example, a complex machine comprising a copy function (copy module), a facsimile function (facsimile module), and a printer function (printer module) is designed.

A hardware module of an additional function can be added to the main functions as the user desires, and a product satisfying the functions responsive to the application can be provided at a low price.

To add a new function to a printer, etc., an art of reading addition of setup items involved in the function addition from a file and forming a display screen is also disclosed in the Unexamined Japanese Patent Application Publication No. Hei 6-149490.

FIG. 61 is a block diagram to show a configuration example of a conventional complex machine. In the figure, a copy module M10, a facsimile module M20, a printer module M30, and a print engine E1 are hardware modules each having a CPU (central processing unit). In the example, an operation panel 11 does not comprise a CPU and is controlled by the CPU of the copy module M10.

This means that the copy module M10 is provided with an operation panel control section 11a as software of controlling the operation panel 11. The operation panel control section 11a controls setting and operation of a facsimile function and a printer function as well as a copy function.

FIG. 62 is a block diagram to show another configuration example of a conventional complex machine. The complex machine also comprises a copy module M10, a facsimile module M20, a printer module M30, and a print engine E1 like the complex machine shown in FIG. 61. An operation panel 11 comprises a CPU and is provided with an operation panel control section 11a for controlling setting and operation of a copy function, a facsimile function, and a printer function.

Code information defined by MIB, ISO 10175 DPA, etc., or code information proper to the complex machine manufacturer similar thereto is used as information transferred among the hardware modules in the complex machine.

However, in the art of replacing only the parameter data for operating the operation panel for expanding the operation section function of the information processing system, data in different formats, namely, the parameter data and the display data that can be displayed by software generally installed in a computer with a WWW server installed in the information processing system are used. Thus, the information processing system has the operation section parameter data and the computer display data separately and a problem of an increase in the data storage area occurs.

Moreover, since the information processing system has the operation section parameter data and the computer display data separately, the display contents on the operation section become different from those on the computer, and data maintenance for matching them requires considerable labor.

To make up an information processing system of hardware modules, in the configuration shown in FIG. 61, the copy module contains the operation panel control section for setting and operating the facsimile function and the printer function. Thus, to add a facsimile or printer module function or a new hardware module, the copy module software needs also to be replaced.

In the configuration shown in FIG. 62, the operation panel contains the operation panel control section for setting and operating the copy function, the facsimile function, and the printer function. Thus, to add a copy, facsimile, or printer module function or a new hardware module, it becomes necessary to replace the operation panel software.

Further, the information transferred between the hardware modules is coded. Thus, to add new information to any hardware module, the operation panel software needs to be changed. It is also possible to previously install many expected functions in the operation panel software to eliminate change in the operation panel software, but a problem of putting the software into a large scale occurs.

SUMMARY OF THE INVENTION

It is therefore an object of the invention to provide an information processing system wherein if a function or a hardware module is added, setup information required for a display section as the function or the hardware module is added can be easily added.

To the end, according to the invention of aspect 1, there is provided an information processing system comprising:
  a plurality of information processing modules each for performing information processing;
  storage means being installed in each of the information processing modules for storing display data;

transmission request acceptance means being installed in each of the information processing modules for accepting a display data transmission request;

recognition means for determining whether or not display data corresponding to the transmission request is stored on the storage means installed in the information processing module including the transmission request acceptance means accepting the transmission request;

transfer means for transferring the transmission request to a different module, if the recognition means determines that the display data corresponding to the transmission request is not stored;

display data getting means for getting the display data from the storage means, if the recognition means determines that the display data is stored; and display data transmission means for returning the display data gotten by the display data getting means to a party making the transmission request.

In the invention of aspect 2, the information processing system of aspect 1, further comprising:

identification information notification means being installed in one of the information processing modules for sending identification information of display data that can be gotten in the one information processing module to a different one of the information processing modules;

identification information reception means being installed in the different information processing module for receiving the identification information of display data that can be gotten in the one information processing module, sent by the identification information notification means; and identification information storage means being installed in the different information processing module for storing the identification information of display data that can be gotten in the one information processing module, received at the identification information reception means.

In the invention of aspect 3, the information processing system of aspect 2, wherein if display data accepted at the transmission request acceptance means is determined to be the display data that can be gotten in the different information processing module, stored on the identification information storage means, the display data request means transfers the transmission request to the different information processing module.

In the invention of aspect 4, the information processing system of aspect 2, wherein the identification information notification means sends the identification information of display data that can be gotten in the one information processing module and identification information of display data that can be gotten in the different information processing module, already stored.

In the invention of aspect 5, the information processing system of aspect 2, further comprising:

identification information response means for returning identification information of display data that can be gotten in the different information processing module and identification information of display data that can be gotten in any other information processing module than the one information processing module or the different information processing module to the one information processing module, if the identification information reception means receives identification information of display data that can be gotten in the one information processing module.

In the invention of aspect 6, the information processing system of aspect 2, wherein the identification information storage means checks whether or not sent identification information of display data that can be gotten in the different information processing module is already stored, and wherein the identification information storage means stores the identification information additionally, if the identification information is not stored.

In the invention of aspect 7, the information processing system of aspect 2, further comprising:

identification information renotification means, if the identification information reception means receives identification information of display data that can be gotten in different information processing module, for sending identification information of display data that can be gotten in the one information processing module and identification information of display data that can be gotten in the different information processing module, stored in the identification information storage means to any other information processing module than the information processing module sending the identification information received at the identification information reception means.

In the invention of aspect 8, the information processing system of aspect 1, further comprising:

partial display data notification means being installed in the one information processing module for sending partial display data information consisting of an area of the display data and quotation information required for quoting the display data area to the different information processing module;

partial display data reception means being installed in the different information processing module for receiving the partial display data information sent by the partial display data notification means;

partial display data storage means being installed in the different information processing module for storing the partial display data information received at the partial display data reception means; and display data combining means being installed in the different information processing module for combining the display data area having the matched quotation information in the display data areas stored in the partial display data storage means with the display data, if the quotation information is contained in the display data that can be gotten in the one information processing module.

In the invention of aspect 9, the information processing system of aspect 8, wherein the partial display data notification means sends the partial display data information generated by the one information processing module and the partial display data information generated by the different information processing module already stored.

In the invention of aspect 10, the information processing system of aspect 8, further comprising:

partial display data response means for returning the partial display data information generated by the different information processing module and partial display data information generated by any other information processing module than the one information processing module or the different information processing module to the one information processing module, if the partial display data reception means receives the partial display data information generated by the one information processing module.

In the invention of aspect 11, the information processing system of aspect 8, wherein the partial display data storage means checks whether or not the sent partial display data information generated by the one information processing module is already stored, and wherein if the partial display data information is not stored, the partial display data storage means stores the partial display data information additionally.

In the invention of aspect 12, the information processing system of aspect 8, further comprising:

partial display data renotification means, if the partial display data reception means receives partial display data information generated by different information processing module, for sending partial display data information generated by the one information processing module and partial display data information generated by the different information processing module, stored in the partial display data storage means to any other information processing module than the information processing module sending the partial display data information received at the partial display data reception means.

In the invention of aspect 13, the information processing system of aspect 1, further comprising:

identification information inquiry means being installed in the one information processing module for inquiring identification information of display data that can be gotten in a different one of the information processing modules, of the different information processing module; and identification information answer means being installed in the different information processing module for answering the inquiry made by the identification information inquiry means about the identification information of display data that can be gotten in the different information processing module.

In the invention of aspect 14, the information processing system of aspect 13, wherein if the inquired display data cannot be gotten, the identification information answer means transfers the inquiry to an information processing module other than the inquirer, and wherein identification information answer means in the information processing module other than the inquirer answers the transferred inquiry about the identification information.

In the invention of aspect 15, the information processing system of aspect 1, wherein the display data getting means generates display data containing information to reference display data that can be gotten from a different one of the information processing modules.

In the invention of aspect 16, the information processing system of aspect 1, further comprising:

communication means for enabling logical n-to-n communication by using a physical transmission medium for connecting the information processing modules in a one-to-one correspondence with each other.

In the invention of aspect 17, the information processing system of aspect 16, wherein the communication means enables communication between software members in the same information processing module.

In the invention of aspect 18, the information processing system of aspect 1, further comprising:

data storage means for storing print data, image data, or voice data, wherein the display data getting means generates display data containing list information of the data in the data storage means, list information of predetermined groups to which the data belongs, or reference information to the data.

In the invention of aspect 19, the information processing system of aspect 1, further comprising:

file storage means for storing a program file, a description file, or any other file, wherein the display data getting means generates display data containing list information of the files in the file storage means, list information of predetermined groups to which the files belong, or reference information to the files.

In the invention of aspect 20, the information processing system of aspect 1, wherein the display data getting means generates display data containing list information of files stored in an external system connected to the network, list information of predetermined groups to which the files belong, or reference information to the files.

In the invention of aspect 21, the information processing system of aspect 1, further comprising:

input means for reading a file stored in an external system connected to the network from the external system.

In the invention of aspect 22, the information processing system of aspect 21, further comprising:

file replacement means, if a different file having the same identification information as the file read through the file input means is stored in the file storage means, for replacing the different file with the read file, if a different file having the same identification information as the file read through the file input means is not stored in the file storage means, the file replacement means for storing the read file in the file storage means.

In the invention of aspect 23, the information processing system of aspect 21, further comprising:

file replacement means, if a different file having the same identification information as the file read through the file input means is stored in the file storage means, for replacing the different file with the read file, if a different file having the same identification information as the file read through the file input means is not stored in the file storage means, the file replacement means for discarding the read file.

In the invention of aspect 24, the information processing system of aspect 1, further comprising:

file storage means for storing a program file, a description file, or any other file;

file operation input means for inputting identification information of a file from an external system connected to the network and command information for adding, replacing, or deleting the file; and file information input means for inputting the file reference information to the file to be added or replaced if the command information is to add or delete.

In the invention of aspect 25, the information processing system of aspect 1, further comprising:

display data holding control means for managing display data stored on an external storage medium added to the information processing module.

In the invention of aspect 26, the information processing system of aspect 1, wherein the storage means is for storing a source data of display data; and the display data getting means generates display data from the source data.

In the information processing system of aspect 1, display data described in a format that can be displayed on an external system connected to the network is stored in the storage means, thus the display data read by the display data getting means from the storage means is displayed on the display section, whereby the same contents as displayed on the external system can be displayed.

In the information processing system of aspect 2, the identification information notification means installed in one information processing module sends identification information of display data that can be gotten in the one information processing module to a different information processing module, the identification information reception means installed in the different information processing module receives the identification information, and the identification information storage means stores the identification information, whereby the different information processing module can know the display data that can be gotten in the one information processing module.

In the information processing system of aspect 3, if the display data accepted at the transmission request acceptance means is display data that can be gotten in the different information processing module, the display data request means can transfer the transmission request to the different information processing module.

In the information processing system of aspect 4, the identification information notification means sends the identification information of display data that can be gotten in the one information processing module and identification information of display data that can be gotten in different information processing module, already stored. Thus, the information processing module to which the identification information is sent can know the display data that can be gotten in a number of information processing modules.

In the information processing system of aspect 5, the identification information response means returns identification information of display data that can be gotten in the different information processing module and identification information of display data that can be gotten in any other information processing module than the one information processing module or the different information processing module to the one information processing module, so that the one information processing module can know the display data that can be gotten in a number of information processing modules.

In the information processing system of aspect 6, only if the sent display data identification information is not yet recorded, it is recorded in the identification information storage means additionally.

In the information processing system of aspect 7, the identification information renotification means sends identification information of display data that can be gotten in the one information processing module and identification information of display data that can be gotten in the different information processing module, stored in the identification information storage means to any other information processing module than the information processing module sending the identification information. That information processing module can know display data that can be gotten in other information processing modules.

In the information processing system of aspect 8, the partial display data notification means installed in the one information processing module sends partial display data information consisting of partial display data generated in the one information processing module and quotation information of the partial display data to the different information processing module, the partial display data reception means installed in the different information processing module receives the partial display data information, and the partial display data storage means stores the partial display data information, whereby the different information processing module can know the partial display data generated in the one information processing module.

In the information processing system of aspect 9, the partial display data notification means sends the partial display data information generated by the one information processing module and the partial display data information generated by different information processing module already stored, so that the information processing module to which the partial display data information is sent can know the partial display data generated by a number of information processing modules.

In the information processing system of aspect 10, the partial display data response means returns the partial display data information generated by the different information processing module and partial display data information generated by any other information processing module than the one information processing module or the different information processing module to the one information processing module, so that the one information processing module can know the partial display data generated by a number of information processing modules.

In the information processing system of aspect 11, only if the sent partial display data information is not yet recorded, it is recorded in the partial display data storage means additionally.

In the information processing system of aspect 12, the partial display data renotification means sends partial display data information generated by the one information processing module and partial display data information generated by the different information processing module, stored in the partial display data storage means to any other information processing module than the information processing module sending the partial display data information. That information processing module can know partial display data generated by other information processing modules.

In the information processing system of aspect 13, the identification information inquiry means installed in the one information processing module inquires identification information of display data that can be gotten in a different information processing module, and the identification information answer means installed in the different information processing module answers the inquiry, thus the one information processing module can receive identification information of display data that can be gotten in the different information processing module as required.

In the information processing system of aspect 14, if the inquired display data cannot be gotten, the identification information answer means transfers the inquiry to an information processing module other than the inquirer, and the identification information answer means in the information processing module other than the inquirer answers the transferred inquiry about the identification information. Thus, necessary identification information can be gotten through the information processing modules in sequence.

In the information processing system of aspect 15, the display data getting means generates display data containing information to reference display data that can be gotten from a different information processing module. Thus, the reference information can be used to get the display data from the different information processing module only when necessary.

In the information processing system of aspect 16, the communication means enables logical n to n communication by using a physical transmission medium for connecting the information processing modules in a one-to-one correspondence with each other; display data transfer and any other control can be performed among the information processing modules.

In the information processing system of aspect 17, the communication means enables communication between software members in the same information processing module; data communication in the same information processing module and data communication with any other information processing module can be executed by the same method.

In the information processing system of aspect 18, the data storage means stores print data, image data, or voice data, and the display data getting means generates display data containing list information of the data in the data storage means, list information of predetermined groups to which the data belongs, or reference information to the data. Thus, a received data list, a group list, or reference information can be displayed on the display section.

In the information processing system of aspect 19, the file storage means stores a program file, a description file, or any other file, and the display data getting means generates display data containing list information of the files in the file storage means, list information of predetermined groups to which the files belong, or reference information to the files. Thus, a received file list, a group list, or reference information can be displayed on the display section.

In the information processing system of aspect 20, the display data getting means generates display data containing list information of files stored in an external system connected to the network, list information of predetermined groups to which the files belong, or reference information to the files, so that the data stored in the external system connected to the network can be displayed on the display section in the information processing system.

In the information processing system of aspect 21, the input means reads a file stored in an external system connected to the network from the external system. Thus, a display file generated by the external system is read into the information processing system through the network and can be displayed on the display section.

In the information processing system of aspect 22, the file replacement means enables the information processing system to have the same file as the file having the same identification information stored in an external system.

In the information processing system of aspect 23, the file replacement means replaces only the file having the same identification information stored in an external system with the same file.

In the information processing system of aspect 24, the file storage means stores a program file, a description file, or any other file, the file operation input means inputs identification information of a file from an external system connected to the network and command information for adding, replacing, or deleting the file, and the file information input means inputs the file reference information to the file to be added or replaced if the command information is to add or delete. Thus, the information processing system can be set from the external system.

In the information processing system of aspect 25, the display data holding control means manages display data stored on an external storage medium added to the information processing module. Thus, to add a function by using an external storage medium, it can also be handled as display data is held internally.

BRIEF DESCRIPTION OF THE DRAWINGS

In the accompanying drawings:

FIG. 18 an illustration to show a display example;

FIG. 19 an illustration to show another display example;

FIG. 20 is a software block diagram according to a fourth embodiment of the invention;

FIG. 42 is an illustration to show a display example;

FIG. 43 is an illustration to show another display example;

FIG. 44 is a software block diagram according to a ninth embodiment of the invention;

FIG. 52 is a processing flowchart applied when power of an active module is turned on;

FIG. 53 is a processing flowchart applied when power of a passive module is turned on;

FIG. 58 is an illustration to show an example of partial display data information;

DETAILED DESCRIPTION OF THE PREFERRED EMBODIMENTS

Figure 1:
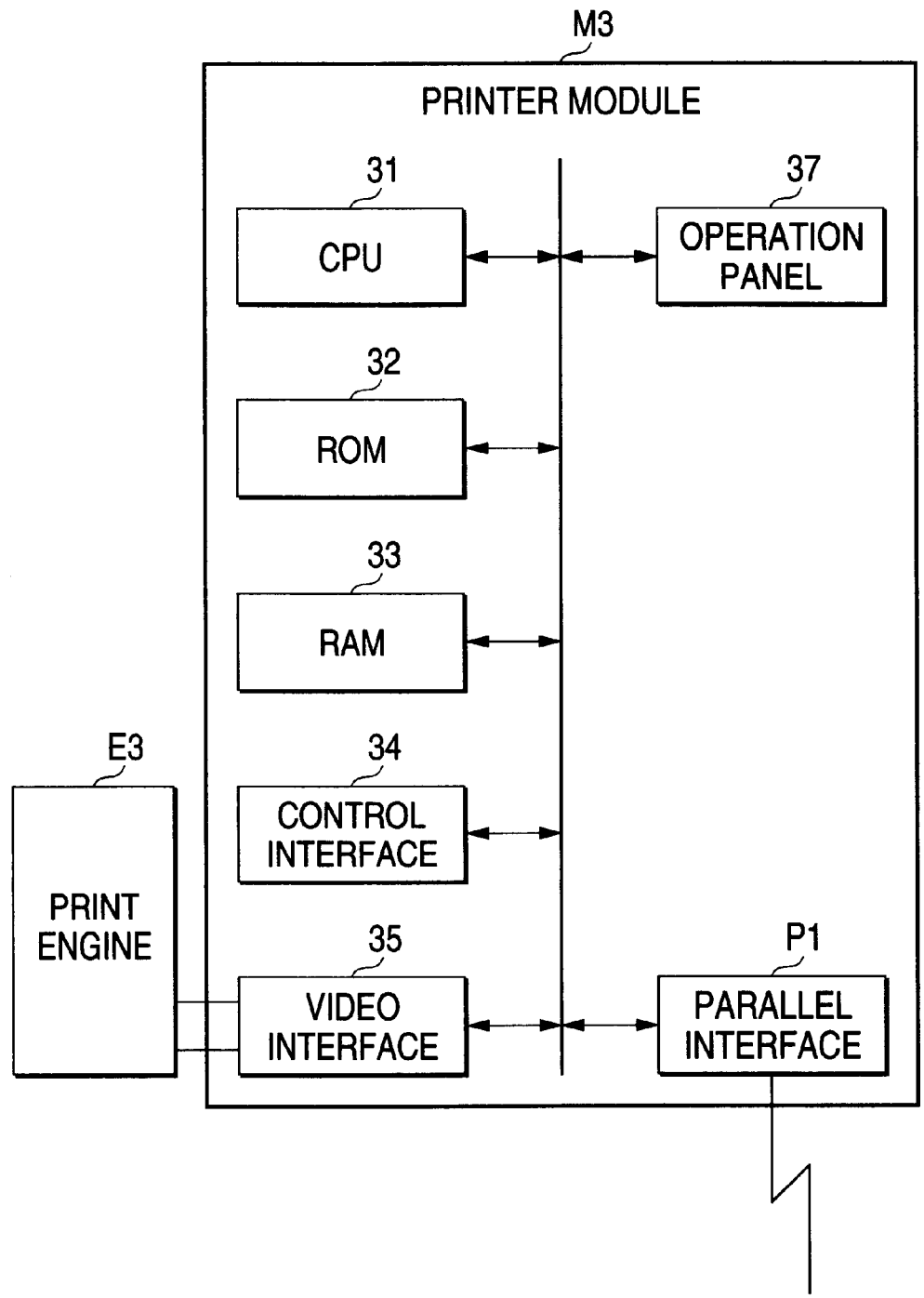
FIG. 1 is a hardware block diagram according to a first embodiment of the invention.

Referring now to the accompanying drawings, there are shown preferred embodiments of information processing systems of the invention. FIG. 1 is a hardware block diagram of an information processing system according to a first embodiment of the invention. Here, a printer is used as the information processing system. That is, the printer is provided with a printer module M3 for performing predetermined printing by a print engine E3 based on data received via a parallel interface PI from an external system such as a computer.

A CPU 31 of the printer module M3 executes control software of the printer module M3 stored in a ROM (read-only memory) 32. A RAM (random access memory) 33 stores work data at the control software execution time. A control interface 34 outputs image data to the print engine E3. An operation panel 37 is used to set a printer function, enter a control command, and display the state of the information processing system.

Figure 2:
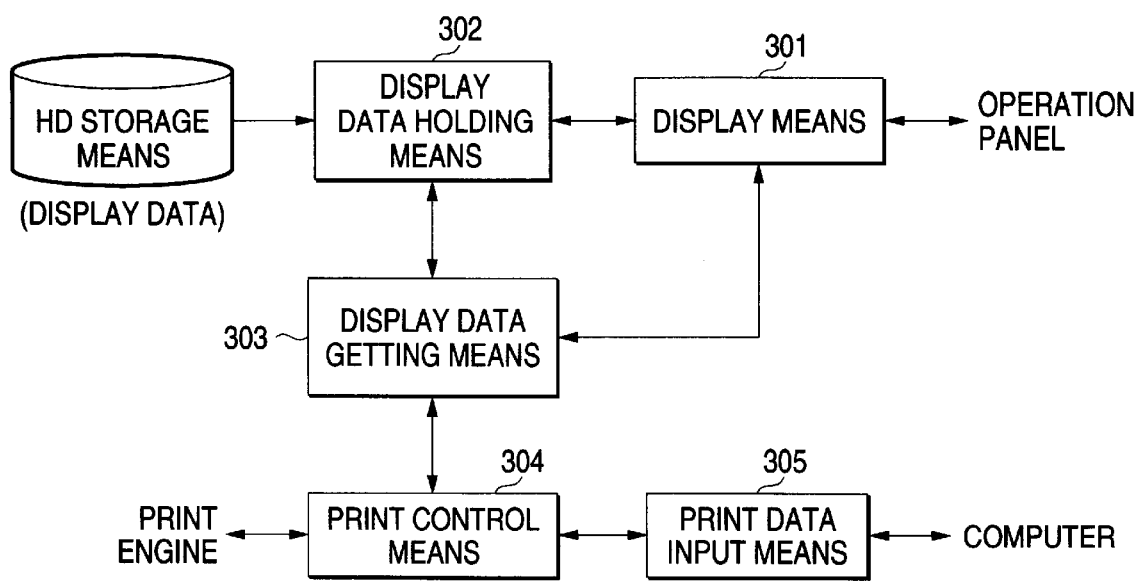
FIG. 2 is a software block diagram according to the first embodiment of the invention.

FIG. 2 is a software block diagram according to the information processing system of the first embodiment of the invention. That is, the software is made up of display means 301 for displaying display data on the operation panel, display data holding means 302 for managing display data stored on storage means HD, display data getting means 303 for getting display data based on a predetermined command, print control means 304 for controlling the print engine, and print data input means 305 for inputting print data from a computer.

Figure 3:
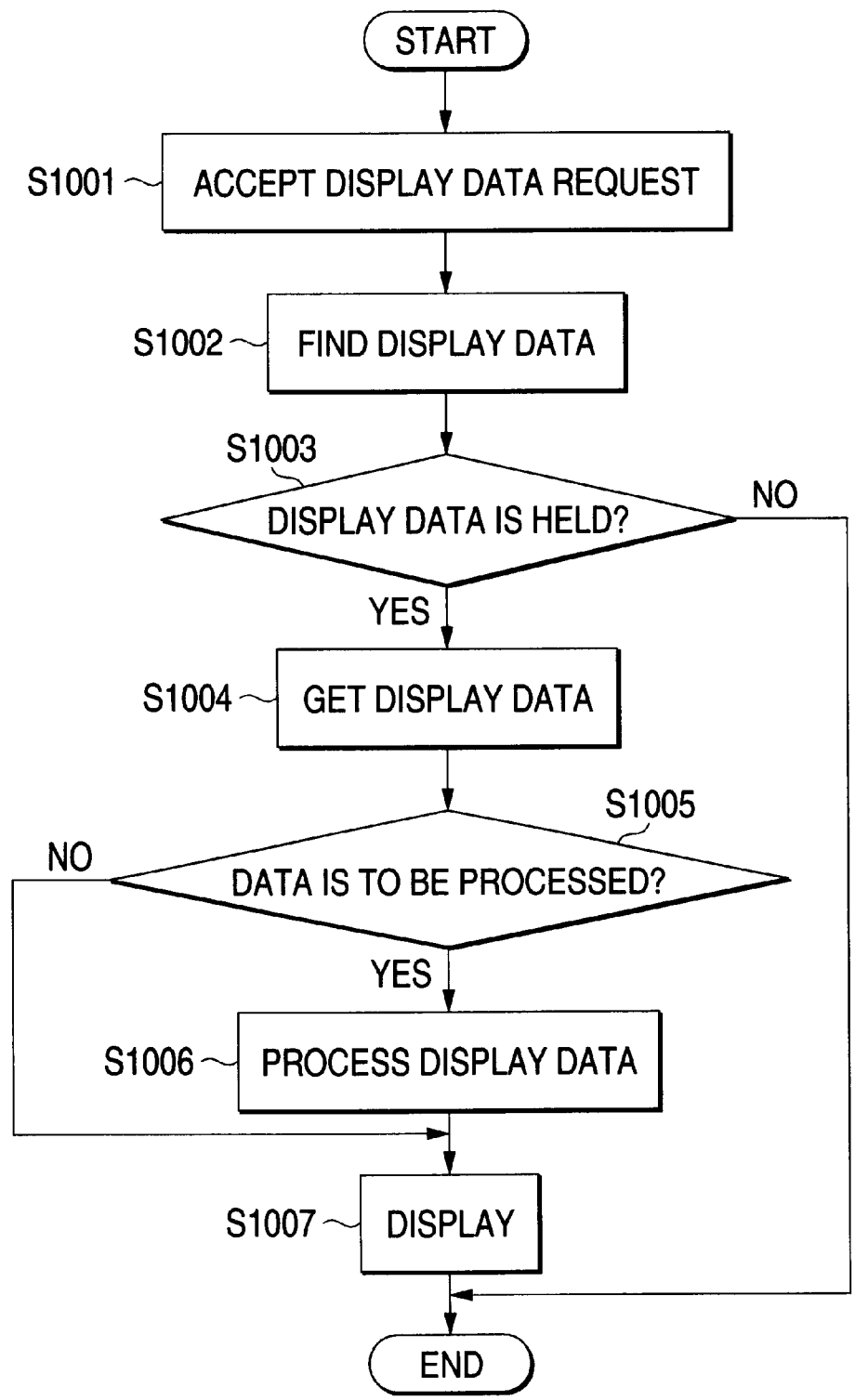
FIG. 3 is a processing flowchart.

Processing of the means making up the software shown in FIG. 2 will be discussed with reference to a flowchart of FIG. 3. First, the display means 301 accepts a display data request entered on the operation panel at step S1001. At this time, the display means 301 gets the type of key input through the operation panel and interprets it as a display data request corresponding thereto.

In the interpretation procedure, the request is interpreted in response to the current contents displayed on the operation panel; for different display although the same key is input, the request is interpreted in response to the display contents. If the operation panel is a touch panel, the input coordinates and the display contents are considered and the input is interpreted as a display data request.

Next, a check is made to see if the display data holding means 302 holds display data at step S1002. The display data is described in a format of HTML, etc., that can be displayed by software (browser) generally installed in an external system such as a computer connected to a network.

If it is not determined at step S1003 that the display data is held, the process is terminated. If it is determined at step S1003 that the display data is held, the display data getting means 303 reads the display data from the display data holding means 302.

Next, the display data getting means 303 determines whether or not the requested display data is display data requiring processing such as incorporating of dynamic contents of the printer state (current processing state), etc., at step S1005. If it, is determined at step S1005 that the display data requires processing, the display data getting means 303 processes the display data gotten from the display data holding means 302. If it is not determined at step S1005 that the display data requires processing, control goes to step S1007.

At step S1007, the display means 301 converts the display data into code that can be displayed on the operation panel and displays it on the operation panel. Here, various display systems of a character system, bit a map system, etc., can be applied to the operation panel; the display means 301 generates the code fitted to the display system applied to the operation panel.

The display data is thus described in the format of HTML, etc., that can be displayed by software (browser) generally installed in an external system such as a computer, whereby the same display data can be used with the printer and the external system and the same display as the operation panel of the printer can be produced on the external system such as a computer.

Figure 4:
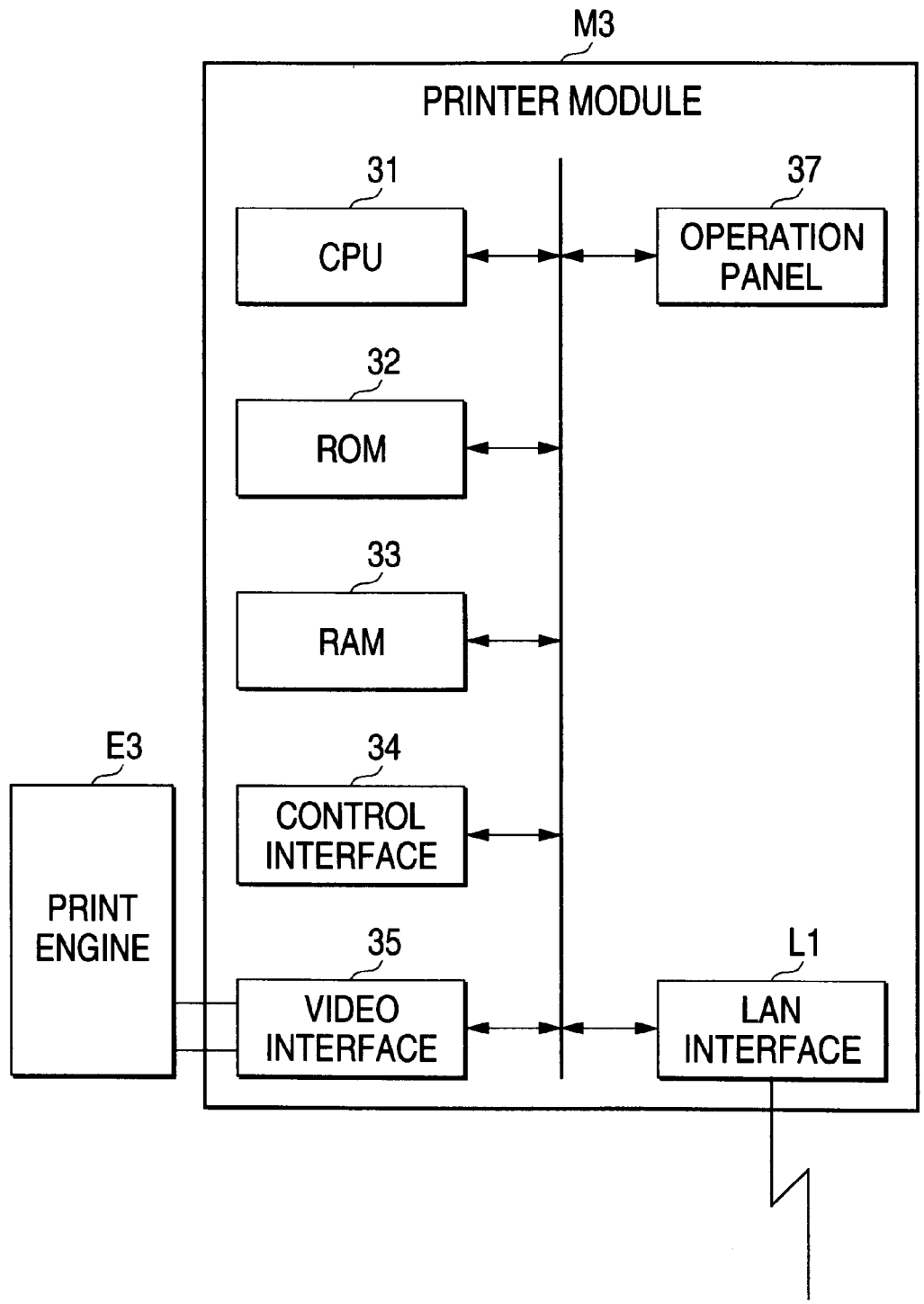
FIG. 4 is a hardware block diagram according to a second embodiment of the invention.

Next, a second embodiment of an information processing system of the invention will be discussed. FIG. 4 is a hardware block diagram of the information processing system according to the second embodiment of the invention. Here, a printer is used as the information processing system. The information processing system of the second embodiment comprises a printer module M3, a CPU 31, a ROM 32, a RAM 33, a control interface 34, a video interface 35, a print engine E3, and an operation panel 37 like the information processing system of the first embodiment, but they differ in that the information processing system of the second embodiment comprises a LAN interface LI as an interface with an external system such as a computer.

Figure 5:
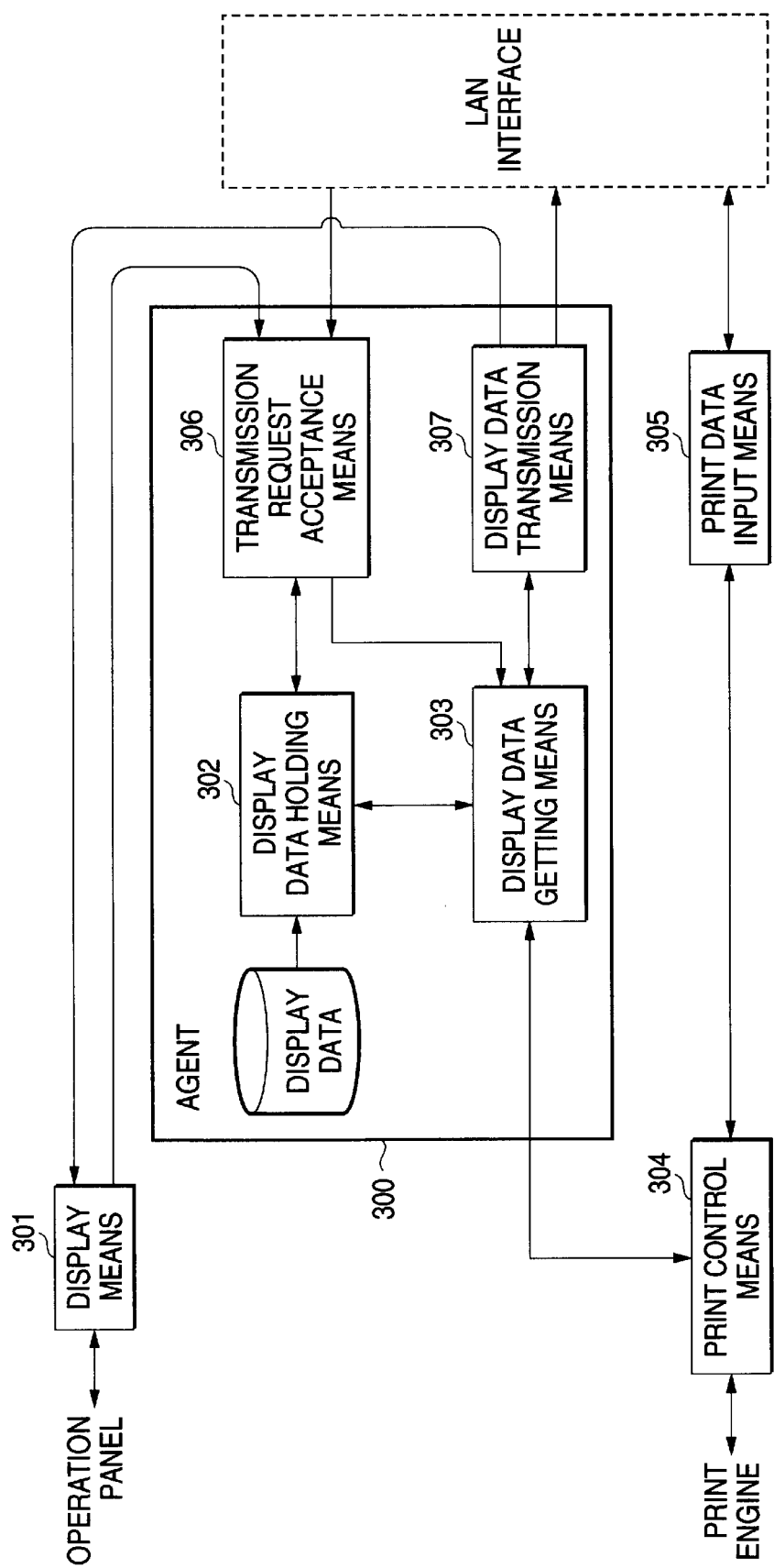
FIG. 5 is a software block diagram according to the second embodiment of the invention.

FIG. 5 is a software block diagram according to the information processing system of the second embodiment of the invention. That is, the software is made up of display means 301, an agent 300 consisting of display data holding means 302, display data getting means 303, transmission request acceptance means 306, and display data transmission means 307, print control means 304, and print data input means 305.

Figure 6:
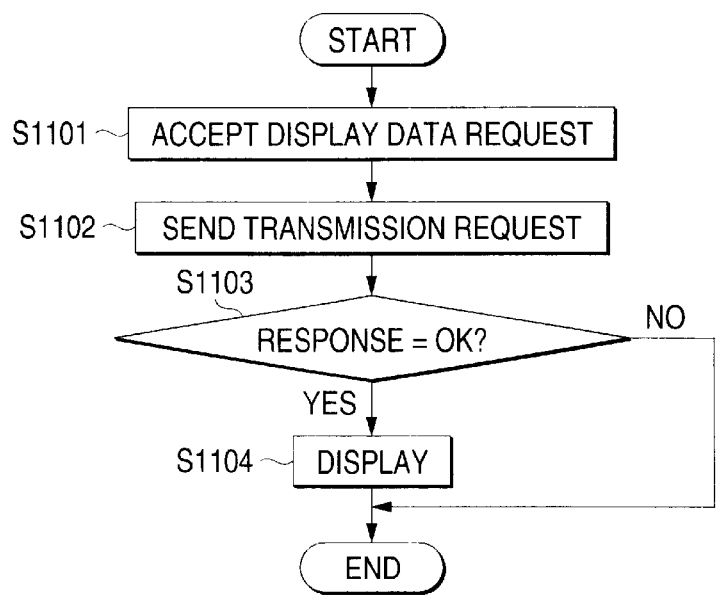
FIG. 6 is a processing flowchart.

Processing of the means making up the software shown in FIG. 5 will be discussed with reference to a flowchart of FIG. 6. First, the display means 301 accepts a display data request entered on the operation panel at step S1101. Next, the display means 301 transmits a display data transmission request to the agent 300 at step S1102. If the agent 300 responds to the request with an error at step S1103 (No), the process is terminated. On the other hand, if the agent 300 responds to the request with display data at step S1103 (Yes), the display means 301 displays the display data on the operation panel.

The display data is described in a format of HTML, etc., that can be displayed by software (browser) generally installed in an external system such as a computer connected to a network.

Figure 7:
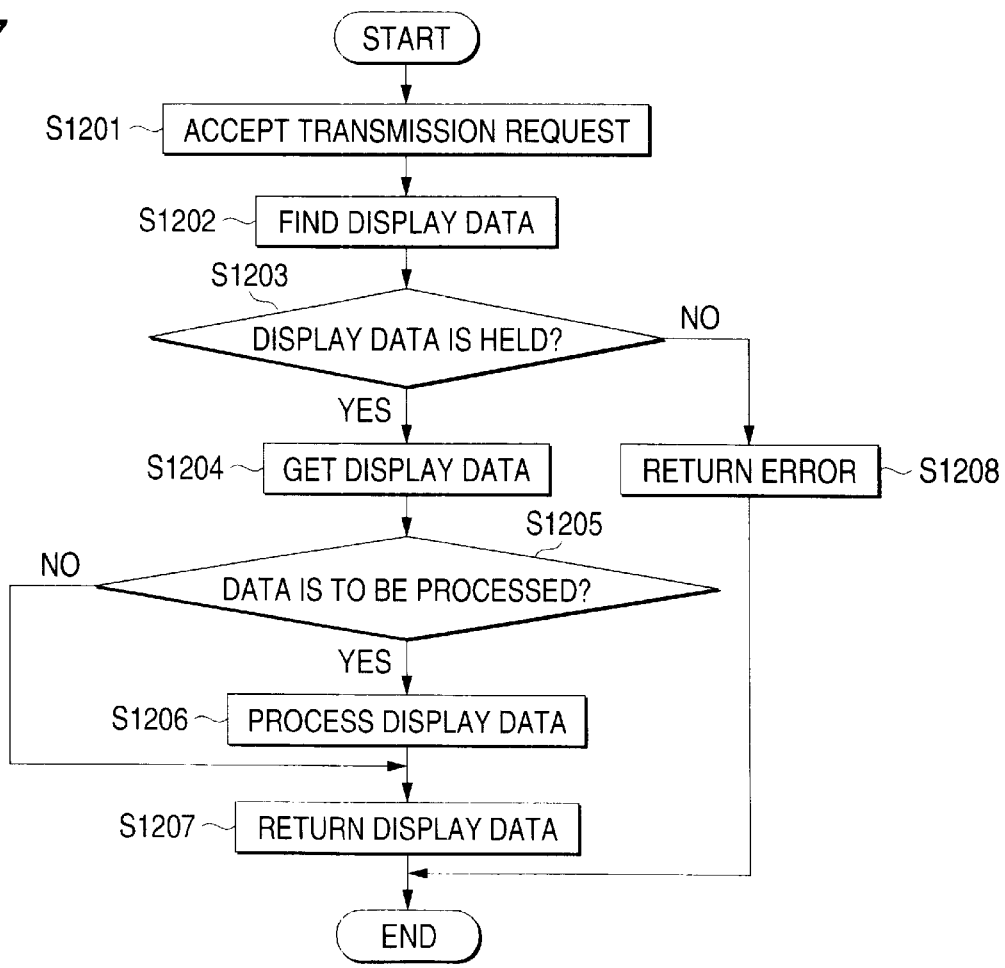
FIG. 7 is a processing flowchart of an agent.

FIG. 7 is a flowchart to describe processing of the agent 300. First, the transmission request acceptance means 306 accepts a display data transmission request from the display means 301 or an external system such as a computer connected to a LAN at step S1201.

Next, a check is made to see if the display data holding means 302 holds display data at step S1202. If it is not determined at step S1203 that the display data is held, control goes to step S1208 at which an error is returned to the display data transmission requester. If it is determined at step S1203 that the display data is held, the display data getting means 303 reads the display data from the display data holding means 302 at step S1204.

Next, the display data getting means 303 determines whether or not the requested display data is display data requiring processing such as incorporating of dynamic contents of the printer state (current processing state), etc., at step S1205. If it is determined at step S1205 that the display data requires processing, the display data getting means 303 processes the display data gotten from the display data holding means 302. If it is not determined at step S1205 that the display data requires processing, control goes to step S1207.

At step S1207, the display data transmission means 307 returns the display data or the processed display data to the display data transmission requester, which then can obtain the display data described in a general display format (for example, HTML) via the LAN and can reference the display data by software (browser) installed in an external system such as a computer.

In the embodiment, the display operation of the display data has been described. To input setup information, the transmission request acceptance means 306 of the agent 300 receives setup information as it accepts a display data transmission request, and passes the setup information to the print control means 304.

The transmission request acceptance means 306 receives print data reference information like the setup information. Data in another computer, etc., is referenced by the print data input means 305 via the LAN and printing is performed by using the print control means 304. Here, URL (Uniform Resource Locator), etc., is used as the reference information.

The display data holding means 302 may reference data stored in a computer connected to the LAN or display data stored on an external storage medium of the printer module, such as an IC card.

Figure 8:
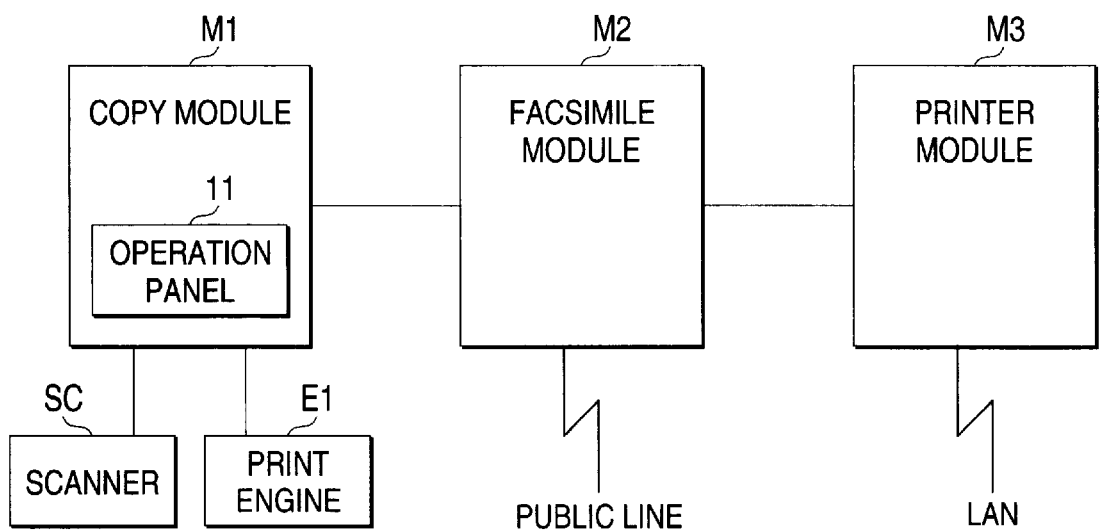
FIG. 8 is a system block diagram according to a third embodiment of the invention.

Next, a third embodiment of an information processing system of the invention will be discussed. FIG. 8 is a block diagram of the information processing system according to the third embodiment of the invention. Here, the information processing system is made up mainly of three hardware modules of a copy module M1, a FAX (facsimile) module M2, and a printer module M3.

That is, the copy module M1 is a hardware module for controlling a copy function, the FAX module is a hardware module for controlling a FAX function, and the printer module M3 is a hardware module for controlling a print function.

The copy function outputs an image read by the copy module M1 through a scanner SC to a print engine E1. The FAX transmission function transmits an image read by the FAX module M2 through the scanner SC via the copy module M1 to a public line. The FAX reception function outputs an image received by the FAX module M2 over the public line to the print engine E1 via the copy module M1.

The print function converts a print command received by the printer module M2 over a LAN into image data and outputs the image data to the print engine E1 via the FAX module M2 and the copy module M1.

In the embodiment, an operation panel 11 is contained in the copy module M1 and is used to set the copy function, the FAX function, and the print function and display a control command and the state of the information processing system.

Therefore, to set the printer module M3 through the operation panel 11, setup information is transferred from the copy module M1 via the FAX module M2 to the printer module M3. In contrast, to display the state of the printer module M3 on the operation panel 11, state information is transferred from the printer module M3 via the FAX module M2 to the operation panel 11 contained in the copy module M1.

To set the copy module M1 from an external system such as a computer connected to the LAN, setup information is transferred from the printer module M3 via the FAX module M2 to the copy module M1. In contrast, to display the state of the copy module M1 on an external system such as a computer connected to the LAN, state information is transferred from the copy module M1 via the FAX module M2 to the printer module M3.

Figure 9:
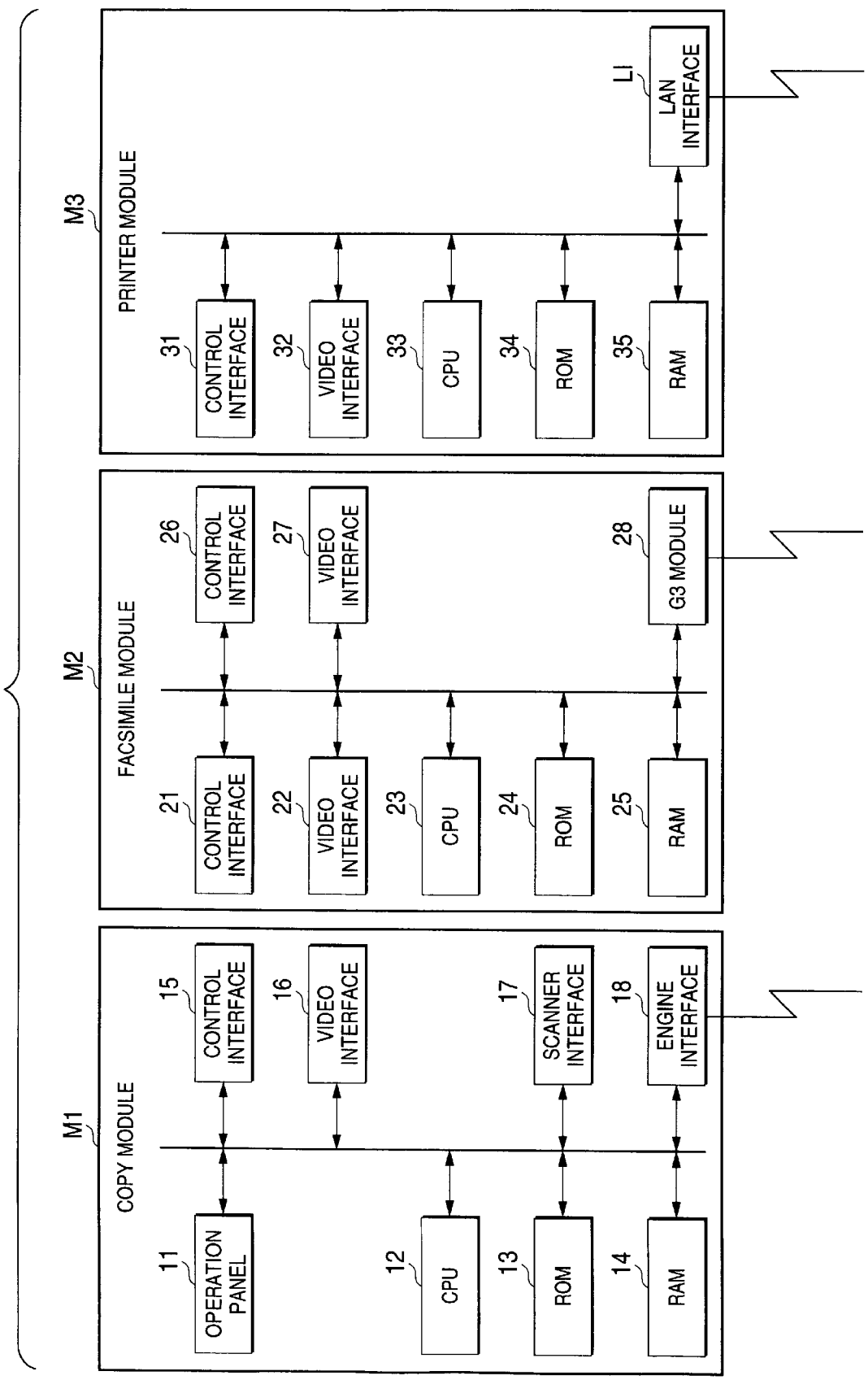
FIG. 9 is a hardware block diagram according to the third embodiment of the invention.

FIG. 9 is a hardware block diagram of the information processing system according to the third embodiment. That is, the copy module M1 is made up of the above-mentioned operation panel 11, a CPU 12, a ROM 13, a RAM 14, a control interface 15, a video interface 16, a scanner interface 17, and an engine interface 18.

The FAX module M2 is made up of control interfaces 21 and 26, video interfaces 22 and 27, a CPU 23, a ROM 24, a RAM 25, and a G3 module 28.

The printer module M3 is made up of a control interface 31, a video interface 32, a CPU 33, a ROM 34, a RAM 35, and a LAN interface LI.

The copy module M1 and the FAX module M2 are connected by the control interfaces 15 and 21 and the video interfaces 16 and 22. The FAX module M2 and the printer module M3 are connected by the control interfaces 26 and 31 and the video interfaces 27 and 32.

In the copy module M1 of the configuration, the operation panel 11 is used to set the copy function, the FAX function, and the printer function, enter a control command, and display the state of the information processing system. The CPU 12 executes copy module control software stored in the ROM 13. The RAM 14 stores work data at the control software execution time. The control interface 15 transfers control data to and from the adjacent FAX module M2.

Further, the video interface 16 transfers image data to and from the FAX module M2. The scanner interface 17 performs read processing of an image from the scanner SC. The engine interface 18 sends image data to the print engine E1.

In the FAX module M2, the control interface 21 transfers control data to and from the adjacent copy module M1. The video interface 22 transfers image data to and from the adjacent copy module M1. The CPU 23 executes FAX module M2 control software stored in the ROM 24. The RAM 25 stores work data at the control software execution time.

The control interface 26 transfers control data to and from the adjacent printer module M3. The video interface 27 transfers image data to and from the adjacent printer module M3. The G3 module 28 transmits and receives a facsimile image.

In the printer module M3, the control interface 31 transfers control data to and from the adjacent FAX module M2. The video interface 32 transfers image data to and from the adjacent FAX module M2.

The CPU 33 executes printer module M3 control software stored in the ROM 34. The RAM 35 stores work data at the control software execution time. The LAN interface LI communicates with an external system such as a computer connected to the LAN.

Figure 10:
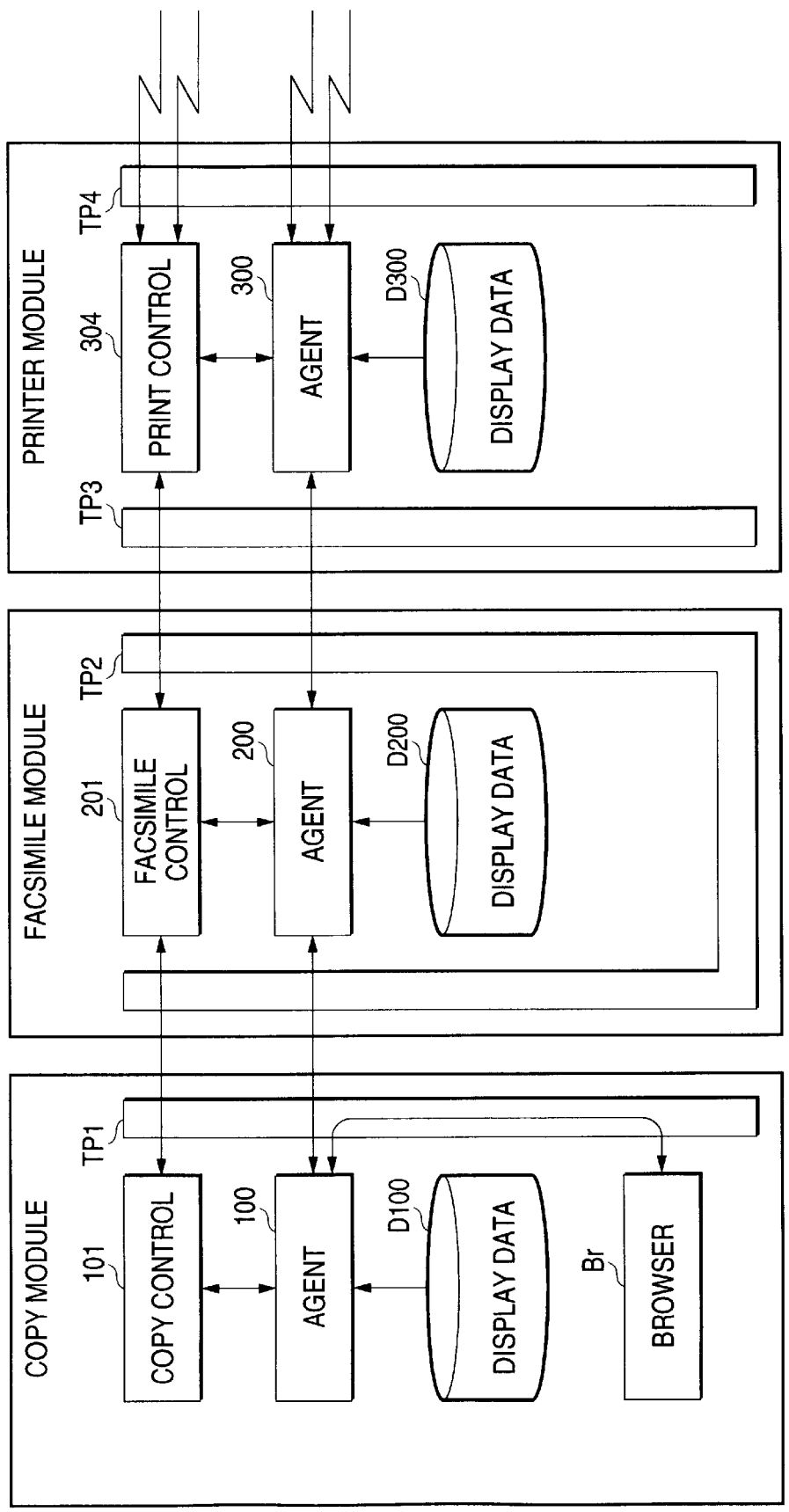
FIG. 10 is a software block diagram according to the third embodiment of the invention.

FIG. 10 is a software block diagram of the information processing system according to the third embodiment. That is, copy control 101 in the copy module controls input of image data from the scanner, input/output of image data from/to the FAX module, and output of image data to the print engine.

FAX control 201 in the FAX module controls input/output of image data from/to the copy module and the printer module, facsimile transmission of image data, and conversion of received facsimile data to internal image data.

Print control 304 in the printer module controls reception of print data from the LAN and conversion of the received print data to image data, input of image data from the FAX module, and transmission of image data to the LAN.

Each of agents 100, 200, and 300 installed in the modules comprises transmission request acceptance means, display data holding means, display data getting means, display data request means, and display data transmission means described later.

Display data D100, D200, and D300 are stored in the ROMs and are read by the agents 100, 200, and 300 respectively. The display data is described in a format of HTML, etc., that can be displayed by software (browser) generally installed in an external system such as a computer connected to the LAN as in the preceding embodiments.

A browser Br is adapted to display the display data in a format of HTML, etc., gotten through the agent 100 on the operation panel.

Each of transports TP1, TP2, and TP3 installed in the modules is communication means for executing communication between the modules. That is, the transports TP1, TP2, and TP3 control transmission control means of communication for multiplexing a physical one-to-one transmission medium connecting the copy and FAX modules and connecting the FAX and printer modules to logical n to n. An example of this protocol is IEEE802.2, etc. Further, another transport TP4 installed in the printer module controls transmission control means of communication via the LAN.

Figure 11:
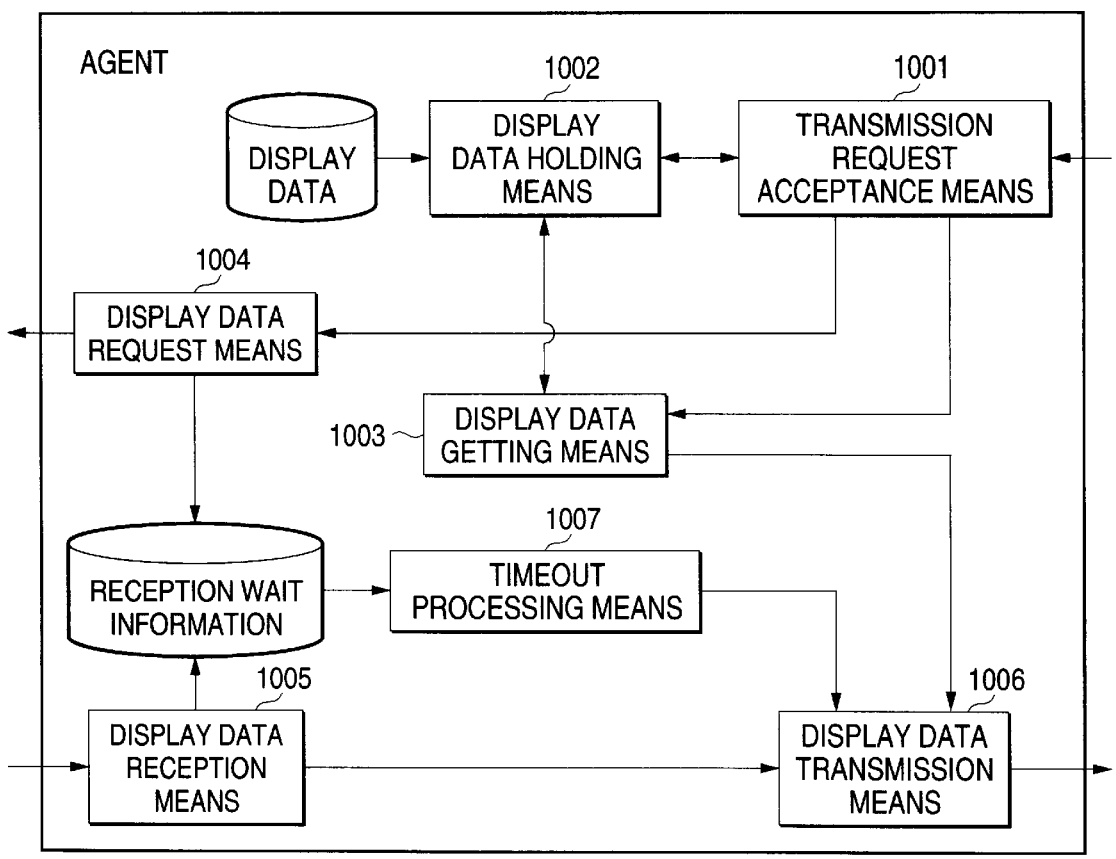
FIG. 11 is a software block diagram of an agent.
Figure 12:
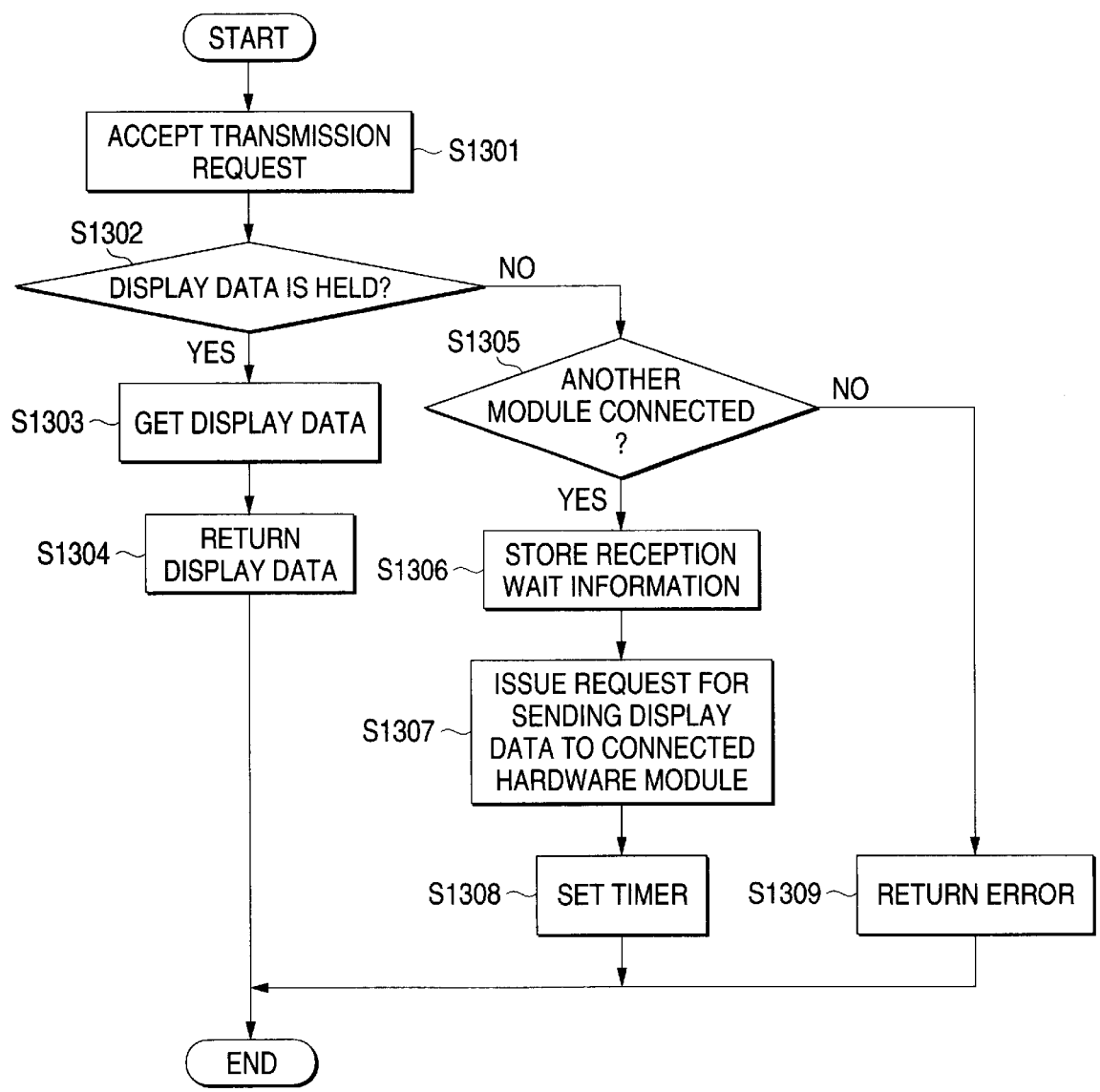
FIG. 12 is an agent processing flowchart (No.1)
Figure 13:
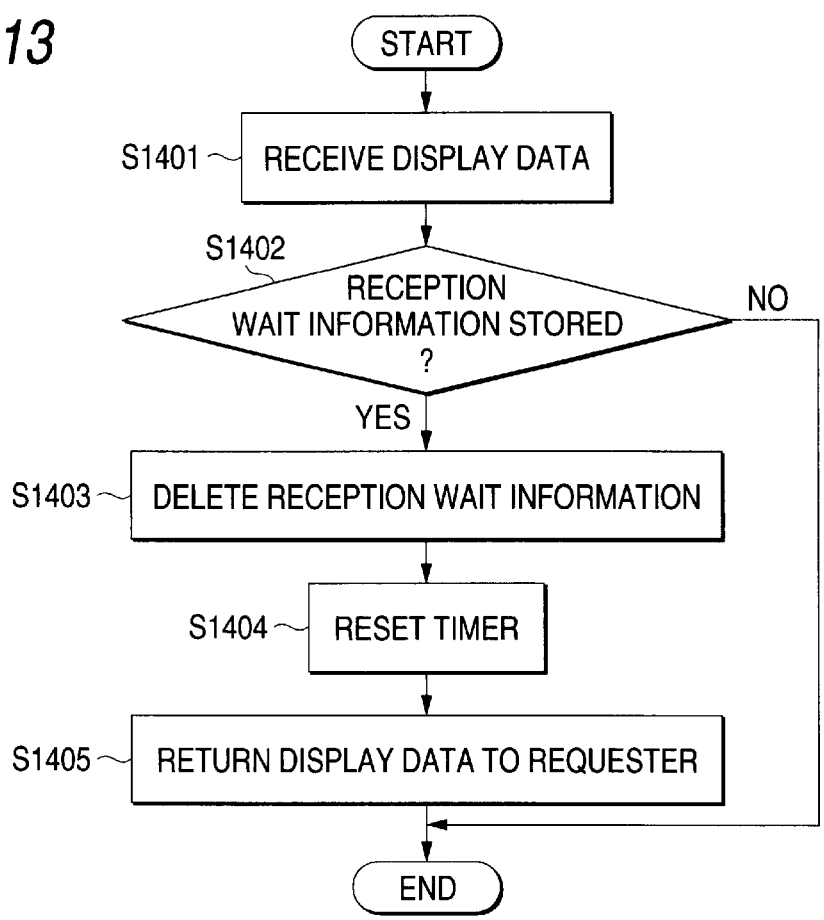
FIG. 13 is an agent processing flowchart (No.2)
Figure 14:
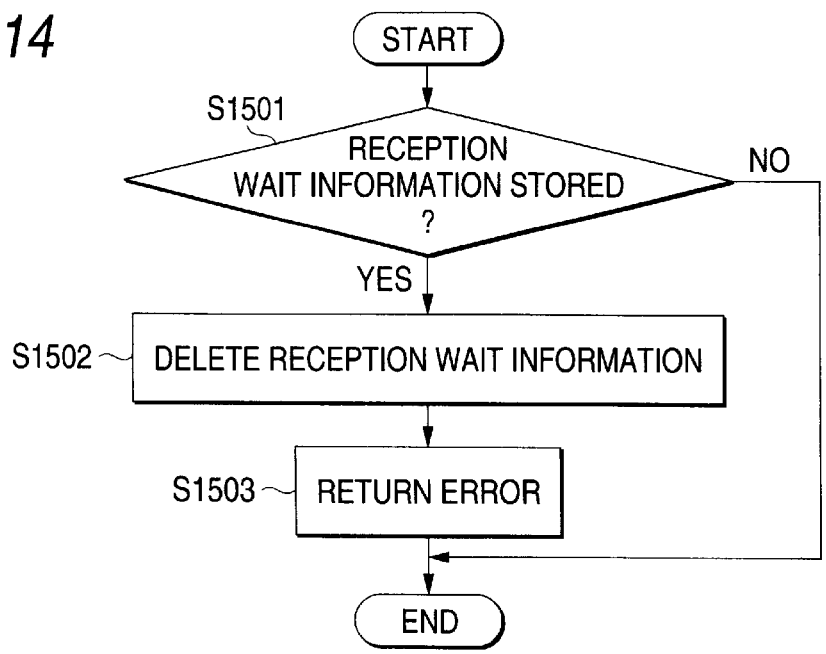
FIG. 14 is an agent processing flowchart (No.3)

FIG. 11 is a software block diagram of each of the agents installed in the modules. FIG. 12 to FIG. 14 are operation flowcharts of the agent. As shown in FIG. 11, the agent is made up of transmission request acceptance means 1001, display data holding means 1002, display data getting means 1003, display data request means 1004, display data reception means 1005, display data transmission means 1006, and timeout processing means 1007.

The agent first accepts a transmission request from an external system such as a computer connected to the LAN, an adjacent hardware module, or the browser in the home hardware module to which the agent belongs at the transmission request acceptance means 1001 at step S1301.

Next, the agent checks whether or not the requested display data is held in the display data holding means 1002 in the home hardware module at step S1302. If the display data is held, the agent gets the display data by the display data getting means 1003 at step S1303 and returns the display data to the requester through the display data transmission means 1006 at step S1304.

If the display data is not held, the agent checks whether or not a hardware module other than the display data requester is connected at step S1305. If a hardware module is connected, the agent stores reception wait information at step S1306, issues a request for sending the display data to the connected hardware module at step S1307, and sets a timer at step S1308. On the other hand, if a hardware module other than the requester is not connected, the agent returns an error to the requester through the display data transmission means 1006 at step S1309.

If the display data reception means 1005 receives display data from the connected hardware module at step S1401 as a response of the connected hardware module to which the request was issued at step S1307, the agent checks whether or not reception wait information is stored at step S1402. If reception wait information is stored, the agent deletes the reception wait information at step S1403, resets the timer at step S1404, and returns the display data to the requester through the display data transmission means 1006 at step S1405. If reception wait information is not stored at step S1402, the received display data is discarded.

If the timer set at step S1308 times out, a timeout process is started. If reception wait information is stored at step S1501 (Yes), it is deleted by the timeout process at step S1502 and an error is returned to the requester through the display data transmission means 1006 at step S1503.

Figure 15:
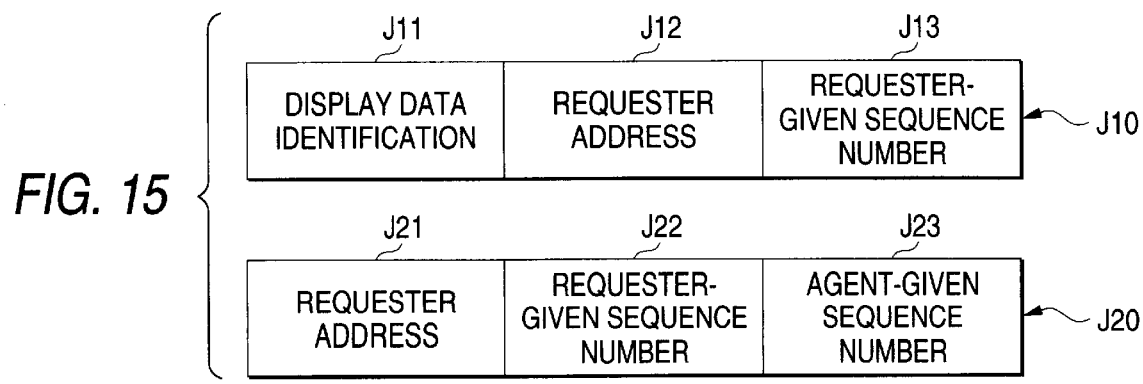
FIG. 15 is a conceptual diagram to show information entries.
Figure 16:
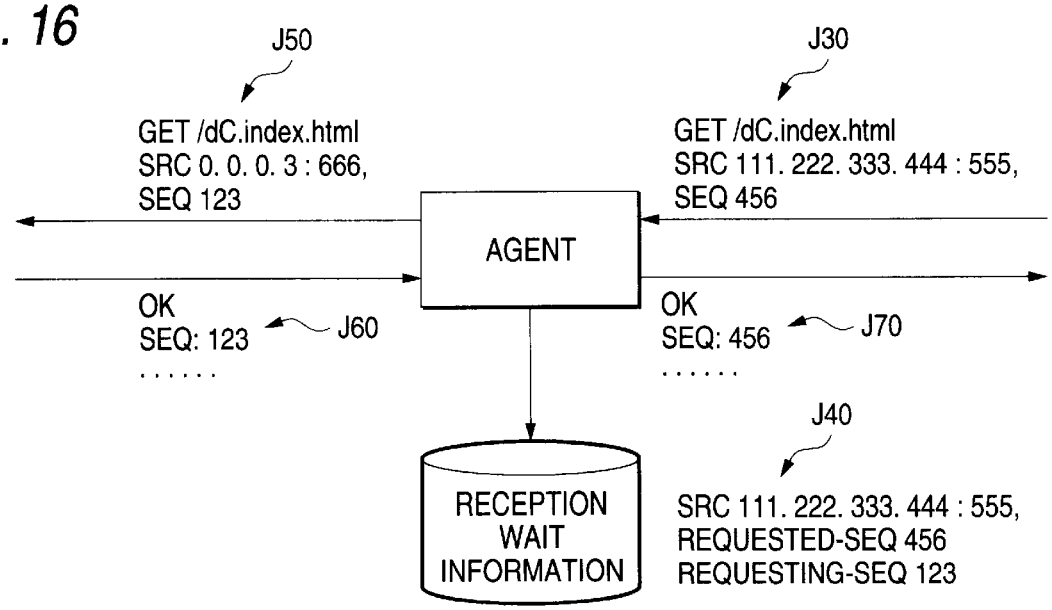
FIG. 16 is an illustration to show an information configuration example.

FIG. 15 is a conceptual diagram to show transmission request information entries and reception wait information entries. FIG. 16 is an illustration to show an example of transmission request information received by the agent from the LAN, a transmission request transmitted to another hardware module, and stored reception wait information.

As shown in FIG. 15, transmission request information J10 is made up of display data identification J11, a requester address J12, and a requester-given sequence number J13 and reception wait information J20 is made up of a requester address J21, a requester-given sequence number J22, and an agent-given sequence number J23.

Specifically, "/dc.index.html" of transmission request information J30 shown in FIG. 16 is requested display data identification, "111.222.333.444" is an address of a computer, etc., of a requester, and "456" is a request sequence number given by the requester. "555" suffixed to the address is an identification number used for a protocol to specify software of the computer, etc., of the requester. It corresponds to an identification number called a port number if the protocol is TCP (Transmission Control Protocol) or UDP (User Datagram Protocol).

"111.222.333.444" of reception wait information J40 shown in FIG. 16 is the address of the requester, "555" suffixed to the address is the above-described port number, "456" is the sequence number given by the requester (value in the transmission request information J30 received from the requester), and "123" is a sequence number given to the transmission request by the agent (value in transmission request information J50 issued by the agent).

The transmission request information J50 shown in FIG. 16 is the same as the transmission request information J30 except that the sequence number is replaced with the value added by the agent.

In display data J60 received from another hardware module shown in FIG. 16, "123" is a sequence number given by the agent at the transmission request time and ". . . " contains the display data itself (text in HTML, etc.,).

Display data J70 transmitted by the agent to the computer, etc., of the requester shown in FIG. 16 is the same as the display data J60 except that the sequence number is replaced with the value given by the computer, etc., of the requester.

Figure 17:
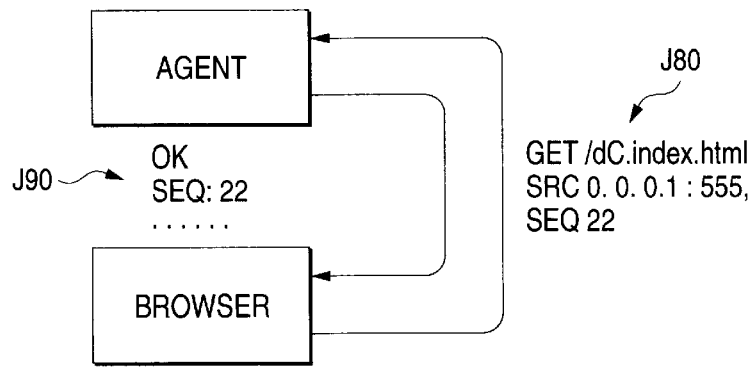
FIG. 17 is an illustration to show a display data transmission example.

FIG. 17 shows an example wherein the browser in the copy module sends a display data transmission request J80 to the agent in the copy module and the agent in the copy module returns display data J90 to the browser in the copy module.

In the description of the embodiment, the display data getting means 1003 in the agent reads held display data, but various pieces of information may be gotten from the copy module, the FAX module, or the printer module and display data may be processed or generated.

FIG. 18 shows an example wherein the browser in the copy module displays gotten display data on the operation panel or software in a computer, etc., connected to the LAN (browser software) displays gotten display data on a display of the computer, etc.

In the example, characters enclosed in parentheses are provided by displaying display data intact and "POWER SAVING," "AUTOMATIC," "SINGLE-SIDED->DOUBLE-SIDED," "1/1," and "NOT USED" are portions to which the conditions are added based on the data gotten from the copy module.

Hyperlink is set in the portions underlined in FIG. 18. If the user clicks on the portion, a display data request related to the underlined portion is transmitted from the browser.

Further, in the example, image data such as GIF or JPEG or any other audio file or video file may be embedded in the display data or may be linked.

FIG. 19 shows an example of display data referenced from display data "PAPER" in FIG. 18. That is, if the user clicks on the "PAPER" portion in FIG. 18, a display data request is transmitted from the browser based on the setup hyperlink and the related display data is read.

In the example, the transmission request acceptance means 1001 and the display data transmission means 1006 may be operatively associated with each other from transmission request acceptance to display data transmission by one connection.

Likewise, the display data request means 1004 and the display data reception means 1005 may be operatively associated with each other from the display data request time to the display data reception time by one connection.

In this case, it becomes unnecessary to manage the requester address. That is, the correspondence between identification of connection accepted by the transmission request acceptance means 1001 from the outside and identification of connection opened by the display data request means 1004 may be managed instead of management based on the sequence numbers.

If the transmission request acceptance means 1001, the display data request means 1004, the display data reception means 1005, and the display data transmission means 1006 are operated in order, the need for managing the sequence numbers, requester addresses, and connection identification is eliminated and therefore the need for managing the reception wait information is also eliminated.

To support a number of protocols in the example, the protocols need also be managed. To accept transmission requests according to a number of protocols, identification of the used protocol needs to be managed.

Figure 21:
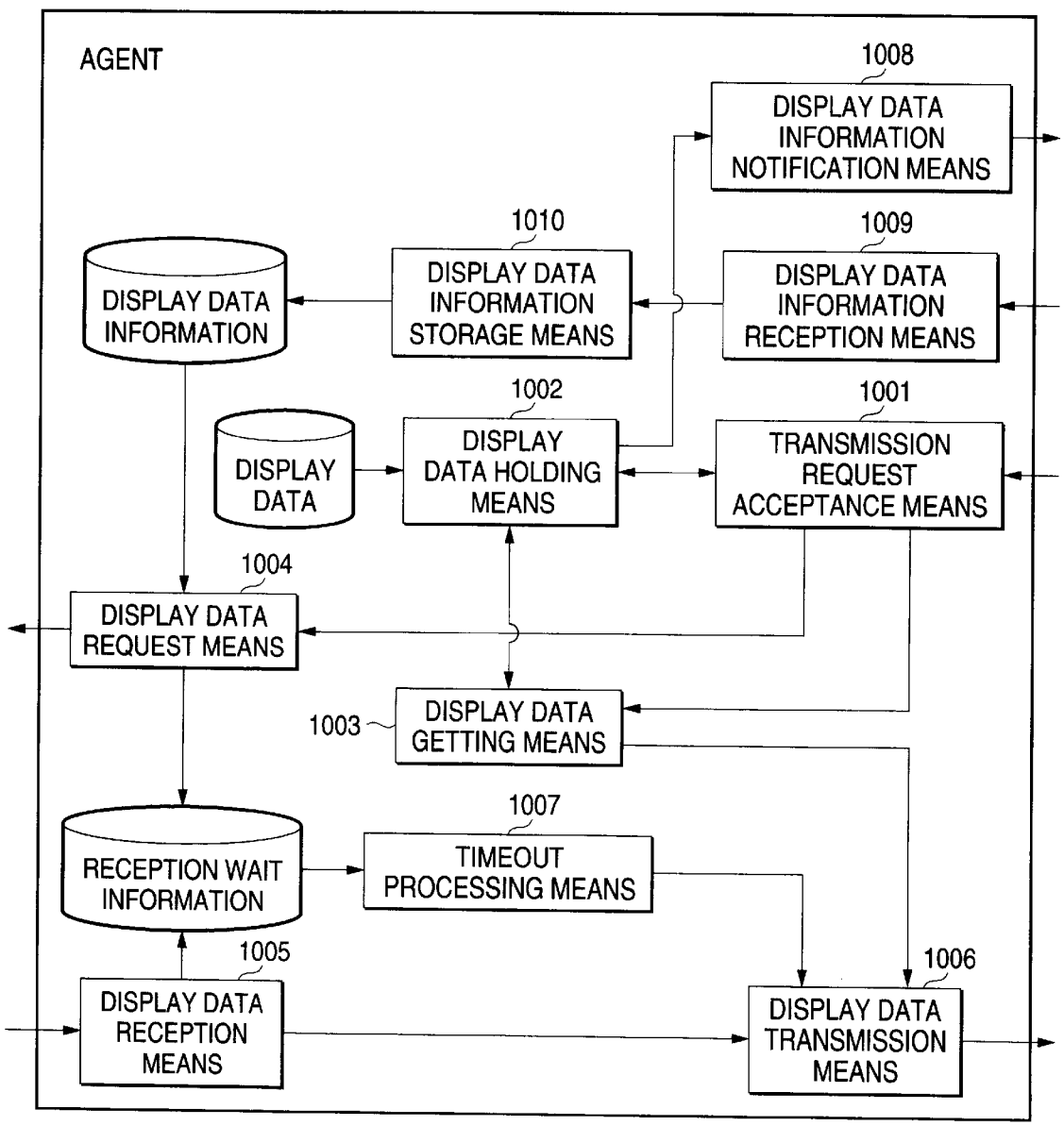
FIG. 21 is a software block diagram of an agent.
Figure 23:
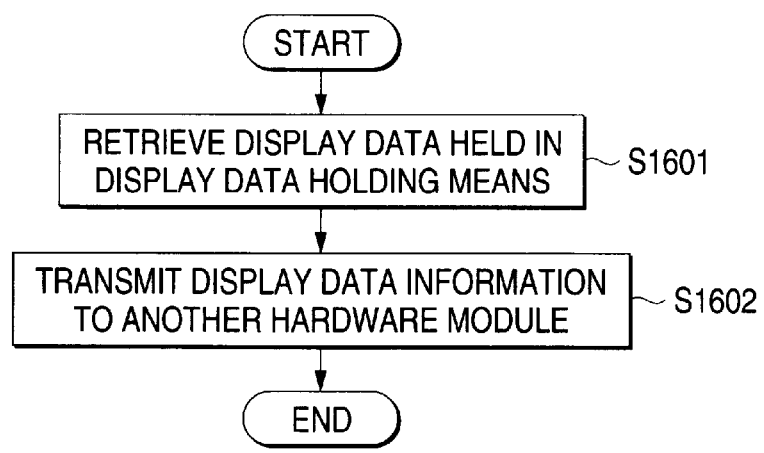
FIG. 23 is a processing flowchart (No.1)
Figure 24:
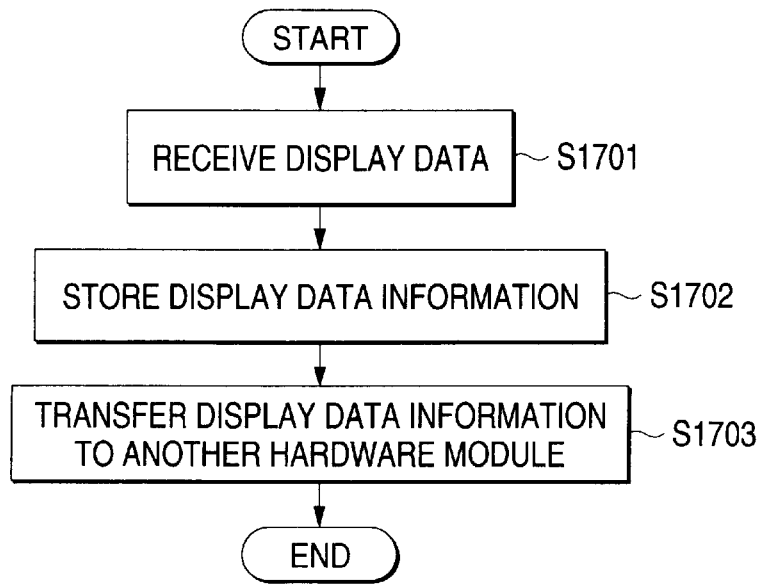
FIG. 24 is a processing flowchart (No.2)

Next, a fourth embodiment of an information processing system of the invention will be discussed. FIG. 20 is a software block diagram in the fourth embodiment of the invention. FIG. 21 is a software block diagram of an agent. FIG. 23 and FIG. 24 are processing flowcharts at the power on time. That is, the fourth embodiment is characterized by the fact that when power of the information processing system is turned on, display data identification information is transferred between the agents in modules.

As shown in FIG. 20, the information processing system comprises a copy module, a FAX module, and a printer module connected. The copy module comprises an agent 100, display data information J100, and a transport TP1. The FAX module comprises an agent 200, display data information J200, and a transport TP2. The printer module comprises an agent 300, display data information J300, and transports TP3 and TP4.

As shown in FIG. 21, the agent in each module comprises transmission request acceptance means 1001, display data holding means 1002, display data getting means 1003, display data request means 1004, display data reception means 1005, display data transmission means 1006, timeout processing means 1007, display data information notification means 1008, display data information reception means 1009, and display data information storage means 1010.

Figure 22:
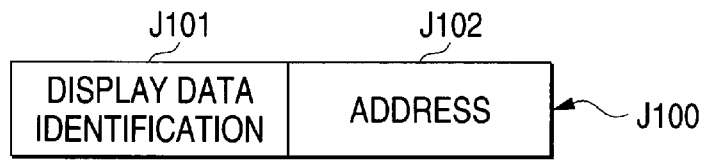
FIG. 22 is a conceptual diagram to show display data information entries.

As shown in FIG. 22, the display data information J100 stores identification of display data that can be gotten in another hardware module, J101, and an address J102 for specifying the hardware module holding the display data.

The display data identification J101 is identification of unique display data or identification of a display data set. For example, display data identification "/aaa" indicates display data beginning with "/aaa." "/aaa" may be notation indicating display data separated by "/" (slash) following "/aaa," namely, display data of "/aaa/ . . . "

A wild card (special character indicating any one character, special character indicating any one or more characters, etc.,) may be used to represent display data identification.

When power of the information processing system having the configuration is turned on, first, display data held in the display data holding means 1003 is retrieved at step S1601 and the retrieved display data information is transmitted by the display data information notification means 1008 at step S1602.

Display data information is received at the display data information reception means 1009 from another hardware module at step S1701 and is stored in the display data information storage means 1010 at step S1702. The received display data information is also transmitted by the display data information notification means 1008 to any other hardware module than the display data information transmitting source module at step S1703.

In the example, if the hardware modules are started asynchronously, the display data information may not be transferred normally. A procedure for normally transferring the display data information if the hardware modules are started asynchronously will be discussed.

Figure 25:
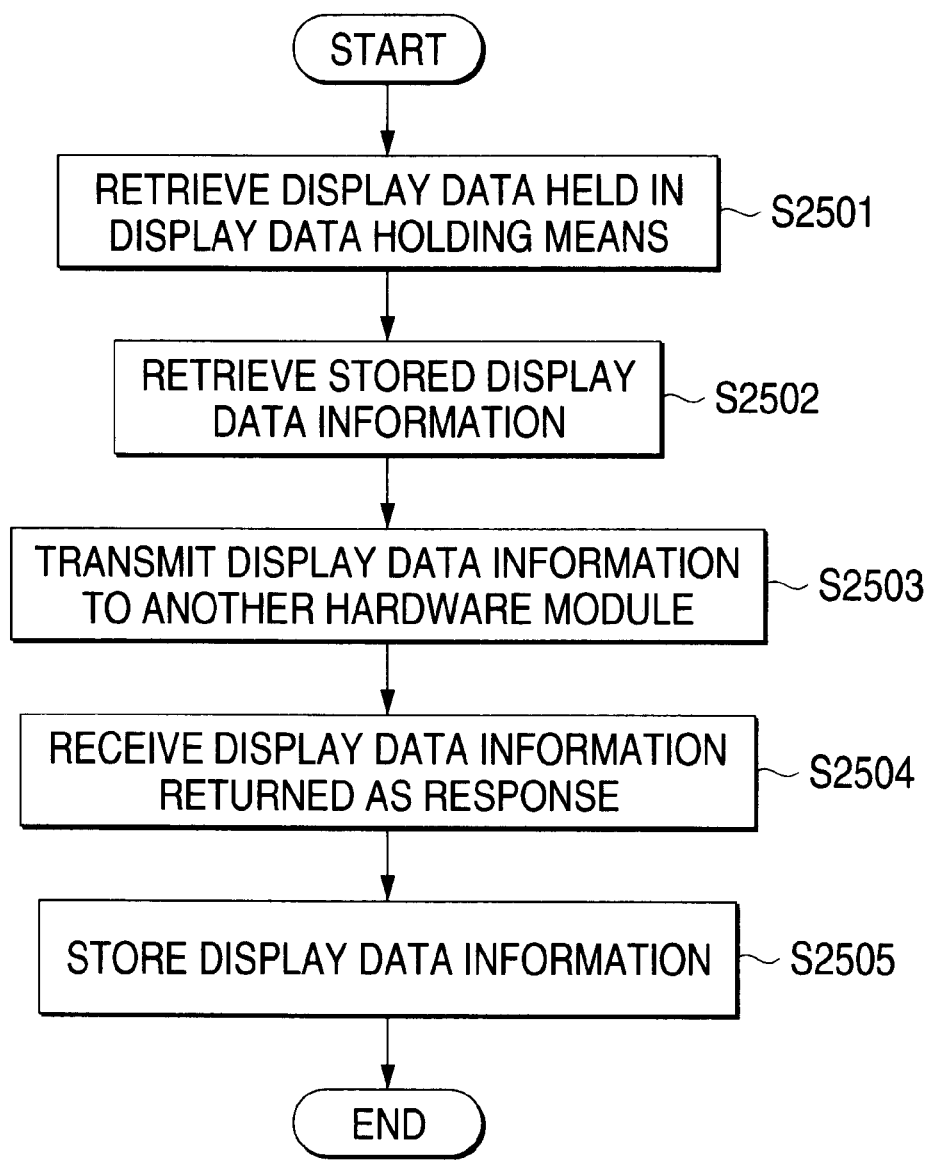
FIG. 25 is a processing flowchart of an active hardware module.

FIG. 25 is a processing flowchart of an active hardware module. First, display data that can be gotten in the home module is retrieved at step S2501. Further, information of display data that can be gotten in another hardware module, stored in the home module is gotten at step S2502.

Next, the display data information gotten at steps S2501 and S2502 is sent to another hardware module at step S2503. Further, display data information returned as a response from the hardware module is received at step S2504. The received display data information is stored at step S2505.

To send the display data information to the hardware module, at step S2502 or S2503, if the display data that can be gotten in the hardware module is excluded, needless communication can also be reduced.

Figure 26:
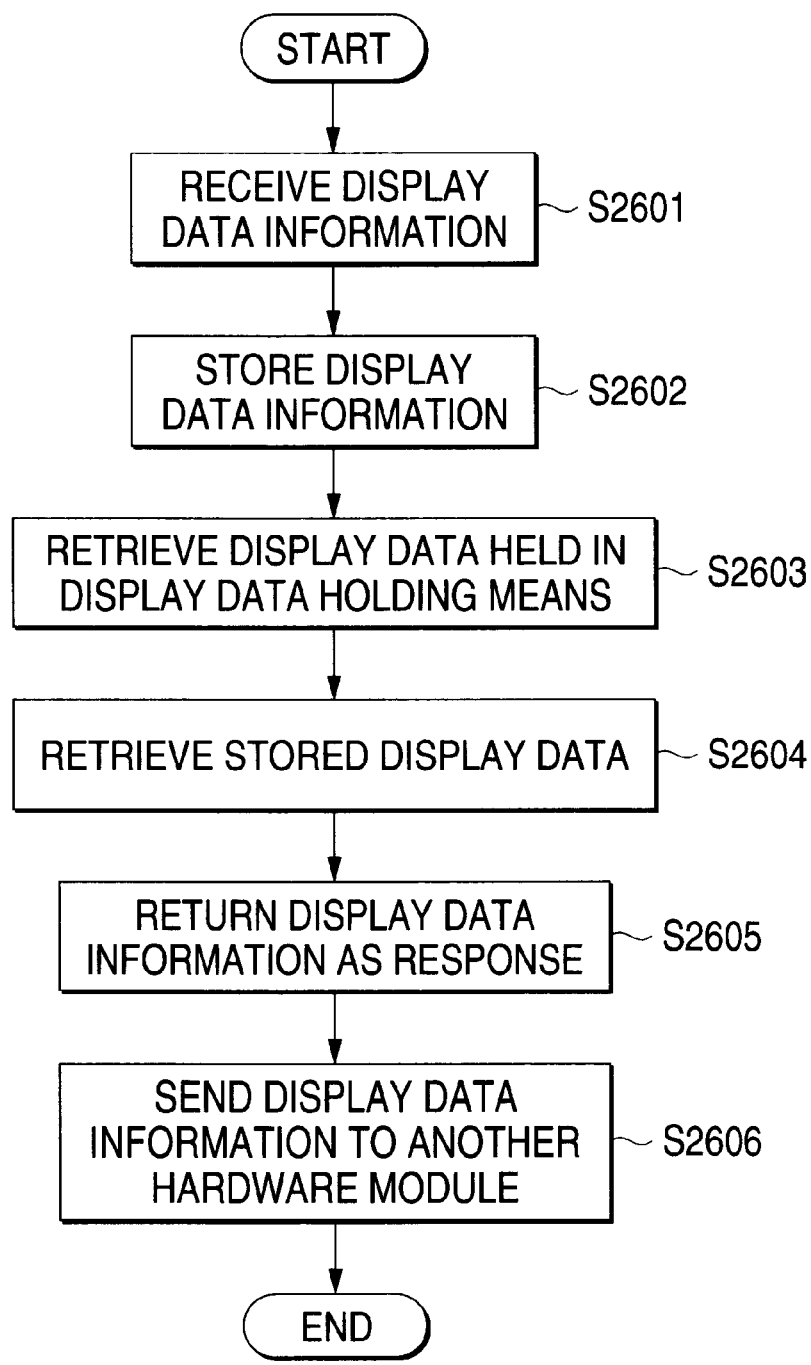
FIG. 26 is a processing flowchart of a passive hardware module.

FIG. 26 is a processing flowchart of a passive hardware module. First, display data information is received in the passive hardware module at step S2601 and is stored at step S2602.

Next, display data that can be gotten in the home module is retrieved at step S2603. If the display data stored in the home module is managed as display data information, the display data information is retrieved at step S2603. Further, display data information that can be gotten in another hardware module, stored in the home module is gotten at step S2604. Next, the display data information gotten at steps S2603 and S2604 (if display data is retrieved, display data information generated therefrom) is returned to the hardware module sending the display data information. The received display data information is sent to another hardware module at step S2606.

To return the display data information to the hardware module sending the display data information, at step S2604 or S2605, if the display data that can be gotten in the hardware module is excluded, needless communication can also be reduced.

Not only the received display data information, but also display data information that can be gotten in the home module and stored display data information may be sent at step S2606.

Further, display data information may be sent at step S2606 only if new display data is entered at step S2605.

When display data information is received or is returned as a response, the display data information that can be gotten in the home hardware module (display data information generated from the display data in the home module or if display data is managed and stored as display data information, the display data information) is transferred to another hardware module. However, display data information may be transferred only when new display data information is entered.

To send display data information or return display data information as a response, display data information in another information processing module may be sent as the display data information in the home module. For example, in the information processing system of the configuration shown in FIG. 20, the FAX module sends display data information in the copy module to the printer module as display data information in the FAX module.

Therefore, when the printer module receives a request for getting the display data information in the copy module from the LAN, it transfers the request to the FAX module, which in turn transfers the request to the copy module.

Figure 27:
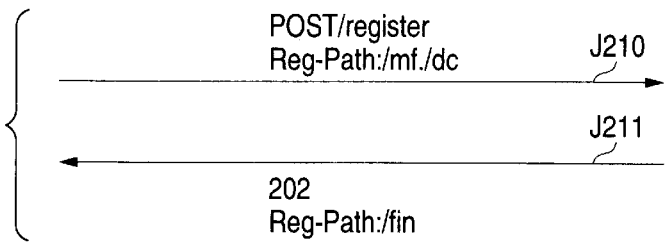
FIG. 27 is an illustration to show message examples.

FIG. 27 is an illustration to show examples of a display data information notification message J210 and a display data information response message J211.

Figure 28:
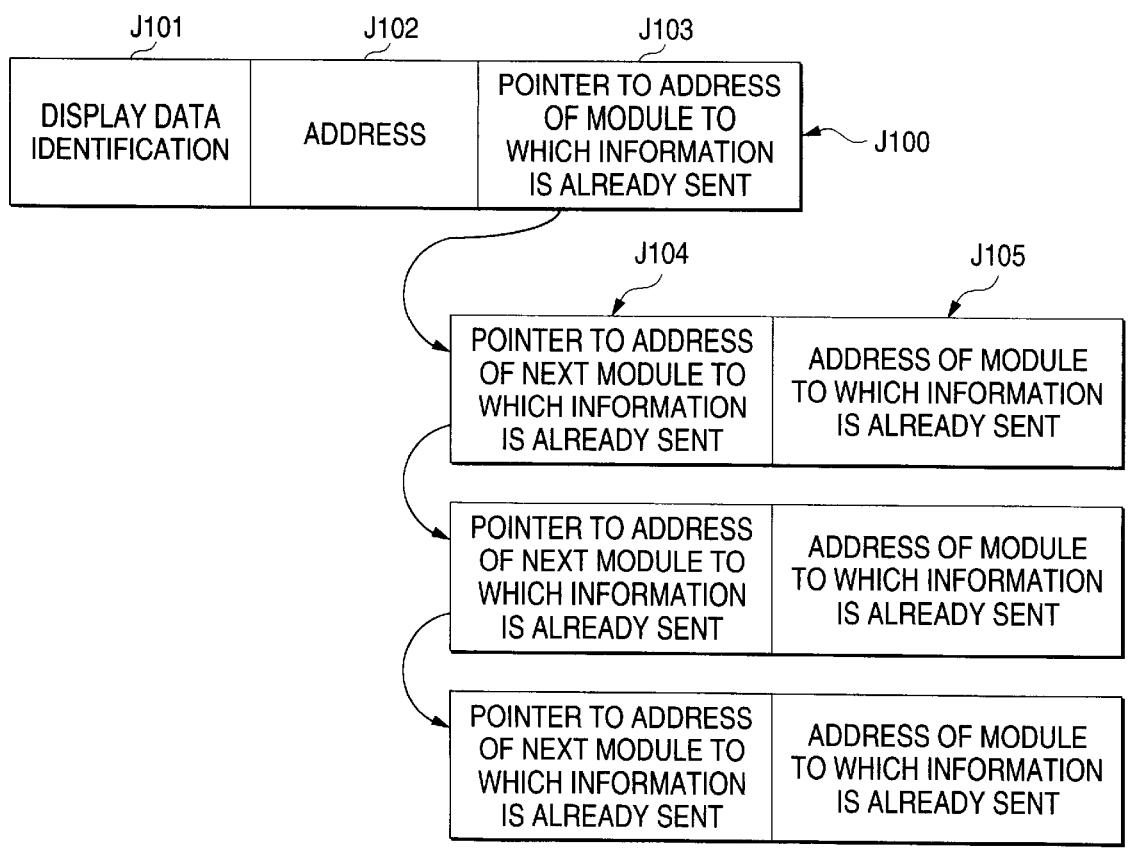
FIG. 28 is a conceptual diagram to show information entries.

FIG. 28 is a conceptual diagram to show transmission request information entries. As shown here, display data information J100 is made up of display data identification J101, an address J102, and a pointer to the address of a module to which the information is already sent, J103. The pointer J103 is provided with a pointer to the address of the next module to which the information is already sent, J104, and the address of the module, J105, for managing the addresses of the modules to which the information is already sent, whereby control may be performed so as not to transmit the same display data information to the modules to which the information is already sent.

Processing of the active module shown in FIG. 25 may be executed at predetermined time intervals from the start time of the module. It may be made possible to set the time intervals at which the processing is executed. Processing of the active module shown in FIG. 25 may be repeated as many times as predetermined or for a predetermined time. It may be made possible to set the predetermined number of times the processing is repeated or the predetermined time for which the processing is repeated.

Figure 29:
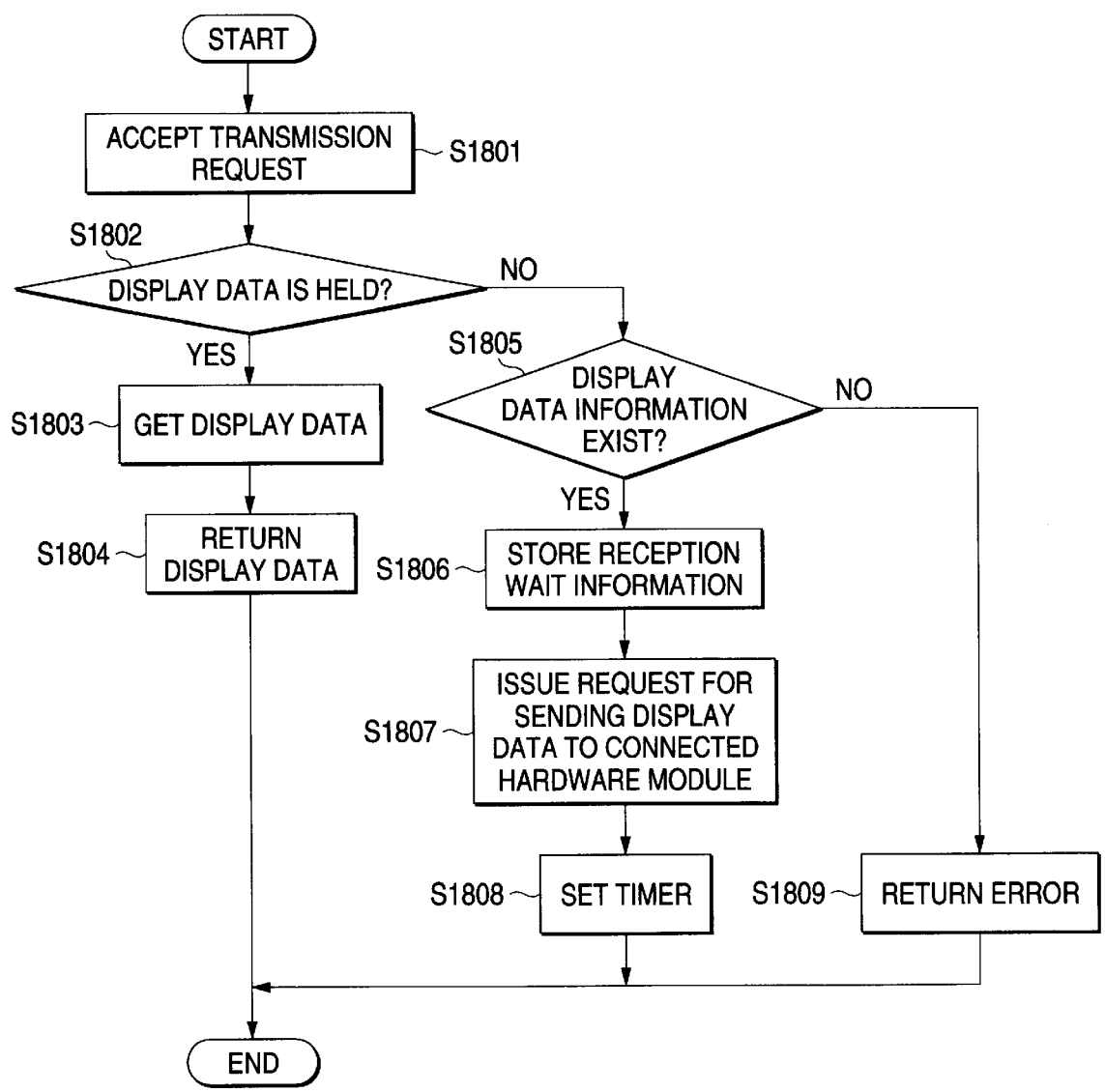
FIG. 29 is a processing flowchart (No.3)

FIG. 29 is a processing flowchart for transmitting display data. This processing flowchart is the same as that in the third embodiment shown in FIG. 12 except that step S1305 is replaced with step S1805.

In FIG. 29, the agent accepts a display data transmission request from an adjacent hardware module or a computer, etc., connected to the LAN at step S1801.

Next, the agent checks whether or not the requested display data is held in the home hardware module at step S1802. If the display data is held, the agent gets the display data at step S1803 and returns the display data to the requester at step S1804.

If the display data is not held, the agent checks whether or not display data information exists at step S1805, namely, whether or not display data that can be gotten in another hardware module exists. If the display data exists, the agent stores reception wait information at step S1806, issues a request for transmitting the display data to the hardware module address stored in the display data information at step S1807, and sets a timer at step S1808. On the other hand, if the display data does not exist, the agent returns an error at step S1809.

Such processing is performed, whereby when power of the information processing system is turned on, the display data held in each hardware module can be referenced from any hardware modules. That is, it can be referenced from not only a browser installed in a specific hardware module, but also a computer, etc., connected through a LAN interface. The display data can also be referenced over a FAX line.

Figure 30:
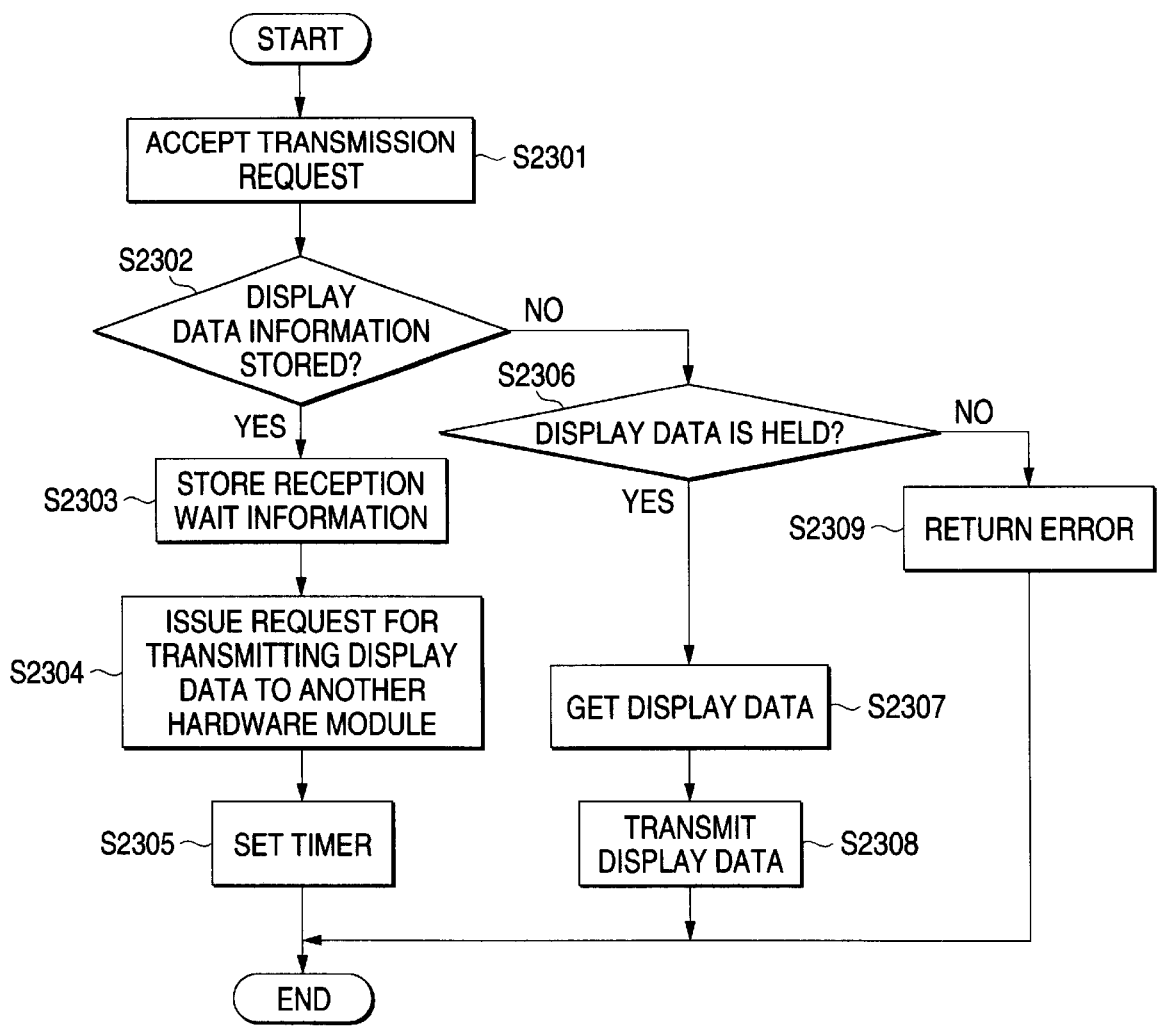
FIG. 30 is another processing flowchart for transmitting display data.

FIG. 30 is another processing flowchart for transmitting display data. In the figure, first a transmission request is accepted from the outside at step S2301. Next, a check is made to see if display data information matching the requested display data in identification information is stored at step S2302.

If the display data information is stored, a request for transmitting the display data is transferred to another module at steps S2303 to S2305. On the other hand, if the display data information is not stored, whether or not the requested display data can be gotten in the home module is checked at step S2306. If the requested display data can be gotten, it is gotten in the home module and is transmitted at steps S2307 and S2308. Display data information generated from the display data may be transmitted.

On the other hand, if the display data cannot be gotten in the home module, an error is returned at step S2309.

Identification information of display data that can be gotten in the home module may be stored in display data identification information. In this case, when the address value is a specific value, for example, zero, it may be indicated that the identification entry of the display data is identification of the display data that can be gotten in the home module.

Figure 31:
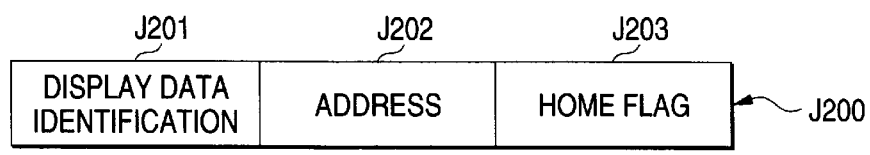
FIG. 31 is a conceptual diagram to show information entries.

Display data information J200 may contain a home flag J203 indicating identification of display data concerning the home module together with display data identification J201 and address J202, as shown in FIG. 31.

Figure 32:
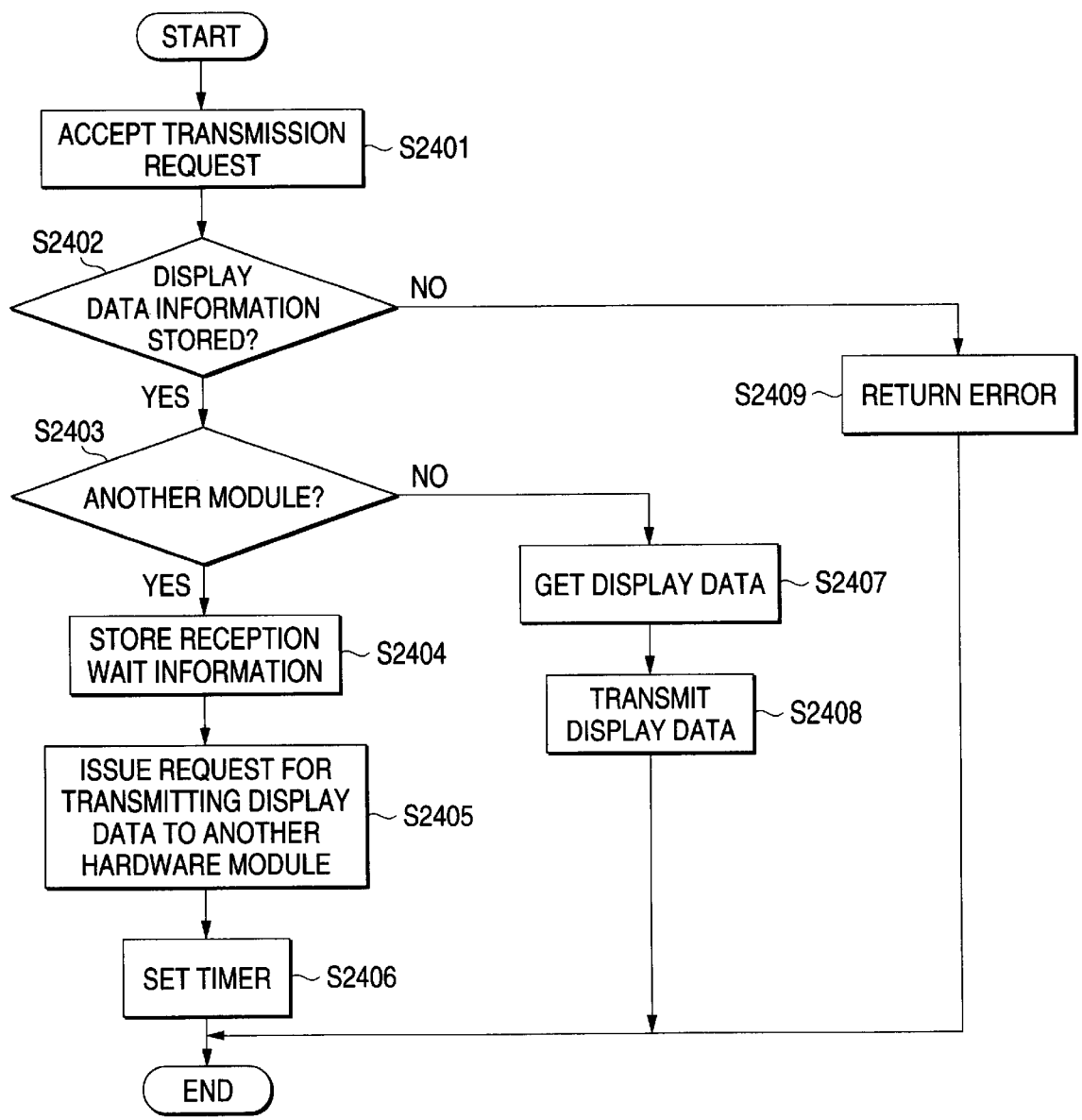
FIG. 32 is a processing flowchart for transmitting display data.

FIG. 32 is a processing flowchart for transmitting display data when the home flag J203 is provided. First, a transmission request is accepted from the outside at step S2401. Next, a check is made to see if display data information matching the requested display data in identification information is stored at step S2402.

If the display data information is not stored, an error is returned at step S2409. On the other hand, if the display data information is stored, whether stored display data is the display data information in the home module or that in another module is determined at step S2403 by referencing the above-described specific address value (for example, zero) or home flag value.

If it is the display data information in another module, a transmission request is transferred to the module at steps S2404 to S2406. On the other hand, if it is not the display data information in another module, display data is gotten in the home module and is transmitted at steps S2407 and S2408.

In the example, information for managing the display data location, namely, display data information is previously transferred between the modules, but display data may be actually transferred. Display data once referenced from another module may be cached for later use.

Figure 33:
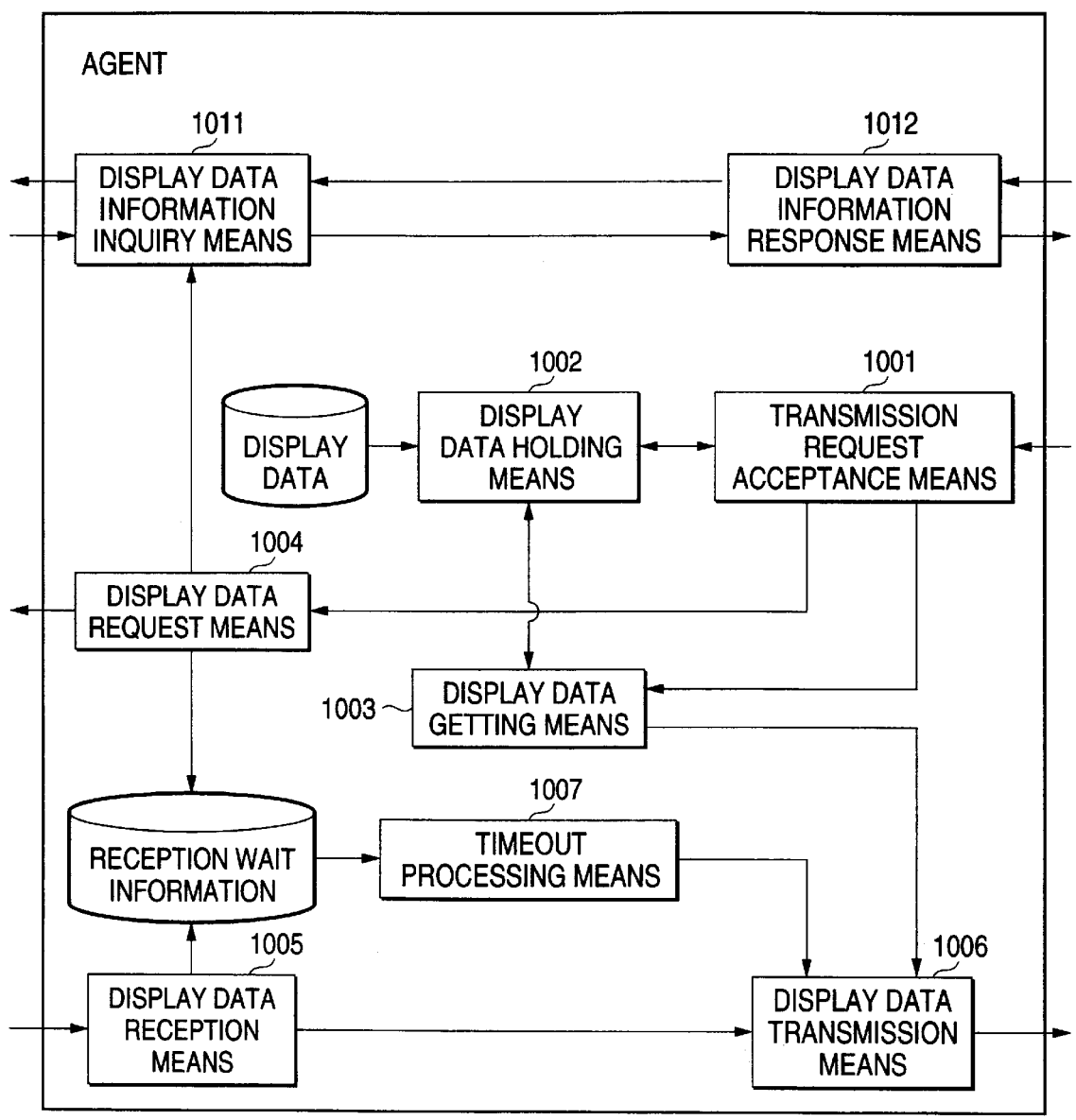
FIG. 33 is a software block diagram of an agent in a fifth embodiment of the invention.
Figure 34:
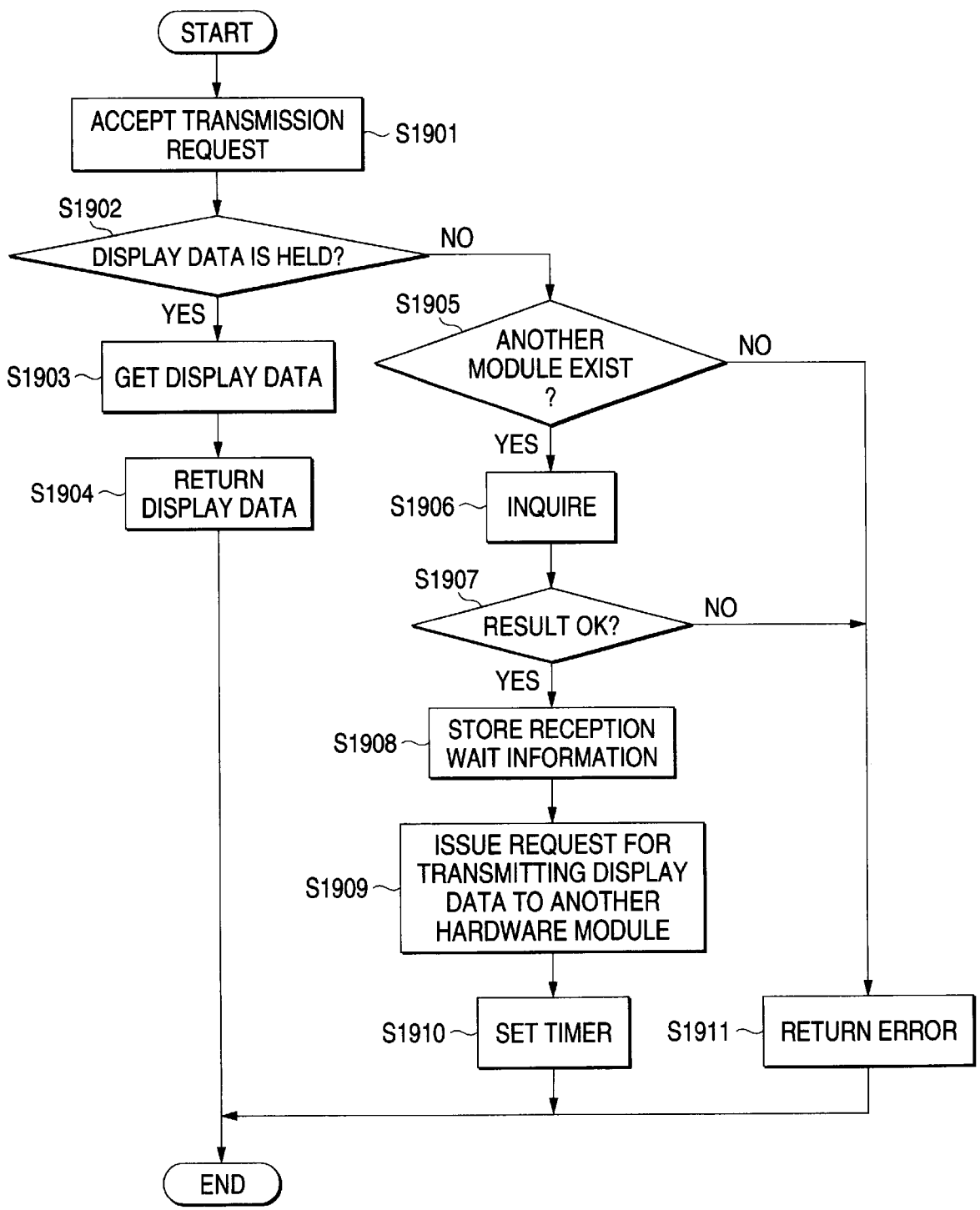
FIG. 34 is a processing flowchart (No.1)

Next, a fifth embodiment of an information processing system of the invention will be discussed. FIG. 33 is a software block diagram of an agent applied to the information processing system according to the fifth embodiment. FIG. 34 is a processing flowchart.

The information processing system of the fifth embodiment is characterized by the fact that when inquiry about display data is received from any hardware module or a computer, etc., connected to a LAN, the display data is returned to the inquirer.

The agent in the fifth embodiment comprises transmission request acceptance means 1001, display data holding means 1002, display data getting means 1003, display data request means 1004, display data reception means 1005, display data transmission means 1006, timeout processing means 1007, display data information inquiry means 1011, and display data information response means 1012.

As the operation of the agent, steps S1901 to S1905 shown in FIG. 34 are the same as steps S1301 to S1305 of the operation of the agent in the third embodiment shown in FIG. 12.

If requested display data is not held in the home hardware module at step S1902 (No) and any other hardware module than the hardware module making the transmission request exists at step S1905 (Yes), the agent inquires of that hardware module whether or not the requested display data can be gotten at step S1906.

If the hardware module responds to the inquiry with OK at step S1907 (Yes), reception wait information is stored at step S1908, a request for transmitting the display data is issued to the hardware module at step S1909, and a timer is set at step S1910. On the other hand, if the hardware module responds to the inquiry with NG at step S1907 (No), an error is returned to the requester at step S1911.

Figure 35:
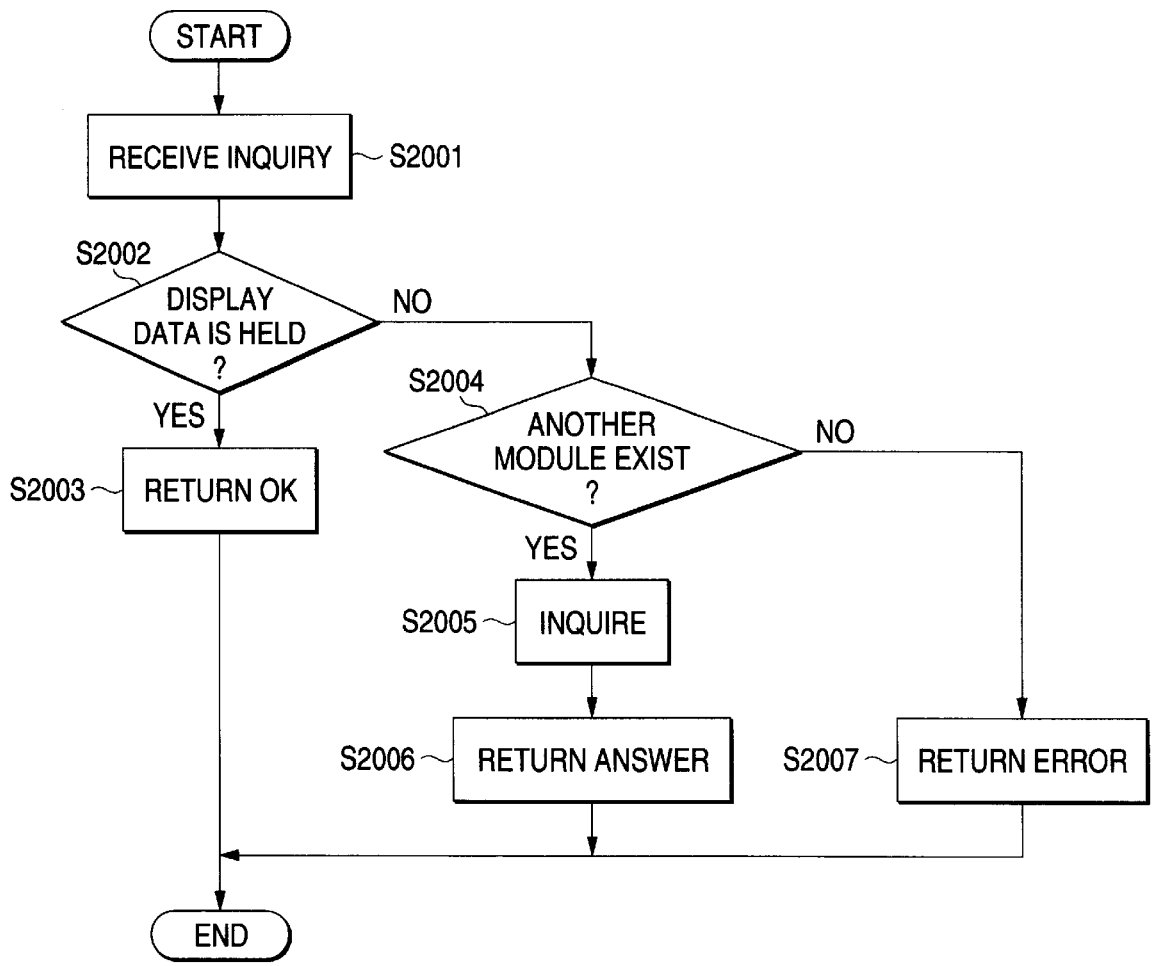
FIG. 35 is a processing flowchart (No.2)

FIG. 35 is an inquiry answer processing flowchart. First, an inquiry is received from another hardware module at step S2001. Next, a check is made to see if display data is held in the display data holding means in the home hardware module at step S2002. If the display data is held at step S2002 (Yes), the agent answers the inquirer that the display data can be gotten at step S2003.

If the display data is not held at step S2002 (No), the agent checks whether or not any other hardware module than the inquirer exists at step S2004. If it exists at step S2004 (Yes), the agent transfers the inquiry to the hardware module at step S2005 and returns a received answer from the hardware module to the inquirer at step S2006. If any other hardware module than the inquirer does not exist at step S2004 (No), the agent answers the inquirer that the display data cannot be gotten at step S2007.

Thus, when one hardware module receives an inquiry about display data from another hardware module forming a part of the information processing system or an external system such as a computer connected to the LAN, if the display data is held in the hardware module receiving the inquiry, it is returned to the inquirer; if the display data is not held, the inquiry is transferred to any other hardware module than the inquiry and the display data can be returned to the inquirer.

Since the display data corresponding to each hardware module is managed for each hardware module, a hardware module function or a new hardware module can be added without affecting other hardware modules. If display data is required, an inquiry is sent to another hardware module, which in turn transfers the inquiry to another hardware module, which in turn transfers the inquiry to another hardware module, which so that the display data corresponding to every hardware module can be obtained.

Figure 36:
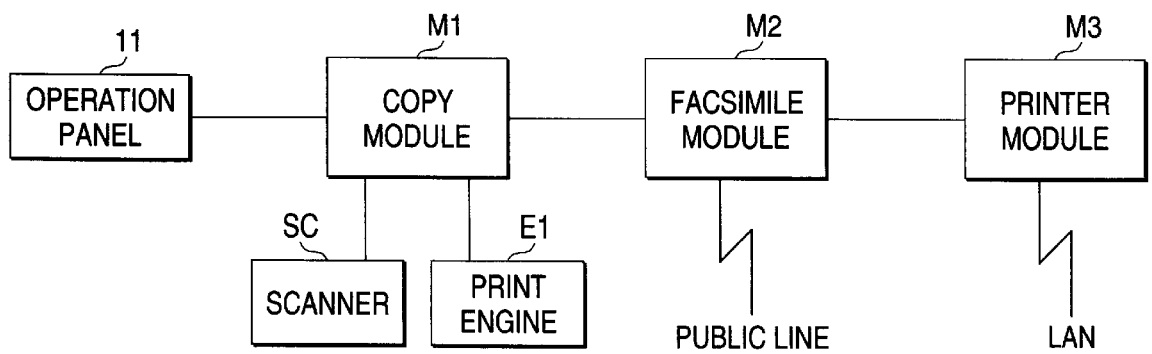
FIG. 36 is a system block diagram according to a sixth embodiment of the invention.
Figure 37:
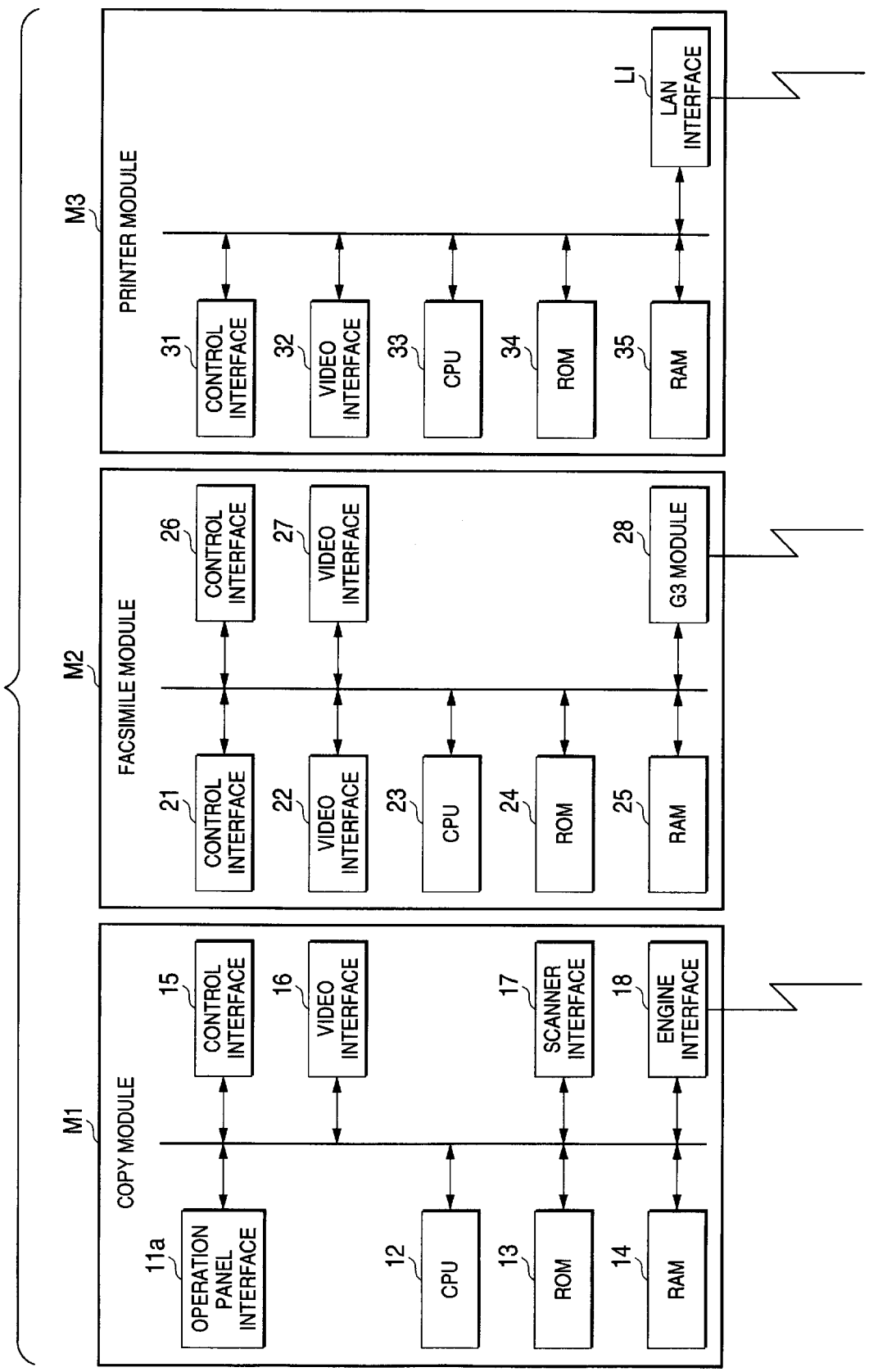
FIG. 37 is a hardware block diagram according to the sixth embodiment of the invention.

Next, a sixth embodiment of an information processing system of the invention will be discussed. FIG. 36 is a block diagram of the information processing system according to the sixth embodiment. FIG. 37 is a hardware block diagram of the information processing system according to the sixth embodiment.

In the sixth embodiment, an operation panel 11 comprises a CPU and is connected to a copy module M1, a FAX module M2, and a printer module M3 in series. That is, the sixth embodiment is characterized by the fact that information can be transferred between the operation panel 11 and a computer, etc., of an external system via a LAN.

As shown in FIG. 37, the copy module M1 is provided with an operation panel interface 11a for transferring data to and from the operation panel 11 shown in FIG. 36. In addition, the copy module M1 comprises a CPU 12, a ROM 13, a RAM 14, a control interface 15, a video interface 16, a scanner interface 17, and an engine interface, which are similar to those of the copy module in the third embodiment shown in FIG. 9.

The FAX module M2 is made up of a control interface 21, a video interface 22, a CPU 23, a ROM 24, a RAM 25, a control interface 26, a video interface 27, and a G3 module 28 shown in FIG. 37, which are similar to those of the FAX module in the third embodiment shown in FIG. 9.

Further, the printer module M3 is made up of a control interface 31, a video interface 32, a CPU 33, a ROM 34, a RAM 35, and a LAN interface 36 shown in FIG. 37, which are similar to those of the printer module in the third embodiment shown in FIG. 9.

That is, the information processing system according to the sixth embodiment can transfer information between the operation panel 11 and a computer, etc., via the operation panel interface 11a as display data is transferred to and from a computer, etc., of an external system via the LAN interface LI as described in the third embodiment.

Figure 38:
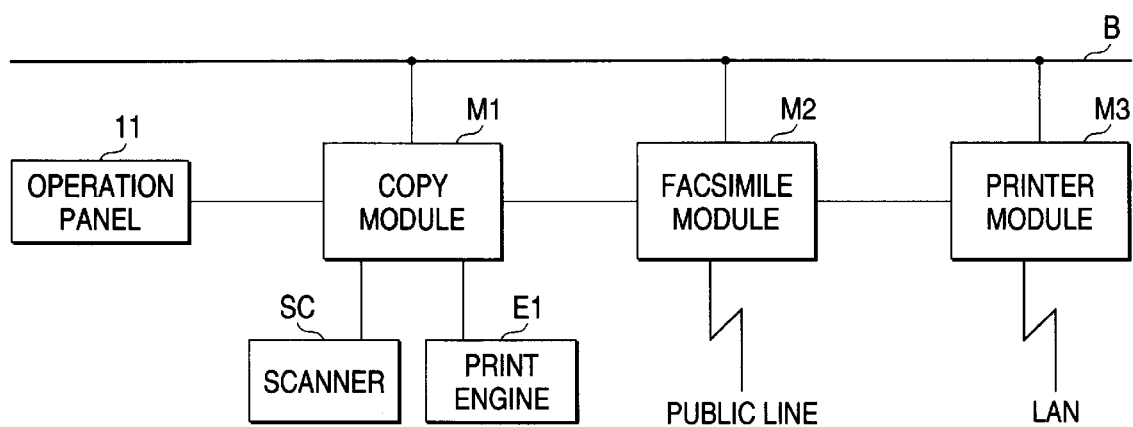
FIG. 38 is a system block diagram according to a seventh embodiment of the invention.
Figure 39:
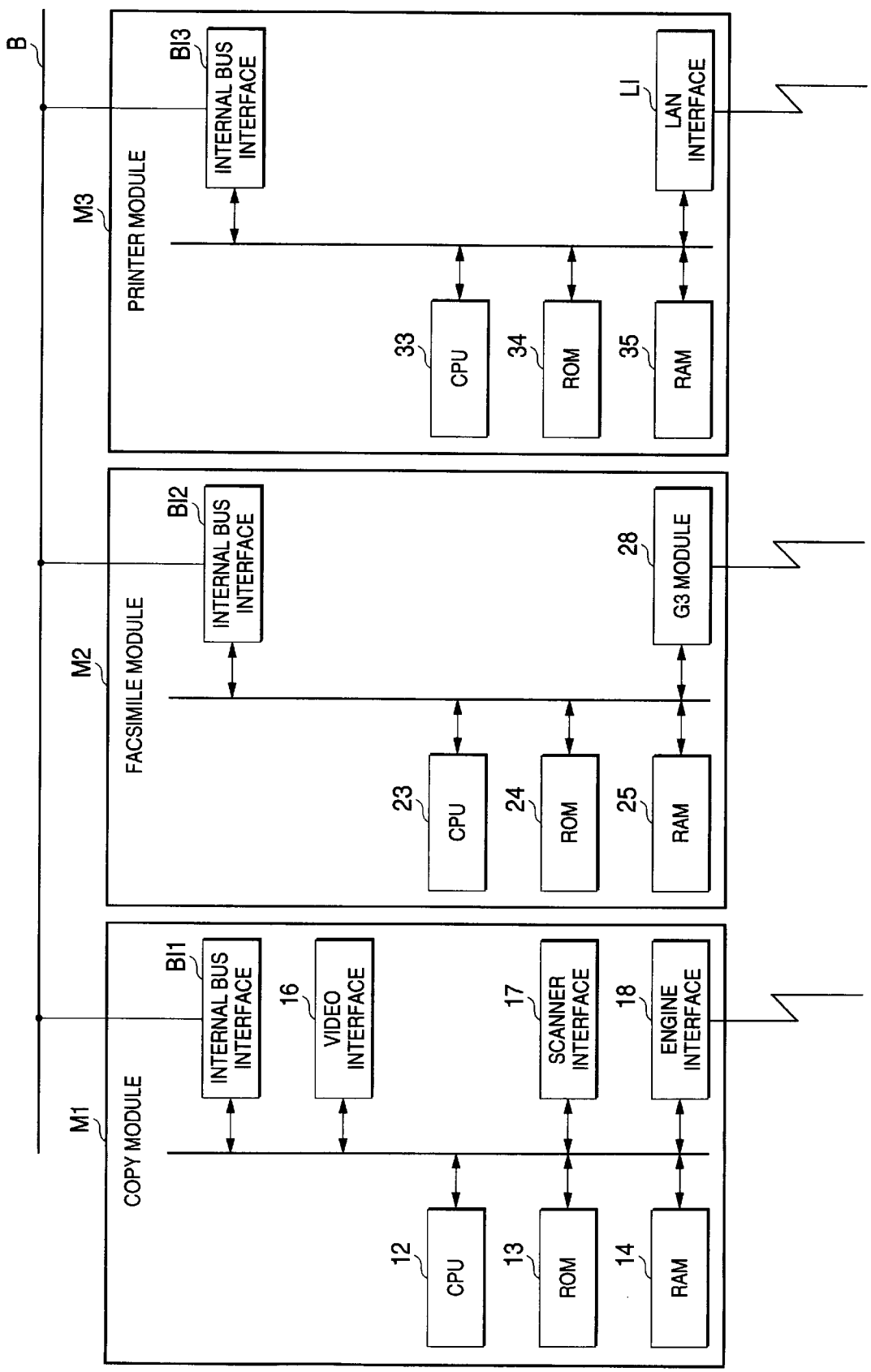
FIG. 39 is a hardware block diagram according to the seventh embodiment of the invention.

Next, a seventh embodiment of an information processing system of the invention will be discussed. FIG. 38 is a block diagram of the information processing system according to the seventh embodiment. FIG. 39 is a hardware block diagram of the information processing system according to the seventh embodiment. In the seventh embodiment, an operation panel 11, a copy module M1, a FAX module M2, and a printer module M3 are connected to a bus B.

That is, as shown in FIG. 39, the copy module M1 is provided with an internal bus interface BI1, the FAX module M2 is provided with an internal bus interface BI2, and the printer module M3 is provided with an internal bus interface BI3.

A CPU 12, a ROM 13, a RAM 14, a scanner interface 17, and an engine interface 18 of the copy module M1, a CPU 23, a ROM 24, a RAM 25, and a G3 module 28 of the FAX module M2, and a CPU 33, a ROM 34, a RAM 35, and a LAN interface LI of the printer module M3 are similar to those of the copy module, the FAX module, and the printer module of the third embodiment shown in FIG. 9.

Since the hardware modules are thus connected by the bus B in the seventh embodiment, one hardware module can transmit a display data transmission request, send display data information, or issue display data information inquiry to other hardware modules at the same time.

Figure 40:
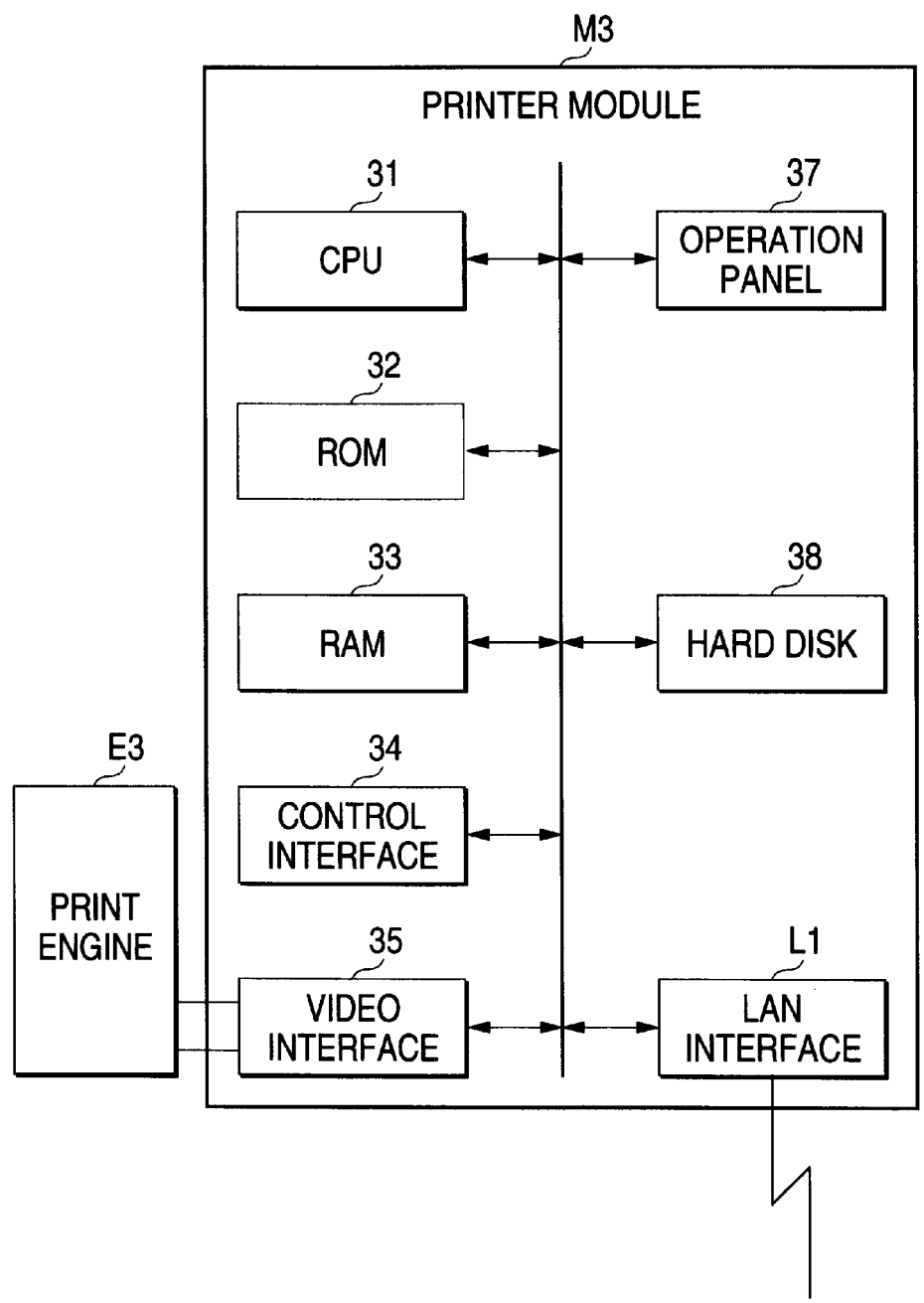
FIG. 40 is a hardware block diagram according to an eighth embodiment of the invention.

Next, an eighth embodiment of an information processing system of the invention will be discussed. FIG. 40 is a hardware block diagram according to the eighth embodiment of the invention. In the embodiment, a printer is used as the information processing system as in the second embodiment. The information processing system according to the eighth embodiment is characterized by the fact that it comprises a hard disk 38 in addition to the components of the second embodiment shown in FIG. 4.

A CPU 31, a ROM 32, a RAM 33, a control interface 34, a video interface 35, a print engine E3, an operation panel 37, and a LAN interface LI are similar to those of the second embodiment.

Figure 41:
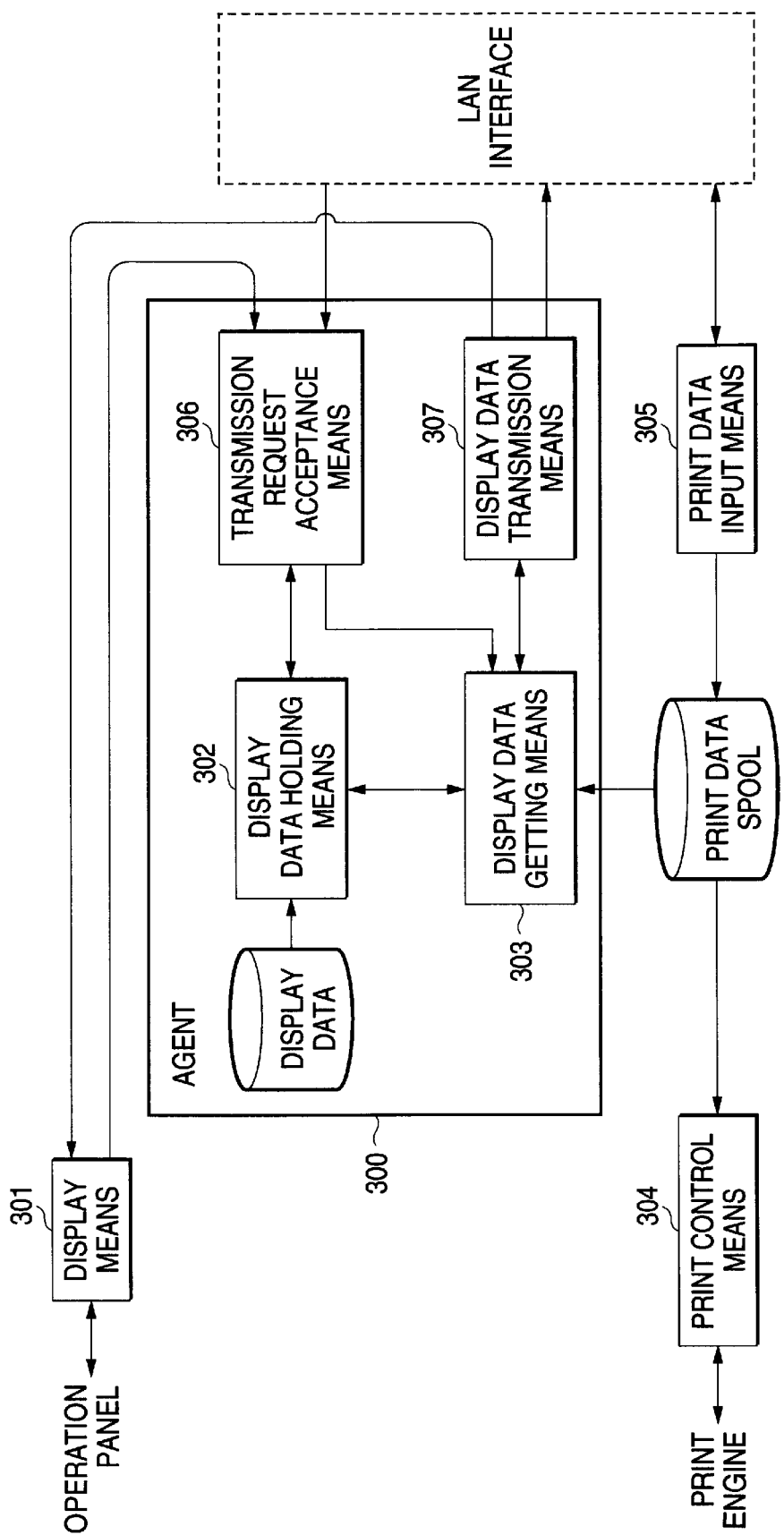
FIG. 41 is a software block diagram according to the eighth embodiment of the invention.

FIG. 41 is a software block diagram according to the eighth embodiment. The software shown in FIG. 41 is made up of display means 301, an agent 300 consisting of display data holding means 302, display data getting means 303, transmission request acceptance means 306, and display data transmission means 307, print control means 304, and print data input means 305 like the software according to the second embodiment shown in FIG. 5.

The eighth embodiment is characterized by the fact that print data input through the print data input means 305 via the LAN interface is stored on a print data spool and display data in which print data identification information and additional information are built is generated.

FIG. 42 is an illustration to show a display example of display data generated by the information processing system of the eighth embodiment. Based on the print data stored on the print data spool, the display data getting means 303 generates display data in which identification information and additional information in the print data are built.

For example, the data transmitting person name, content type, and capacity are read from the print data and are built in display data to generate new display data. The display data is received at an external system of a computer, etc., connected to a LAN and is displayed by browser software, whereby the print output state can be referenced.

In addition to the stored print data, various types of data such as image data received at a facsimile and voice data of voice mail, etc., may be handled like the above-described print data.

In the description of the embodiment, the invention is applied to the printer, but can also be applied to an information processing system made up of a number of hardware modules. In this case, a received document in a FAX module can also be referenced through a printer module.

Identification information and additional information of a file of a printer driver, etc., previously stored in the printer module may be incorporated. Further, data and file reference information may be incorporated as identification information.

FIG. 43 is an illustration to show a display example of data in which reference information is built. In the figure, print data reference information is embedded in a "REFERENCE" button. When the display means accepts selection of the button, a request for transmitting the corresponding file is transmitted together with reference information.

Then, a list of print data and data received at the facsimile, spooled on the hard disk can be referenced using browser software in a computer, etc., connected to the LAN and the file contents can be read and displayed as required.

Next, a ninth embodiment of an information processing system of the invention will be discussed. FIG. 44 is a software block diagram according to the ninth embodiment. The ninth embodiment is characterized by the fact that an agent 300 contains print data output means 308 for outputting the contents of a referenced file as print data in file reference described in the eighth embodiment.

Other software components, namely, display means 301, display data holding means 302, display data getting means 303, transmission request acceptance means 306, display data transmission means 307, print control means 304, and print data input means 305 are similar to those of the eighth embodiment shown in FIG. 41.

Figure 45:
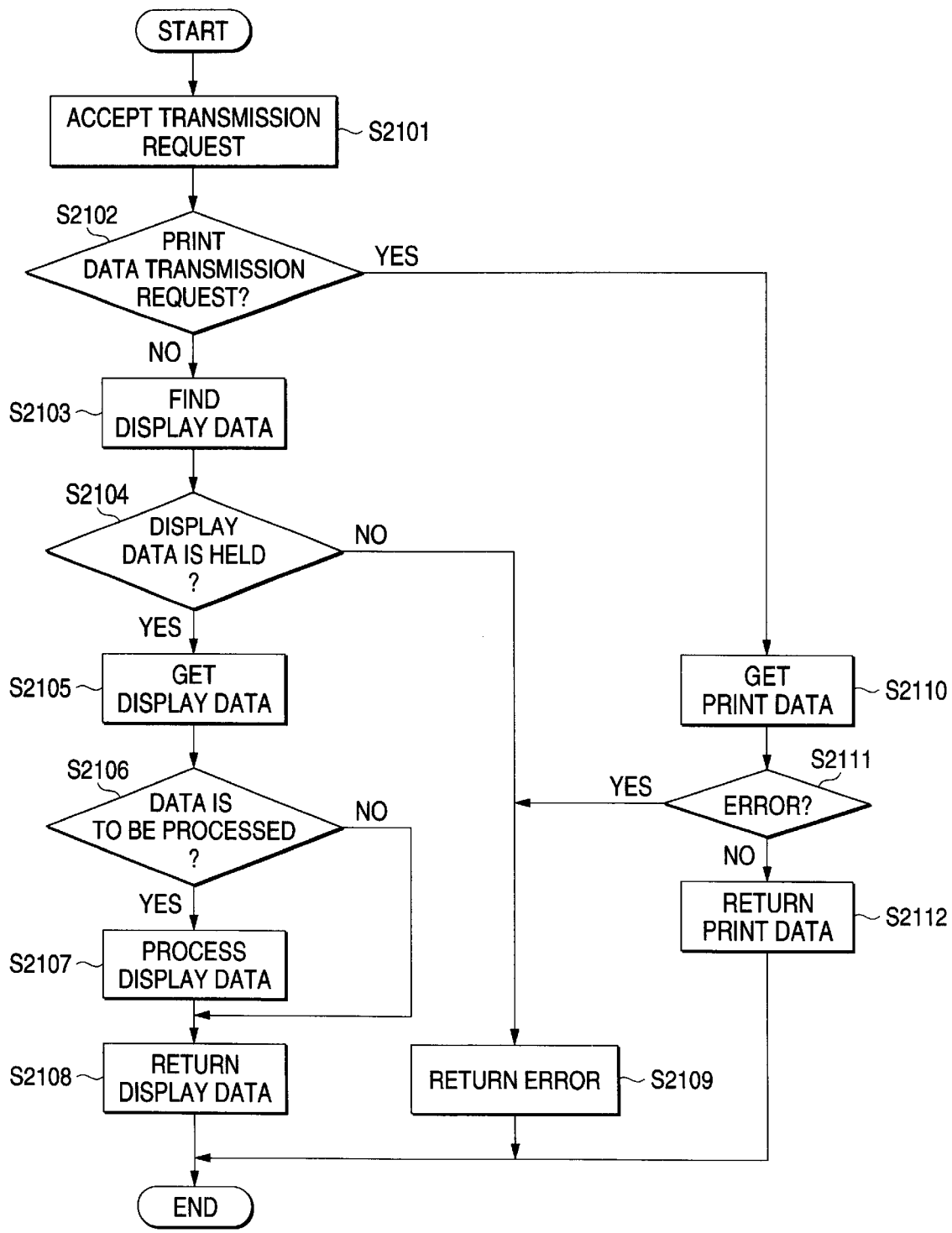
FIG. 45 is a processing flowchart of an agent.

FIG. 45 is a processing flowchart of the agent 300 shown in FIG. 44. First, the transmission request acceptance means 306 accepts a display data transmission request or a print data transmission request at step S2101. If the transmission request is a print data transmission request at step S2102 (Yes), the print data output means 308 gets print data at step S2110.

If it is determined at step S2111 that print data can be gotten, the print data output means 308 returns the print data to the requester at step S2112. If it is not determined at step S2111 that print data can be gotten, the print data output means 308 returns an error to the requester at step S2109.

Steps S2103 to S2109 are similar to steps S1202 to S1208 in FIG. 7 described in the second embodiment.

The information processing system of the ninth embodiment can also be applied as an information processing system made up of a number of hardware modules. Therefore, a received document in a FAX module can also be referenced and printed out through a printer module.

To output image data, voice data, etc., for example, still image data may be converted into GIF (Graphic Interchange Format) or JPEG (Joint Photographic Experts Group) format before transmission.

Figure 46:
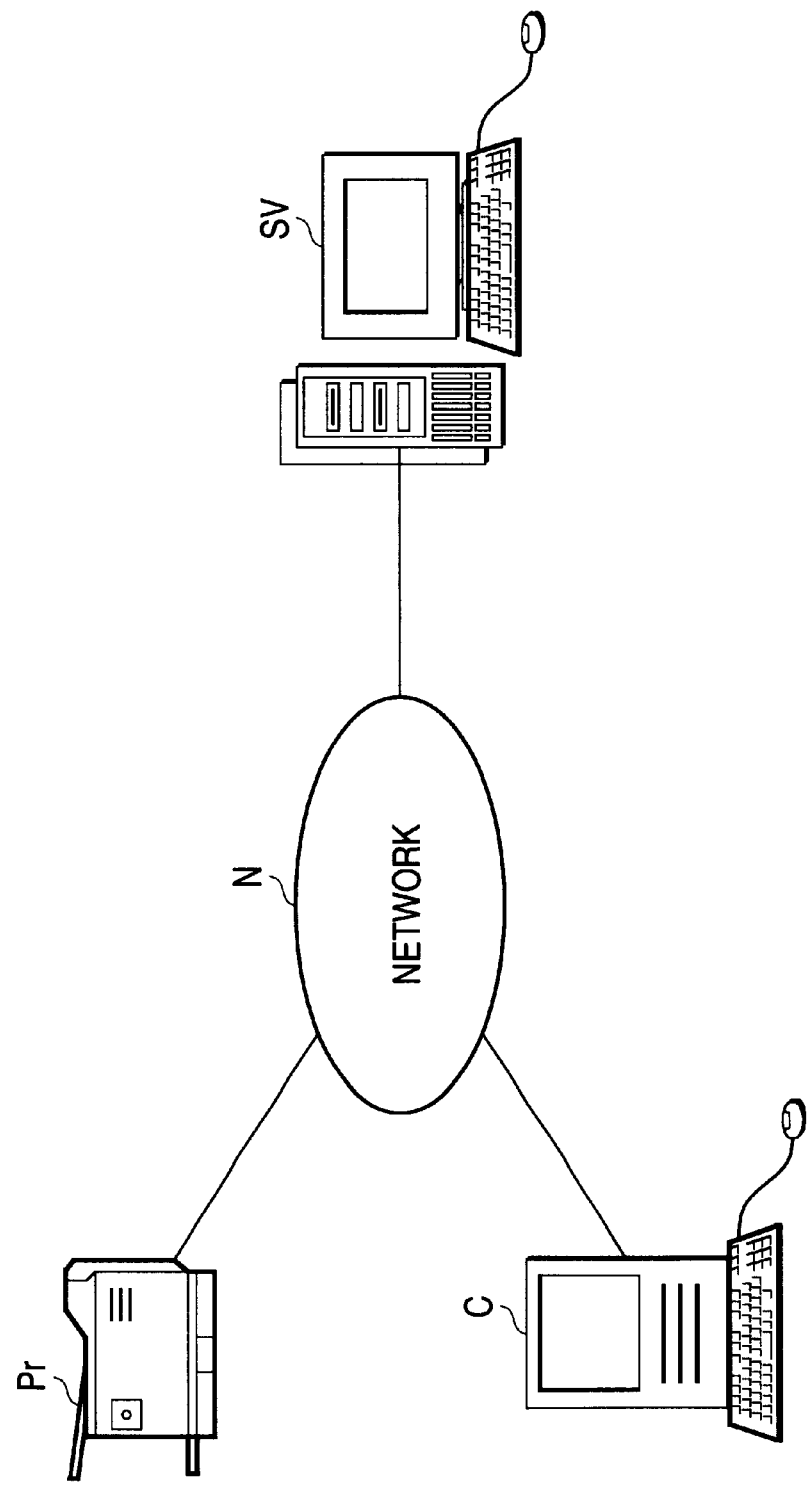
FIG. 46 is an illustration to show an operation environment according to a tenth embodiment of the invention.

Next, a tenth embodiment of an information processing system of the invention will be discussed. FIG. 46 is an illustration to show an operation environment of the information processing system according to the tenth embodiment of the invention. The tenth embodiment is applied for a computer C to download software of a printer Pr from a server computer SV through a network N to the printer Pr, an example of the information processing system of the embodiment.

Figure 47:
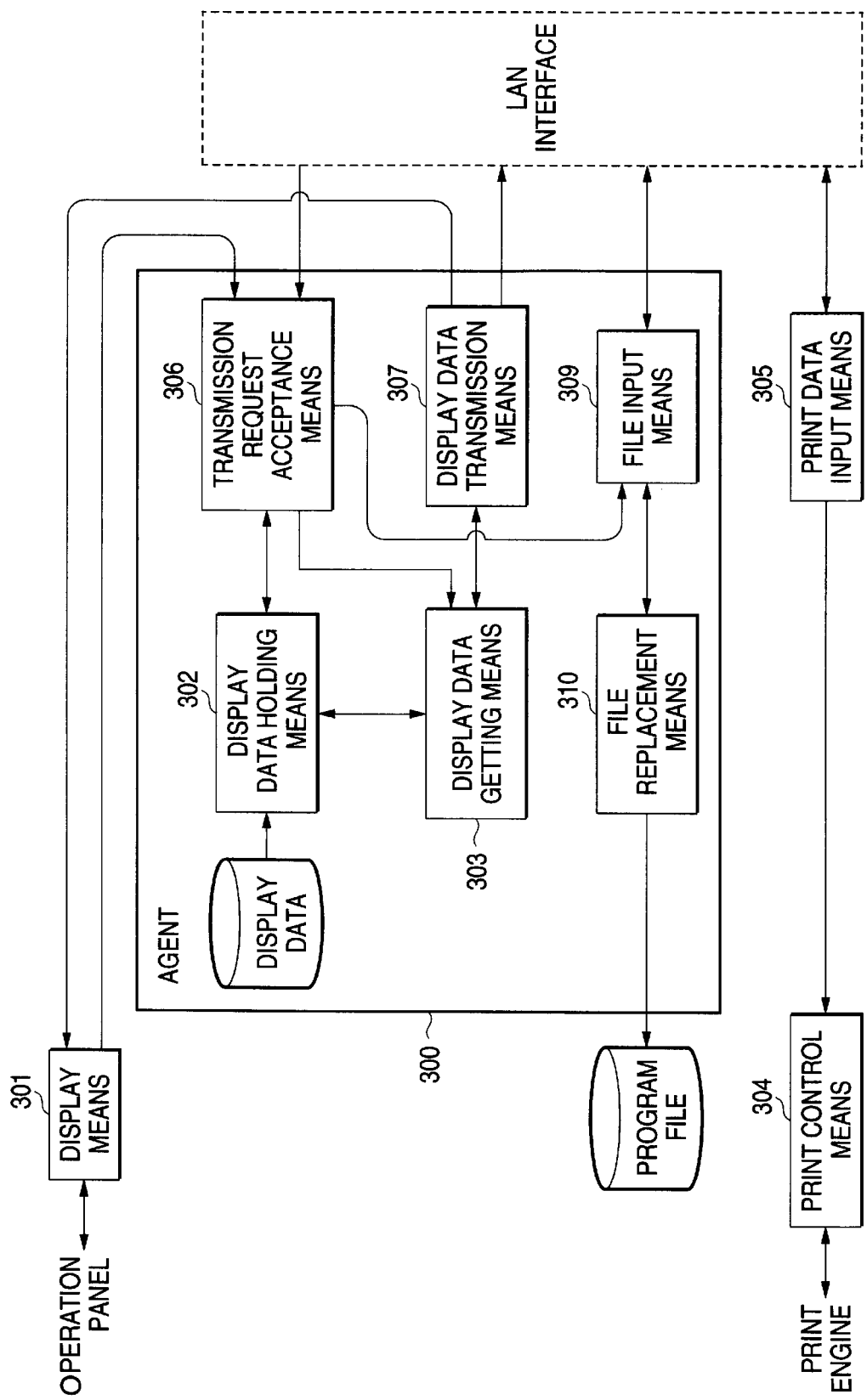
FIG. 47 is a software block diagram according to the tenth embodiment of the invention.

FIG. 47 is a software block diagram according to the tenth embodiment. That is, the software is made up of display means 301, an agent 300 consisting of display data holding means 302, display data getting means 303, transmission request acceptance means 306, display data transmission means 307, file input means 309, and file replacement means 310, print control means 304, and print data input means 305.

Figure 48:
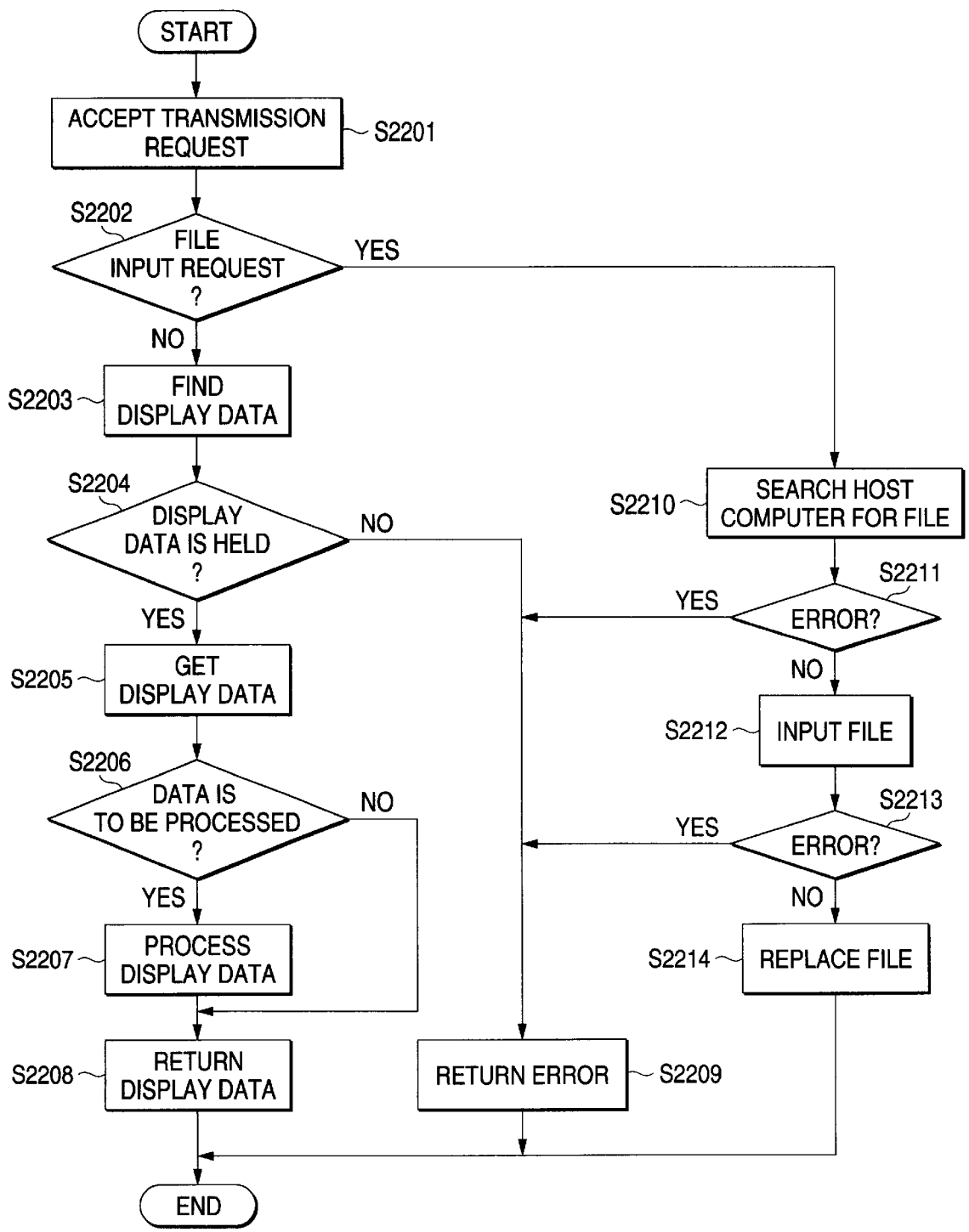
FIG. 48 is a processing flowchart of an agent.

FIG. 48 is a processing flowchart of the agent. First, the display data holding means 302 accepts a transmission request at step S2201. Here, the transmission requester is the computer C shown in FIG. 46 and the server computer SV stores a downloaded file.

If it is not determined at step S2202 that the request is a file transmission request, display data is returned to the requester at steps S2203 to S2209 as steps S1202 to S1208 in FIG. 7 described in the second embodiment. At the time, if the requested display data is display data for download command, display data containing reference information to the file to be downloaded is transmitted.

The reference information may be previously embedded in the display data or stored reference information may be built in the display data at step S2207. The reference information contains the server computer name and the location and file identifier of the file to be downloaded in the host computer. For example, a format of URL, etc., is used for the reference information.

On the other hand, if it is determined at step S2202 that the request is a file transmission request, the file input means 309 searches the server computer SV indicated in the reference information for the requested file through the network N at step S2210. At this time, a protocol of DNS (Directory Name Service), etc., is used.

If the file input means 309 cannot search the server computer SV for the requested file at step S2211 (Yes), it returns an error to the computer C of the requester at step S2209. If the file input means 309 can search the server computer SV for the requested file at step S2211 (No), it inputs the file from the searched server computer SV at step S2212.

Then, the file is downloaded from the server computer SV through the network N to the printer Pr. If the file input ends in failure at step S2213 (No), an error is returned to the computer C of the requester at step S2209.

If the file input succeeds at step S2213 (No), the file replacement means 310 replaces stored file with the input file at step S2214.

When the input file is not stored, the file replacement means 310 may return an error or add the file.

At step S2209, file addition, replacement, or deletion command information may be added to the display data for transmission and at step S2214, file replacement may be executed in accordance with the command information.

By performing such processing, a file can be downloaded from the server computer SV through the network N to the printer Pr based on a request from the computer C. That is, if the function of the printer Pr is expanded or changed, the file (program file, etc.,) corresponding to the function expansion or change can be downloaded from the server computer SV through the network N to the printer Pr; the most recent file can be applied immediately.

Figure 49:
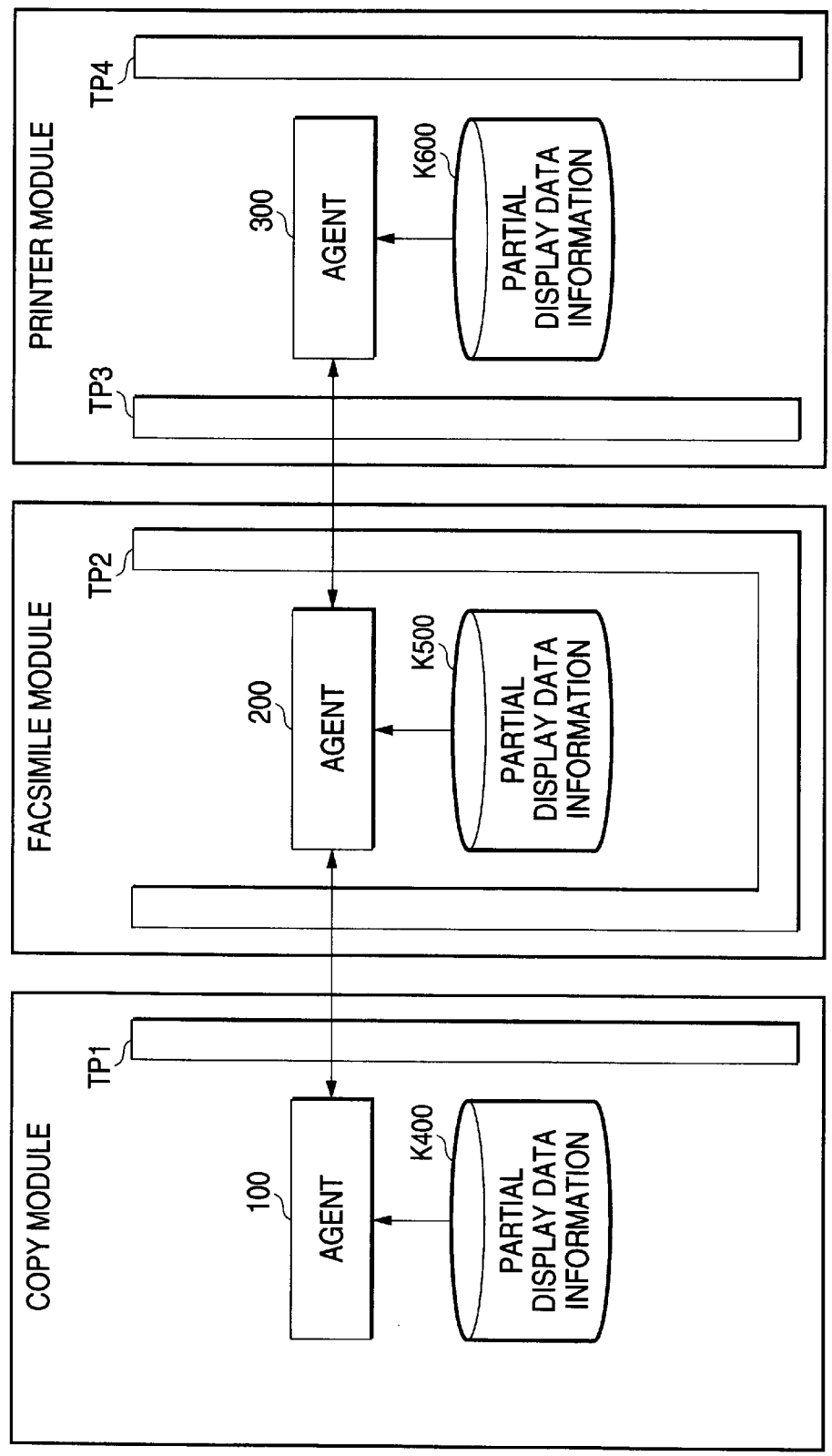
FIG. 49 is a software block diagram according to an eleventh embodiment of the invention.

Next, an eleventh embodiment of an information processing system of the invention will be discussed. FIG. 49 is an illustration to show a software block diagram of the information processing system according to the eleventh embodiment of the invention. The eleventh embodiment is characterized by the fact that when power is turned on, hardware modules exchange partial display data information installed therein with each other and store partial display data received from other hardware modules and when transmitting requested display data, the hardware module combines the display data with the stored partial display data received from other hardware modules.

As shown in FIG. 49, the information processing system comprises a copy module, a FAX module, and a printer module connected. The copy, FAX, and printer modules comprise agents 100, 200, and 300, partial display data information K400, K500, and K600, and transports TP1, TP2, and TP3 and TP4 respectively.

Figure 50:
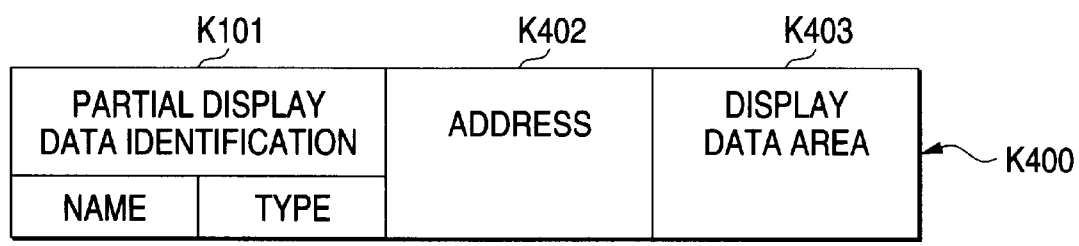
FIG. 50 is a conceptual drawing to show partial display data information entries.

FIG. 50 is a conceptual drawing to show partial display data information entries. The partial display data information K400 is made up of partial display data identification K401, an address K402 and a display data area K403.

The address K402 stores the address of the hardware module generating the partial display data information K400.

The partial display data identification K401 is used to quote the partial display data. In the embodiment, two quotation information pieces of character string "Name" to uniquely identify the display data and "Type" to identify display data set are provided. More than one "Name" and more than one "Type" may exist and the quotation information may be quotation information having another function.

To store information generated by the home module in the same file, the address K402 is provided to determine whether or not the information is information generated by the home module. It is also used to delete the corresponding information if a fault in another module is sensed.

Figure 51:
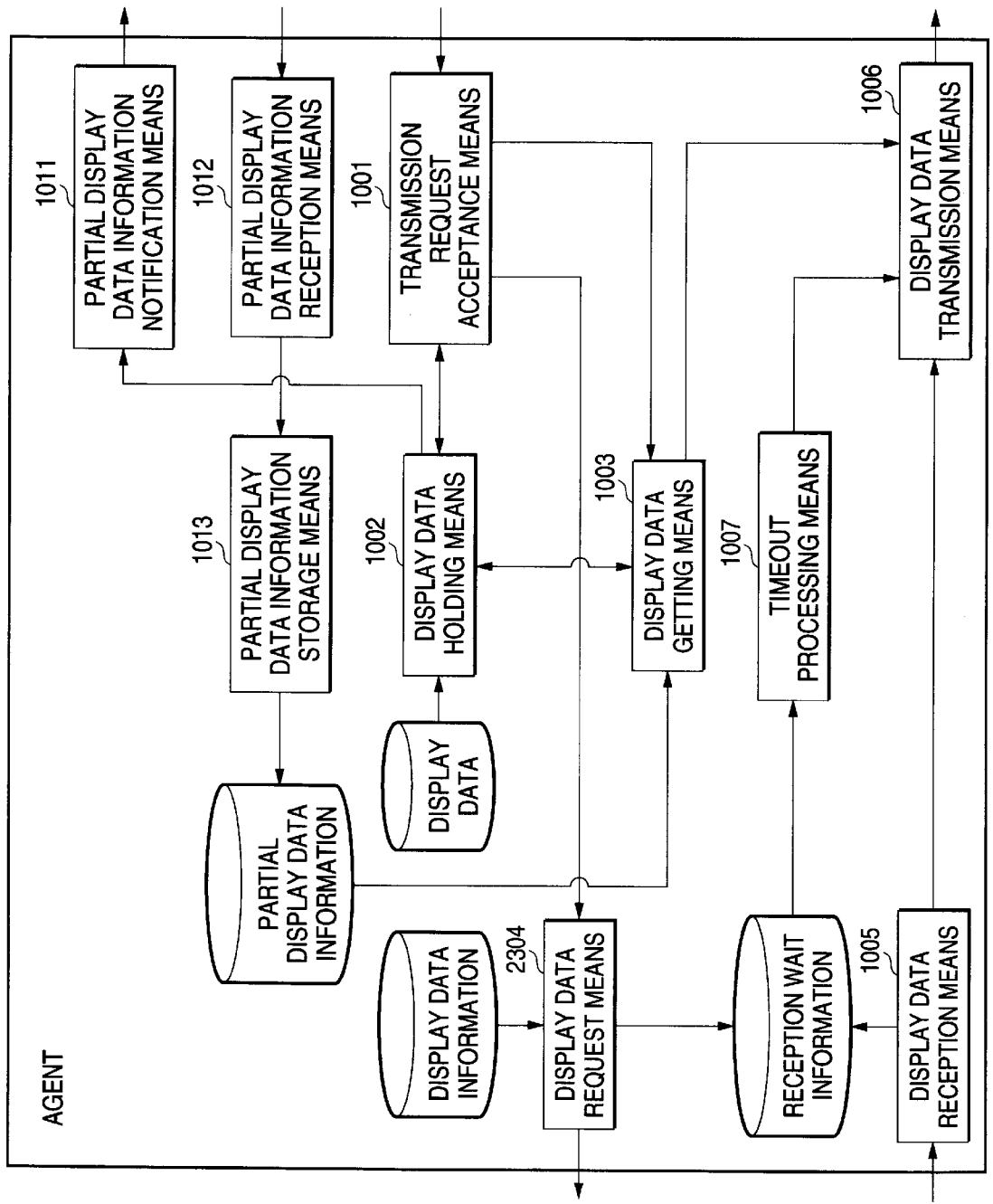
FIG. 51 is a software block diagram of an agent.

FIG. 51 is a software block diagram of an agent installed in each hardware module. The agent comprises transmission request acceptance means 1001, display data holding means 1002, display data getting means 1003, display data request means 1004, display data reception means 1005, display data transmission means 1006, timeout processing means 1007, partial display data information notification means 1011, partial display data information reception means 1012, and partial display data information storage means 1013.

Figure 52:
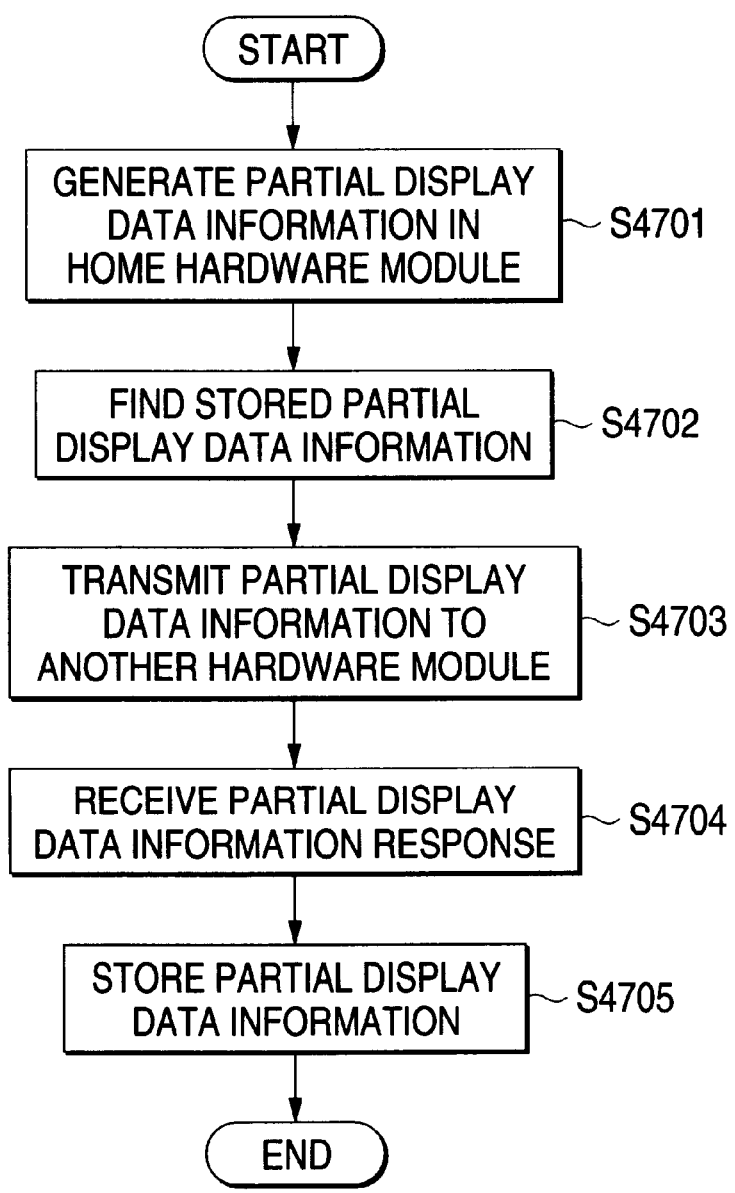

FIG. 52 is a processing flowchart applied when power of an active module is turned on. First, partial display data information in the home hardware module is generated at step S4701. Next, partial display data information sent from another hardware module and stored in the home hardware module is found at step S4702.

Next, the generated partial display data information and found partial display data information are sent to another hardware module at step S4703. Further, a response is received from the hardware module at step S4704. Partial display data information contained in the response received from the hardware module is stored at step S4705.

Figure 53:
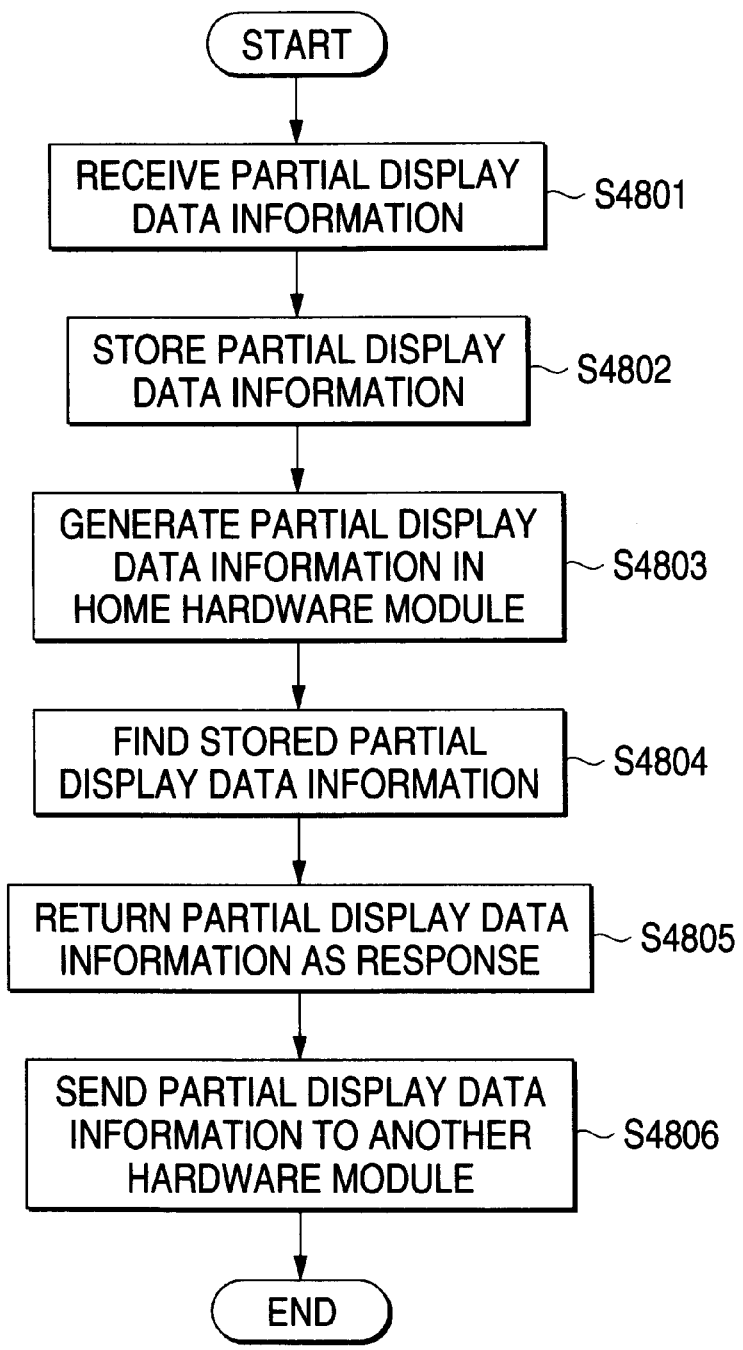

FIG. 53 is a processing flowchart applied when power of a passive module is turned on. First, partial display data information is received from another hardware module at step S4801 and is stored at step S4802.

Next, partial display data information in the home hardware module is generated at step S4803. Further, partial display data information sent from another hardware module and stored in the home hardware module is found at step S4804. Next, the generated partial display data information and found partial display data information are sent to the source hardware module at step S4805. Newly sent partial display data information is sent to a hardware module other than the source hardware module at step S4806. At this time, already known partial display data information may also be contained.

When the power is turned on, each of the hardware modules operates as an active module. The active module procedure is repeated at predetermined or setup time intervals, whereby if the hardware modules are not started at the same time, partial display data information can be transferred normally. Further, needless communication can be deleted by limiting the number of repetitions of the active module procedure or the time of repeating the active module procedure.

Figure 54:
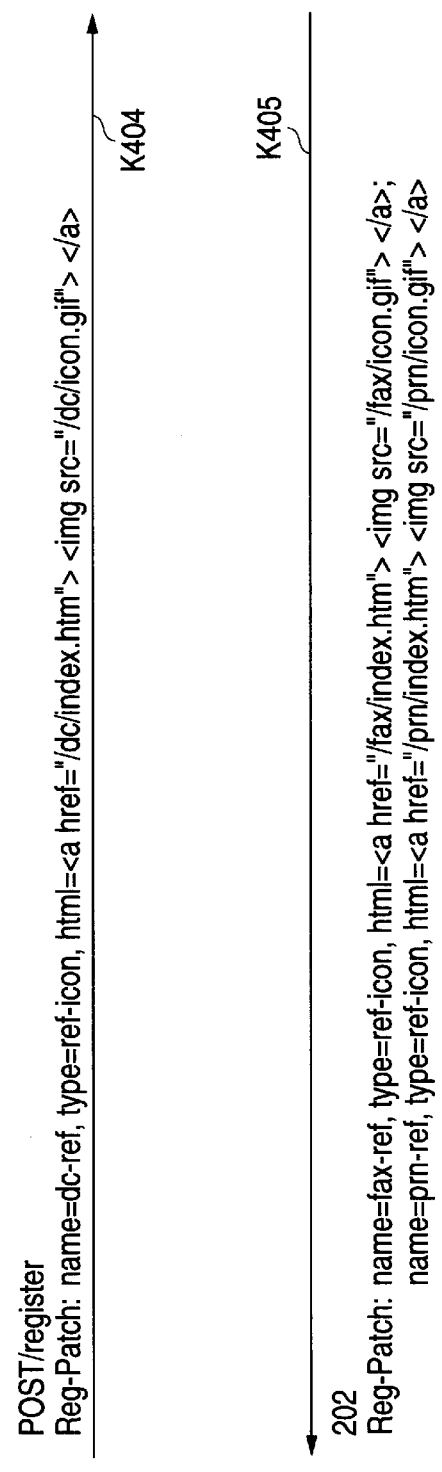
FIG. 54 is an illustration to show message examples.

FIG. 54 is an illustration to show examples of a partial display data information notification message K404 and a partial display data information response message K405.

Figure 55:
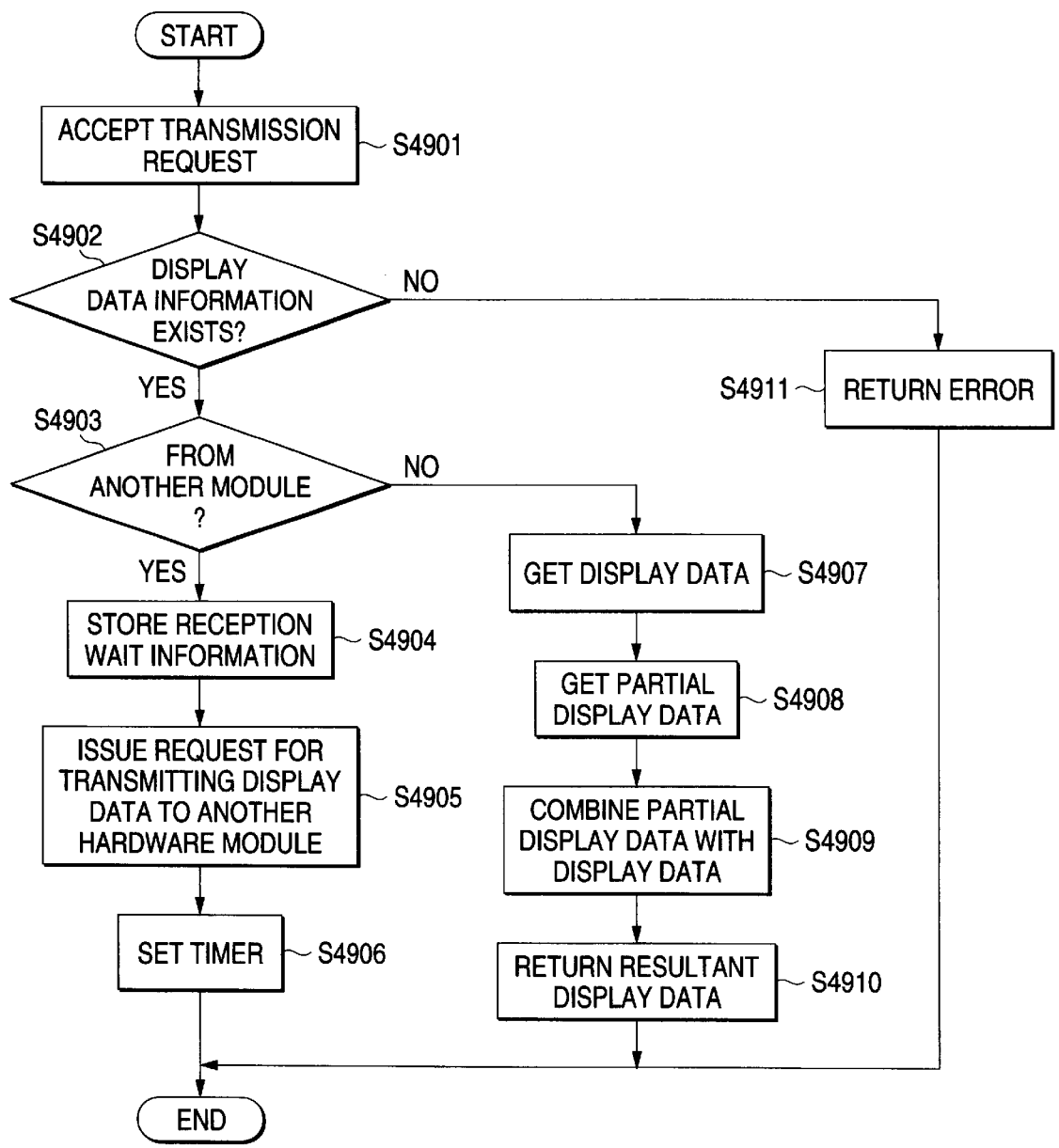
FIG. 55 is a processing flowchart applied when the agent transmits display data.

FIG. 55 is a processing flowchart applied when the agent transmits display data. In the figure, the agent accepts a display data transmission request from an adjacent hardware module or a computer, etc., connected to a LAN at step S4901.

Next, the agent checks whether or not the requested display data information is held in the home hardware module at step S4902. If the display data information is not held, the agent returns an error at step S4911.

On the other hand, if the display data information is held, the agent checks whether or not the display data information is information sent from another hardware module and stored in the home hardware module. If the display data information is sent from another hardware module, the agent stores reception wait information at step S4904, issues a request for transmitting display data to the hardware module at step S4905, and sets a timer at step S4906.

If the display data information is not sent from another hardware module, the agent gets display data at step S4907 and subsequently gets partial display data at step S4908. Next, the agent combines the partial display data with the display data at step S4909 and returns the resultant display data to the requester at step S4910.

Figures 56, 57:
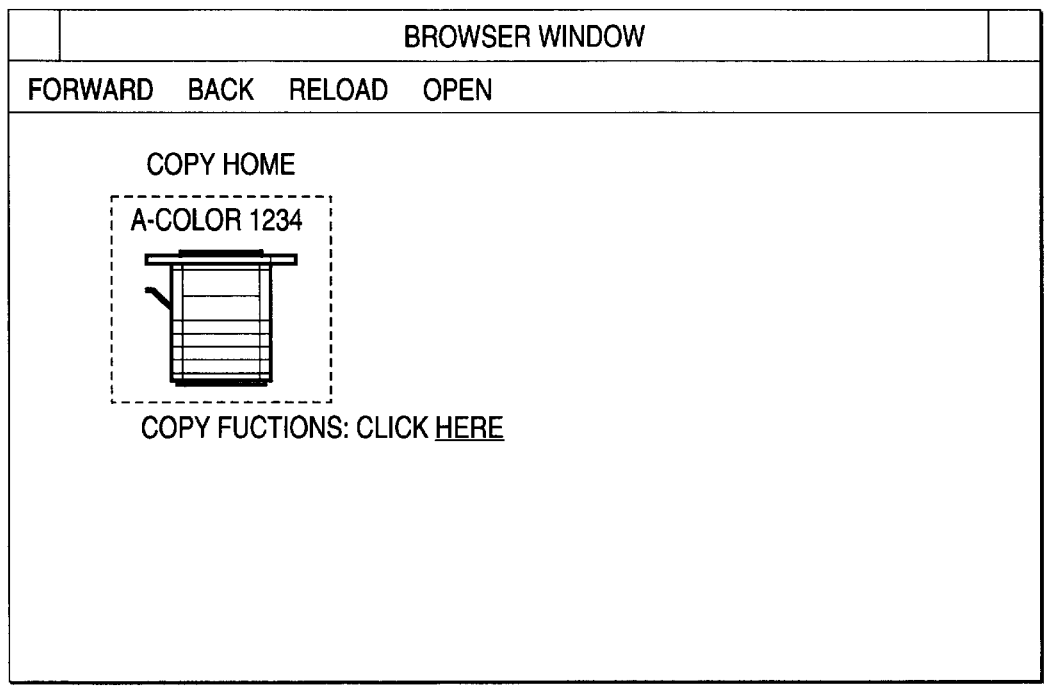
FIG. 56 is an example of display data before partial display data is combined with the display data
FIG. 57 is an illustration to show a display example of display data before partial display data is combined therewith.

FIG. 56 is an example of display data before partial display data is combined with the display data. That is, the display data before partial display data is combined therewith needs to contain partial display data reference information. In FIG. 56, the line <!X-INTERLINE TYPE="ref-icon"> is reference information. In this case, the partial display data with Type being "ref-icon" in the stored partial display data reference information is inserted following the line of the reference information.

FIG. 57 is a browser display example of the display data before partial display data is combined therewith. Thus, before partial display data is combined, the partial display data indicated by the reference information is not displayed.

FIG. 58 is an example of quoted partial display data information, which shows a part of HTML syntax of partial display data corresponding to Name and Type.

Figures 59, 60:
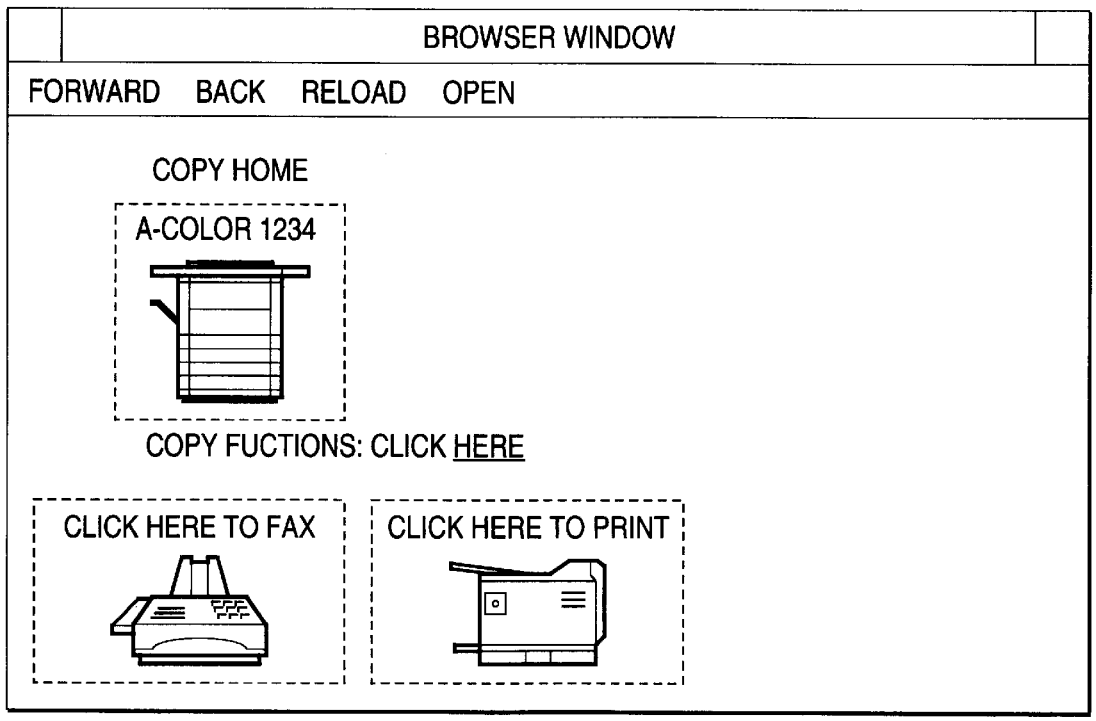
FIG. 59 is an illustration to show an example of resultant display data.
FIG. 60 is an illustration to show a display example of resultant display data.
Figure 61:
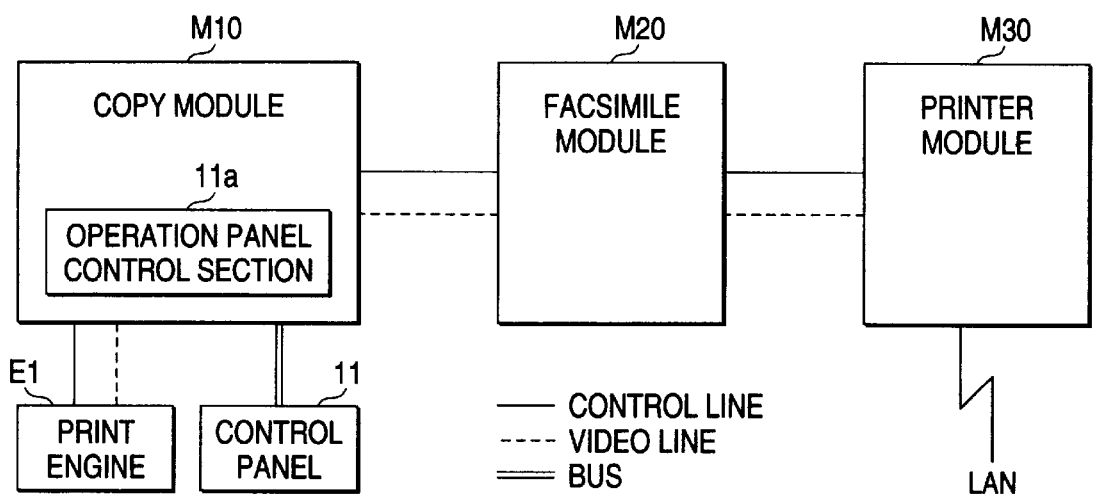
FIG. 61 is a block diagram to show a configuration example of a conventional complex machine.
Figure 62:
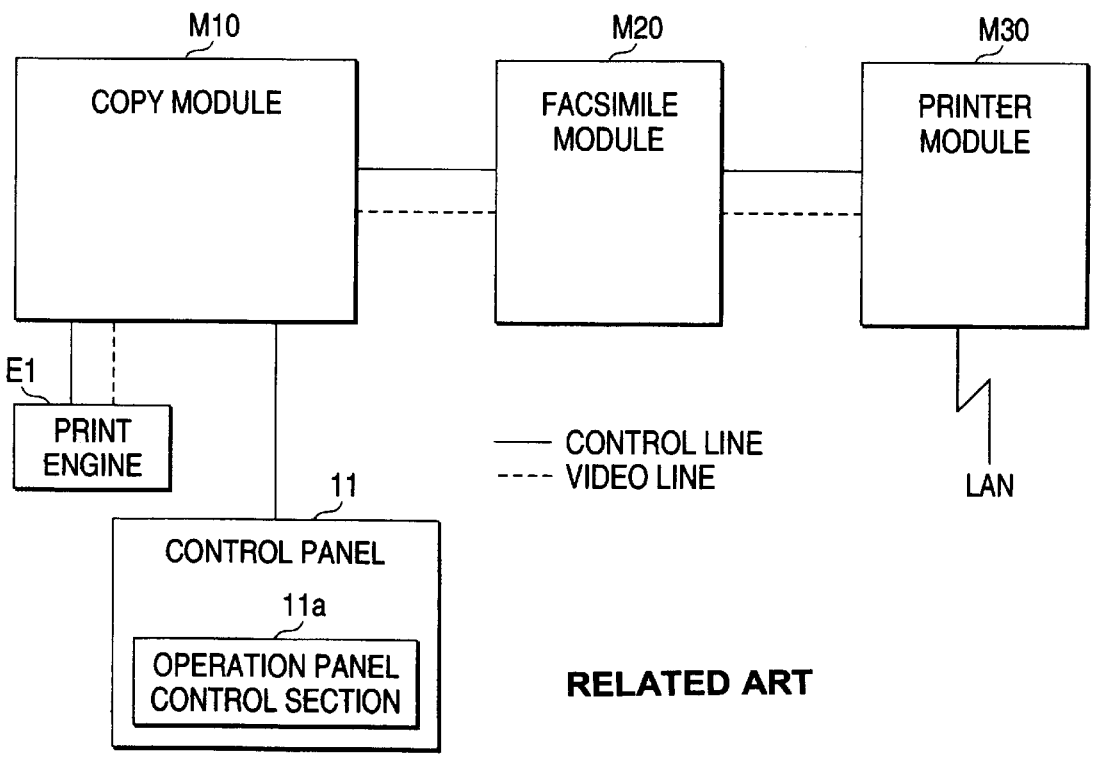
FIG. 62 is a block diagram to show another configuration example of a conventional complex machine.

FIG. 59 is an example of the resultant display data. That is, HTML syntax lines of partial display data with quoted partial display data information TYPE being "ref-icon" shown in FIG. 58 are inserted following <!X-INTERLINE TYPE="ref-icon"> of the reference information in FIG. 59.

FIG. 60 is a browser display example of the resultant display data. The partial display data inserted following the display data reference information is thus displayed.

When the power is turned on, the hardware modules can exchange partial display data information with each other for obtaining partial display data information in other hardware modules powered on and the current hardware modules that can be used can be easily checked on a browser screen. The user can click on the display part of desired partial display data through the browser screen for displaying the display data of the hardware module accordingly.

In the description of the embodiments, the display data is stored in the ROM, but may be stored in a nonvolatile storage medium, such as flash ROM, magnetic disk, or backup RAM.

As described above, the information processing system of the invention provides the following advantages: The format of display data used with the operation section of the information processing section and the format of display data used with the external system are made the same, so that the same display contents as on the display panel can be produced on the computer.

Since display data only in one format may be stored, the data storage area can be reduced.

Further, to make up the information processing system of a number of hardware modules, the corresponding display data is managed in each hardware module and is read as required, whereby to add a function to any hardware module or add a hardware module, only the display data corresponding to the hardware module to which the function is to be added or the hardware module to be added may be changed; function expandability can be enhanced.

What is claimed is:

1. An information processing system, comprising:
 a plurality of information processing modules each for performing information processing, the information processing modules includes a copy module, a facsimile module and a printer module;
 storage means being installed in each of said information processing modules for storing display data;

transmission request acceptance means being installed in each of said information processing modules for accepting a display data transmission request;

recognition means being installed in each of said information processing modules for determining whether display data corresponding to the transmission request is stored on said storage means, wherein said information processing module also includes said transmission request acceptance means accepting the transmission request;

transfer means being installed in each of said information processing modules for transferring the transmission request to a different module, if said recognition means determines that the display data corresponding to the transmission request is not stored on the storage means;

display data getting means being installed in each of said information processing modules for getting the display data from said storage means, if said recognition means determines that the display data is stored on the storage means; and display data transmission means being installed in each of said information processing modules for returning the display data gotten by said display data getting means to an upstream information processing module making a prior transmission request to a downstream information processing module returning the display data;

identification information notification means being installed in each of said information processing modules and sending identification information of display data that can be gotten in each of the information processing modules to all the other said information processing modules;

identification information reception means being installed in each of the information processing modules for receiving the identification information of display data that can be gotten in the one of the information processing modules, sent by said identification information notification means; and identification information storage means being installed in each one of the information processing modules for storing the identification information of display data that can be gotten in the one of the information Processing modules, received at said identification information reception means.

2. The information processing system as claimed in claim 1, wherein if display data accepted at said transmission request acceptance means is determined to be the display data that can be gotten in said different one of the information processing modules, stored on said identification information storage means, and display data request means transfers the transmission request to the different one of the information processing modules.

3. The information processing system as claimed in claim 1, wherein said identification information notification means sends the identification information of display data that can be gotten in the one of the information processing modules to the different one of the information processing modules and identification information of display data that can be gotten in the different one of the information processing modules, stored in the information storage means.

4. The information processing system as claimed in claim 1, further comprising identification information response means for returning identification information of display data that can be gotten in the different one of the information processing modules and identification information of display data that can be gotten in any other information processing module than the one of the information processing modules or the different one of the information processing modules to the one of the information processing modules, if said identification information reception means receives identification information of display data that can be gotten in the one of the information processing modules.

5. The information processing system as claimed in claim 1, wherein said identification information storage means checks whether or not sent identification information of display data that can be gotten in the different one of the information processing modules is already stored, and said identification information storage means stores the identification information additionally, if the identification information is not stored.

6. The information processing system as claimed in claim 1, further comprising identification information renotification means, if said identification information reception means receives identification information of display data that can be gotten in the different one of the information processing modules, for sending identification information of display data that can be gotten in the one of the information processing modules and identification information of display data that can be gotten in the different one of the information processing modules, stored in said identification information storage means to any other information processing module than the information processing module sending the identification information received at said identification information reception means.

7. An information processing systems, comprising:

a plurality of information processing modules each for performing information processing, the information processing modules includes a copy module, a facsimile module and a printer module:

storage means being installed in each of said information processing modules for storing display data;

transmission request acceptance means being installed in each of said information processing modules for accepting a display data transmission request;

recognition means being installed in each of said information processing modules for determining whether display data corresponding to the transmission request is stored on said storage means, wherein said information processing module also includes said transmission request acceptance means accepting the transmission request;

transfer means being installed in each of said information processing modules for transferring the transmission request to a different module, if said recognition means determines that the display data corresponding to the transmission request is not stored on the storage means;

display data getting means being installed in each of said information processing modules for getting the display data from said storage means, if said recognition means determines that the display data is stored on the storage means;

display data transmission means being installed in each of said information processing modules for returning the display data gotten by said display data getting means to an upstream information processing module making a prior transmission request to a downstream information processing module returning the display data;

identification information inquiry means being installed in each of the information processing modules and inquiring identification information of display data that can be gotten in all the other said information processing modules; and identification information answer means being installed in each of the information processing modules and answering the inquiry made by said identification information inquiry means about the identification information of display data that can be gotten in each local information processing modules.

8. The information processing system as claimed in claim 7, wherein if an inquired display data cannot be gotten, said identification information answer means transfers the inquiry to an information processing module other than an inquirer, and identification information answer means in the information processing module, other than the inquirer, answers a transferred inquiry about the identification information.

9. The information processing system as claimed in claim 1, wherein said display data getting means generates display data containing information to reference display data that can be gotten from the different one of said information processing modules.

10. The information processing system as claimed in claim 1, further comprising communication means for enabling logical communication by using a physical transmission medium for connecting said information processing modules in a one-to-one correspondence with each other.

11. The information processing system as claimed in claim 10, wherein said communication means enables communication between the information processing modules.

12. The information processing system as claimed in claim 1, further comprising:

data storage means for storing print data, image data, or voice data, wherein
said display data getting means generates display data containing list information of the data in said data storage means, list information of predetermined groups to which the data belongs, or reference information to the data.

13. The information processing system as claimed in claim 1, further:

file storage means for storing a program file, a description file or any other file, wherein
said display data getting means generates display data containing list information of the files in said file storage means, list information of predetermined groups to which the files belong, or reference information to the files.

14. The information processing system as claimed in claim 1, wherein said display data getting means generates display data containing list information of files stored in an external system connected to a network, list information of predetermined groups to which the files belong, or reference information to the files.

15. The information processing system as claimed in claim 1, further comprising input means for reading a file stored in an external system connected to a network from said external system.

16. The information processing system as claimed in claim 15, further comprising file replacement means, if a different file having a same identification information as the file read through a file input means is stored in a file storage means, for replacing the different file with the read file, if a different file having the same identification information as the file read through said file input means is not stored in said file storage means, said file replacement means for storing the read file in said file storage means.

17. The information processing system as claimed in claim 15, further comprising file replacement means, if a different file having a same identification information as the file read through a file input means is stored in a file storage means, for replacing the different file with the read file, if a different file having the same identification information as the file read through said file input means is not stored in said file storage means, said file replacement means for discarding the read file.

18. The information processing system as claimed in claim 1, further comprising:

file storage means for storing program file, description file, or any other file;

file operation input means for inputting identification information of a file from an external system connected to a network and command information for adding, replacing, or deleting the file; and file information input means for inputting a file reference information to the file to be added or replaced if the command information is to add or delete.

19. The information processing system as claimed in claim 1, further comprising:

display data holding control means for managing display data stored on an external storage medium added to the information processing module.

20. The information processing system as claimed in claim 1, wherein said storage means is for storing a source data of display data; and said display data getting means generates display data from said source data.

* * * * *